US012605891B2

(12) United States Patent
Rossini et al.

(10) Patent No.: US 12,605,891 B2
(45) Date of Patent: Apr. 21, 2026

(54) SLEEVES UNITARILY FORMED BY ADDITIVE MANUFACTURING FOR MOUNTING ON ROTATING SHAFTS OF COMMERCIAL PRINTING MACHINERY

(71) Applicant: ROSSINI S.P.A., Rescaldina Milan (IT)

(72) Inventors: Felice Rossini, Milan (IT); Marco Caccia, Suwanee, GA (US); Xavier Boadas Matamala, Barcelona (ES); Jaume Pregonas, Barcelona (ES)

(73) Assignee: Rossini SPA, Rescaldina Milan (IT)

( * ) Notice: Subject to any disclaimer, the term of this patent is extended or adjusted under 35 U.S.C. 154(b) by 17 days.

(21) Appl. No.: 18/471,471

(22) Filed: Sep. 21, 2023

(65) Prior Publication Data

US 2025/0100216 A1     Mar. 27, 2025

(51) Int. Cl.
*B29C 64/241*          (2017.01)
*B29C 64/209*          (2017.01)
(Continued)

(52) U.S. Cl.
CPC .......... *B29C 64/209* (2017.08); *B29C 64/241* (2017.08); *B29C 64/245* (2017.08);
(Continued)

(58) Field of Classification Search
CPC ... B29C 64/209; B29C 64/241; B29C 64/245; B29C 64/295; B29C 64/393;
(Continued)

(56) References Cited

U.S. PATENT DOCUMENTS

| 5,782,181 A | 7/1998 | Rossini |
| 5,819,657 A | 10/1998 | Rossini |

(Continued)

FOREIGN PATENT DOCUMENTS

| CN | 112567481 A | * | 3/2021 | .......... H01B 13/327 |
| CN | 112 867 602 A | | 5/2021 | |

(Continued)

OTHER PUBLICATIONS

Article 1—Leapfrog, 2020. 3D Flexographic printing sleeves. [online] Available at: <https:lpfrg.com/testimonials/tech-sleeves-engineering-testimonial/> [Accessed Nov. 27, 2020].

(Continued)

*Primary Examiner* — Christopher E Mahoney
*Assistant Examiner* — Marissa Ferguson-Samreth
(74) *Attorney, Agent, or Firm* — Dority & Manning, P.A.

(57) ABSTRACT

A sleeve for mounting on a mandrel of a commercial printing machine can include distinct annular regions that are integrally formed simultaneously as a unitary structure without a forming mandrel and without any need to be adhered to one another in manufacturing steps separate from the manufacture of each annular region of the completed sleeve. A 3D printing machine and method suitable for one or more of the flexible packaging industry, the offset printing industry, the publication printing industry, the décor printing industry, and the corrugated printing industry, employs a build plate that descends from a horizontal printing plane where each of multiple printing heads extrudes a road cycle of thermoplastic material onto the immediately underlying road cycle of the sleeve.

18 Claims, 27 Drawing Sheets

(51) Int. Cl.

| | |
|---|---|
| *B29C 64/245* | (2017.01) |
| *B29C 64/295* | (2017.01) |
| *B29C 64/393* | (2017.01) |
| *B33Y 10/00* | (2015.01) |
| *B33Y 30/00* | (2015.01) |
| *B33Y 50/02* | (2015.01) |
| *B33Y 80/00* | (2015.01) |
| *B41N 6/00* | (2006.01) |
| *B29K 101/12* | (2006.01) |
| *B29L 31/00* | (2006.01) |

(52) U.S. Cl.

CPC .......... *B29C 64/295* (2017.08); *B29C 64/393* (2017.08); *B33Y 10/00* (2014.12); *B33Y 30/00* (2014.12); *B33Y 50/02* (2014.12); *B33Y 80/00* (2014.12); *B41N 6/00* (2013.01); *B29K 2101/12* (2013.01); *B29L 2031/767* (2013.01)

(58) Field of Classification Search

CPC ......... B33Y 10/00; B33Y 30/00; B33Y 50/02; B33Y 80/00; B41N 6/00; B29K 2101/12; B29L 2031/767

See application file for complete search history.

(56) References Cited

U.S. PATENT DOCUMENTS

| | | | |
|---|---|---|---|
| 6,688,226 B2 | 2/2004 | Rossini et al. | |
| 6,691,614 B2 | 2/2004 | Bell et al. | |
| 7,124,685 B2 * | 10/2006 | Re ........................... | B41F 13/10 |
| | | | 101/376 |
| 8,534,192 B2 | 9/2013 | Hashimoto et al. | |
| 10,399,281 B2 | 9/2019 | Mannella et al. | |
| 11,260,586 B2 | 3/2022 | Fink et al. | |
| 11,613,441 B2 | 3/2023 | Shoji et al. | |
| 2002/0046668 A1 * | 4/2002 | Bell ........................ | B41F 13/10 |
| | | | 101/376 |
| 2010/0307356 A1 * | 12/2010 | Rossini .................. | B41N 10/04 |
| | | | 101/375 |
| 2013/0284038 A1 * | 10/2013 | Rossini .................. | B41F 27/06 |
| | | | 101/382.1 |
| 2016/0238065 A1 | 8/2016 | Otten | |
| 2017/0217148 A1 | 8/2017 | Krumpelmann et al. | |
| 2020/0070418 A1 | 3/2020 | Wang et al. | |
| 2020/0269353 A1 | 8/2020 | Carter et al. | |
| 2021/0047141 A1 | 2/2021 | Neumann et al. | |
| 2021/0229345 A1 | 7/2021 | Blackwell et al. | |
| 2022/0024239 A1 | 1/2022 | Baldwin et al. | |
| 2022/0250375 A1 | 8/2022 | Meyers et al. | |
| 2023/0166450 A1 | 6/2023 | Avallone et al. | |

FOREIGN PATENT DOCUMENTS

| | | | | |
|---|---|---|---|---|
| JP | 09001774 A * | 1/1997 | ............ | B41F 27/105 |
| WO | WO-2021071730 A1 * | 4/2021 | ............ | F16L 11/085 |

OTHER PUBLICATIONS

Article 2—Improving 3D Printing Methods to Create Versatile Sleeves for the Printing Industry; Wei et al.; J. Print Media Technol. Res. vol. 10, No. 3, 2021.

PCT Search Report, Jan. 9, 2025.

Article—Understanding Fiberglass Reinforced Polyester (FRP), Sep. 4, 2017, Mickey Truck Bodies.

Taiwan Office Action with Translation, Sep. 8, 2025.

* cited by examiner

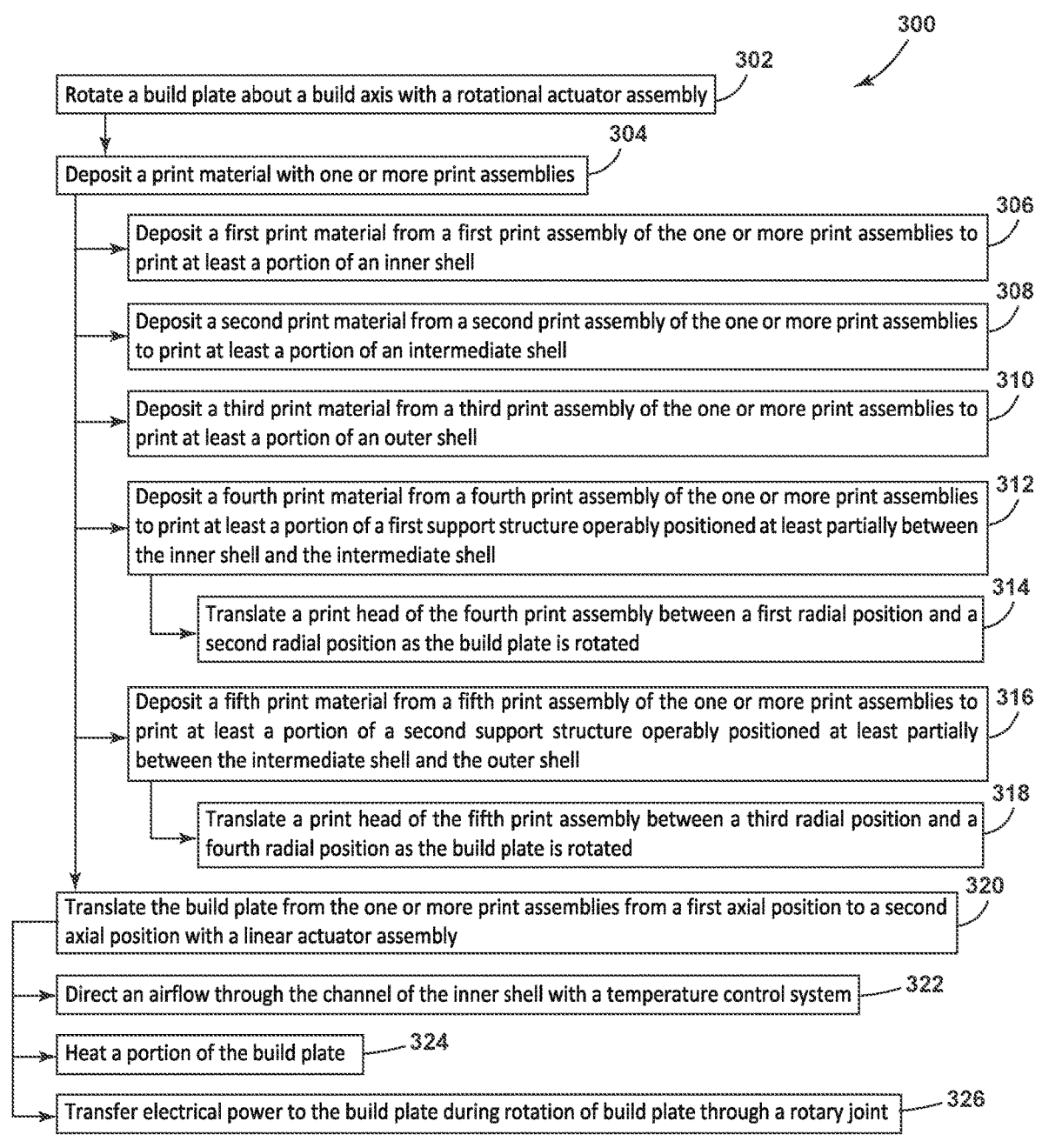

300

302
Rotate a build plate about a build axis with a rotational actuator assembly

304
Deposit a print material with one or more print assemblies

306
Deposit a first print material from a first print assembly of the one or more print assemblies to print at least a portion of an inner shell 308
Deposit a second print material from a second print assembly of the one or more print assemblies to print at least a portion of an intermediate shell 310
Deposit a third print material from a third print assembly of the one or more print assemblies to print at least a portion of an outer shell 312
Deposit a fourth print material from a fourth print assembly of the one or more print assemblies to print at least a portion of a first support structure operably positioned at least partially between the inner shell and the intermediate shell 314
Translate a print head of the fourth print assembly between a first radial position and a second radial position as the build plate is rotated 316
Deposit a fifth print material from a fifth print assembly of the one or more print assemblies to print at least a portion of a second support structure operably positioned at least partially between the intermediate shell and the outer shell 318
Translate a print head of the fifth print assembly between a third radial position and a fourth radial position as the build plate is rotated 320
Translate the build plate from the one or more print assemblies from a first axial position to a second axial position with a linear actuator assembly 322
Direct an airflow through the channel of the inner shell with a temperature control system 324
Heat a portion of the build plate 326
Transfer electrical power to the build plate during rotation of build plate through a rotary joint

FIG. 25

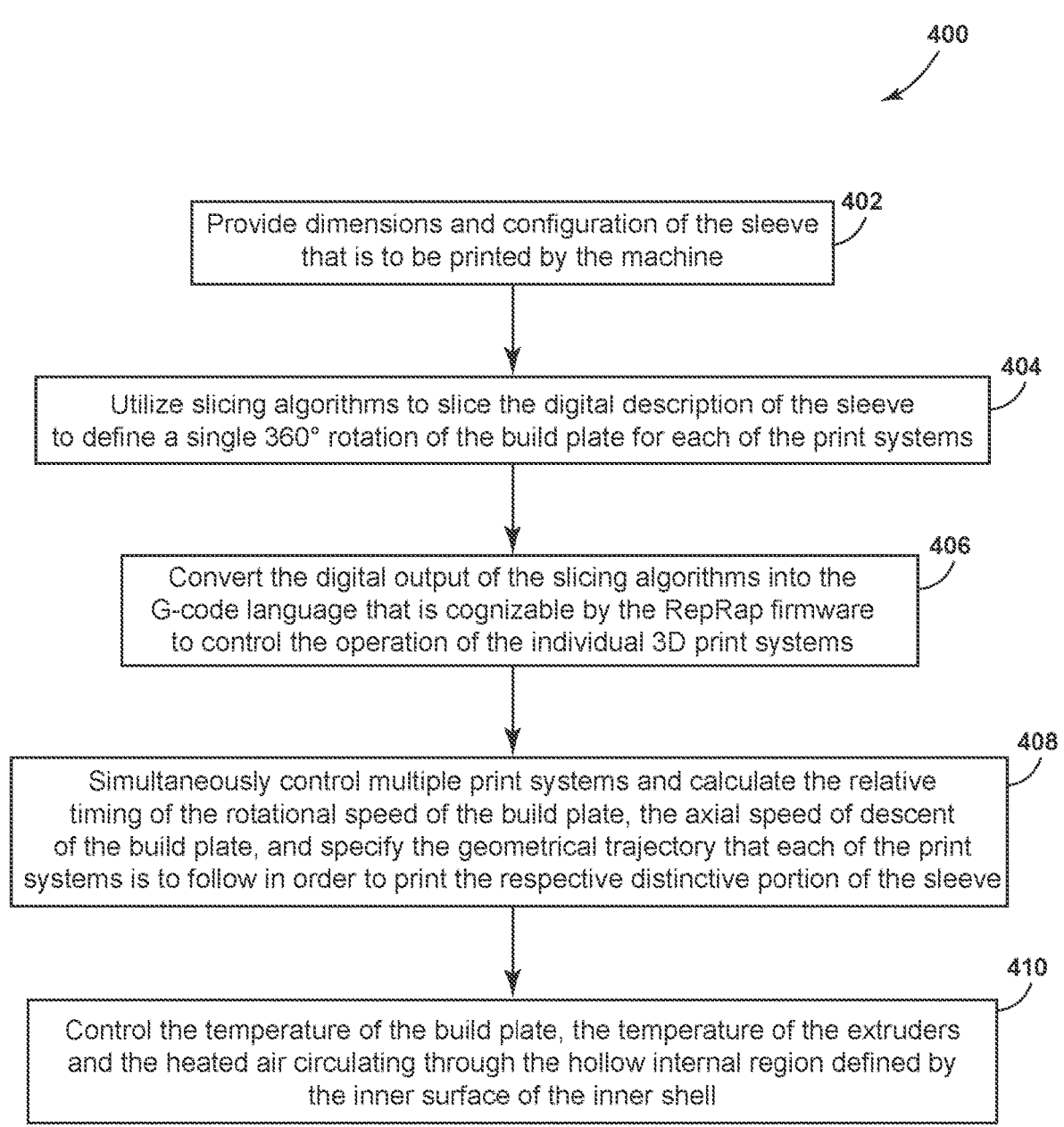

400

402
Provide dimensions and configuration of the sleeve
that is to be printed by the machine 404
Utilize slicing algorithms to slice the digital description of the sleeve
to define a single 360° rotation of the build plate for each of the print systems 406
Convert the digital output of the slicing algorithms into the
G-code language that is cognizable by the RepRap firmware
to control the operation of the individual 3D print systems 408
Simultaneously control multiple print systems and calculate the relative
timing of the rotational speed of the build plate, the axial speed of descent
of the build plate, and specify the geometrical trajectory that each of the print
systems is to follow in order to print the respective distinctive portion of the sleeve 410
Control the temperature of the build plate, the temperature of the extruders
and the heated air circulating through the hollow internal region defined by
the inner surface of the inner shell

FIG. 26

SLEEVES UNITARILY FORMED BY ADDITIVE MANUFACTURING FOR MOUNTING ON ROTATING SHAFTS OF COMMERCIAL PRINTING MACHINERY

CROSS-REFERENCE TO RELATED APPLICATIONS

Not applicable.

TECHNICAL FIELD

The invention relates to commercial printing machines and, in particular, to commercial sleeves, which are mounted on rotary mandrels of commercial printing machines, which can include, for example, flexographic printing machines, rotogravure printing machines, and offset printing machines, or on auxiliary sleeves that are known variously as adaptor sleeves, bridge sleeves or carrier sleeves.

BACKGROUND OF THE INVENTION

Commercial printing involves machines capable of printing images on a variety of surfaces and to serve a variety of industries, which include, for example, the flexible packaging printing industry, the offset printing industry, the publication printing industry, the décor printing industry, and the corrugated printing industry. Each commercial printing machine typically drives the rotation of a plurality of rotary mandrels at high rotational speeds. To each rotary mandrel can be selectively mounted one of a plurality of sleeves, some being commonly termed print sleeves, while others being commonly known variously as adaptor sleeves, bridge sleeves, or carrier sleeves (hereafter bridge sleeves) such as disclosed in the bridge sleeves mounted with air, as described in U.S. Pat. Nos. 5,782,181, 5,819,657, 6,688,226; and 6,691,614, the disclosures of which patents are hereby incorporated herein in their entireties by this reference for all purposes.

Each sleeve has a structure that elongates along a rotational axis of the sleeve and defines an internal surface that defines a hollow opening that extends through the sleeve along the rotational axis of the sleeve. When mounted on a mandrel, the sleeve and mandrel rotate as one unit. A print sleeve will be mounted on the external surface of a mandrel or an external surface of a bridge sleeve. When the print sleeve is mounted on a rotary mandrel of a commercial printing machine, then the mandrel and the print sleeve rotate as one unit during the intended operation of the printing machine. Similarly, when a print sleeve is mounted on a bridge sleeve that, in turn, is mounted on a rotary mandrel of a commercial printing machine, then the mandrel, the bridge sleeve, and the print sleeve rotate as one unit.

A typical way of making the portion of the sleeve that defines the internal surface forming the hollow interior that enables the sleeve to be slid onto the rotary mandrel when mounting the sleeve onto the mandrel involves wrapping a tape (made of fiberglass or other materials like polyester) impregnated in resin (UV-curable resin or resin that is thermosetting and epoxy-based or acrylic-based) around a forming mandrel. From the perspective of the manufacturers of the sleeves, one problem presented by sleeves made according to this method is the need for a specific forming mandrel dimensioned for each type of printing machine. For every possible machine mandrel diameter, at least one forming mandrel is required to have an external surface that is accordingly dimensioned. This requirement imposes a need for a large inventory of forming mandrels of the same diameter. Otherwise, having only one mandrel for each diameter sleeve limits the number of each diameter sleeve that can be made per hour or per day by the manufacturing facility.

In addition to the forming mandrels configured for making the core layer of fiberglass-impregnated resin, so-called construction mandrels are needed to support the fiberglass core during the various manufacturing processes that entail for example the application of additional layers of material on top of the fiberglass core in the manufacture of a multi-layer sleeve. The same problems noted above for forming mandrels also apply to construction mandrels. Thus, this need for construction mandrels dramatically increases the number of mandrels required to sustain commercial production in a sleeve manufacturing facility.

Moreover, because the mandrels (whether forming or construction) must be made according to strict diametrical tolerances (usually +/−0.005 mm), each mandrel is very expensive to make. Thus, acquiring these mandrels forces the sleeve manufacturing facility to incur significant costs before even attempting to manufacture a single sleeve.

Additionally, because each mandrel is made of steel, depending upon the mandrel's dimensions, a mandrel can weigh more than 500 kilograms. Such mandrels require special equipment, such as cranes, forklifts, etc., to move the mandrel into and out of storage at the manufacturing between uses to make a sleeve. The mandrels also are subject to being damaged from wear during use and ordinary handling between uses. Such mandrels likewise involve the risk of accidental injury for the personnel tasked with handling and using the mandrels.

Another problem in the use of a forming mandrel is the difficulty of working with the tapes impregnated with resin before being successively wrapped around the forming mandrel that is disposed horizontally. The tension of the tape must be precisely controlled while winding on the forming mandrel. If the tape is imprecisely set, then the resulting sleeve will fit either too loosely or too tightly on the mandrel of the commercial printing machine and thus become useless waste, which accounts for significant financial loss.

From the perspective of the users of the sleeves, there is the problem of disposing of spent sleeves because they are made of different layers of different thermoset materials, and at the end of the sleeve's useful life, the sleeve cannot be recycled by the user of the sleeve. Thus, the disposal of spent sleeves presents an environmental problem, as does the disposal of improperly formed sleeves that become waste.

In a flexographic printing environment, for example, a typical so-called printing plate is mounted on an external surface of a print sleeve or the external surface of a bridge sleeve. During the printing machine's operation, each mandrel rotating at very high revolutions per minute rotates the mounted printing plate to perform printing repeated functions on a thin substrate, typically plastic films such as polyester or polyamide, etc., cardboard, paper, or aluminum foil, which is threaded through the machine and moving in sequence against successive printing plates of respective different sleeves at very high speeds of the substrate. In flexographic printing, for example, each printing plate is etched to carry ink that is transferred onto the substrate running past multiple print sleeves rotating on the machine. Each printing plate typically prints a portion of the final image in a particular color. Each final image printed successively on the substrate is termed a "repeat" of the image. In the flexible packaging industry, for example, the final printed substrate is eventually cut to separate each repeat from the substrate so that the separated repeat can be folded and glued to form a package, such as a cereal box bearing the final image on the outside of the box. Substrates passing through a flexographic printing machine at eight hundred meters per minute are not uncommon.

In the flexographic printing industry, for example, to accommodate differently sized image repeats that are printed on the substrates passing through the machines, the diameters of the print sleeves must be varied accordingly to accommodate differently sized printing plates. The larger the image in each repeat, then the larger the diameter of the print sleeve needed to fit the printing plate bearing the image on the outer surface of the print sleeve. However, because the rotating mandrels on the flexographic printing machines must rotate at very high speeds, these mandrels made of steel must be made according to very strict tolerances of size and balance, and thus their manufacture is particularly exacting and expensive. It can be impractical to maintain large inventories of steel mandrels of different diameters that accommodate the mounting of print sleeves of different diameters that might be desired for any particular printing job.

This problem can be addressed by providing commercial sleeves that typically are formed as a multi-layer body that includes: a rigid external region defining a rigid outer surface for carrying a printing plate at the desired distance from the axis of rotation, an inner core that defines an inner surface contoured in accordance with the outer surface of the rotary steel mandrel of the printing machine; and an elastically compressible and radially deformable region, which is arranged against an outer surface of the inner core of the print sleeve. An additional intermediate spacer layer can be disposed between the inner surface of the rigid external region and the outer portion of the elastically compressible and radially deformable layer. Thus, these print sleeves have an internal core that defines an inner surface that is expandable radially by air pressure for mounting and dismounting the print sleeve to and from the mandrel. In its unexpanded state, as when a flexographic print sleeve is in storage before being mounted on the steel mandrel, the inner surface of the internal core has a diameter that is slightly less than the diameter of the outer surface of the rotating steel mandrel of a flexographic printing machine.

Each successive region of such a multi-layer sleeve is composed of a different material designed to perform a different desired function. However, each separate material must be connected to the immediately underlying region in some manner to form an integrated structure that is the print sleeve. A weakness in the traditional methods of making print sleeves with the distinct regions formed of different materials stems from eventual failures that are prone to occur at the interfaces between any two of the distinct regions. Such weakness is a natural consequence of poor adhesion between the different materials forming each region.

3D printing systems based on a cylindrical coordinate system are known, and an example is disclosed in United States Patent Application Publication No. 2020-0070418 to Wang et al, which is hereby incorporated herein in its entirety for all purposes by this reference. The long-felt need to apply 3D printing technology to the manufacture of flexo sleeves, in general, is evident from documents like US Patent Application Publication No. 2016-0238065 to Otten, which is hereby incorporated herein in its entirety for all purposes by this reference. Though Otten published in 2016 and suggests the possibility of using 3D technology to generate an intermediate cylindrical region of a flexo sleeve and then attach that intermediate cylindrical region to other sections of a flexo sleeve in a further processing step, the applicant is not aware that any commercially viable sleeve produced in accordance with Otten has been accepted by the market.

The 3D printing of hollow cylindrical bodies extrudes material from a printing head to lay down a circular loop of material that is joined at the opposing ends of the loop and then indexes vertically by the thickness of the loop of material to begin laying down a successive loop of material on top of the prior loop of material. Where the opposite ends of each loop of deposited material meet, a butting anomaly is created, and this butting anomaly, which typically is called a zipper defect, adversely affects the fitting of the sleeve onto the mandrel or the outer surface of a bridge sleeve. The zipper defect in the inner surface of the sleeve's core creates an escape channel for the pressurized air flow that is necessary to expand the inner surface of the sleeve's core sufficiently to mount the sleeve onto the mandrel. It becomes impossible to generate sufficient air pressure between the mandrel and the core to expand the core sufficiently to mount the sleeve onto the mandrel. Because the zipper defect cannot be eliminated by machining the finished core, the entire sleeve becomes useless and must be discarded as waste.

The interfaces between successive loops of deposited material likewise create surface anomalies that require machining. These interfaces between successive loops of deposited material also constitute sites where delamination is prone to occur due to inadequate fusing between successively deposited loops of extruded material. One technique for minimizing inadequate fusing between successive loops of extruded material is disclosed in United States Patent Application Publication No. 2023-0166450, which is hereby incorporated herein in its entirety by this reference for all purposes and calls for providing a heating element adjacent the nozzle of the printing head and directing heat at the upper surface of the underlying layer of material to improve the melting and adhesion of the overlying layer of material being extruded from the adjacent nozzle of the printing head.

Moreover, the desire for repeated usage of the sleeve also imposes durability requirements on sleeves that are commercially accepted in the marketplace. Such durability of the sleeves is challenged due to the chemicals used in printing and the harsh, chemically caustic materials used in cleaning the sleeves between uses.

A bridge sleeve for a flexographic printing machine is perhaps one to two meters in length, is cylindrical, and includes at least the aforementioned distinct annular regions from the inner core layer to the outermost rigid surface of the bridge sleeve. Successive ones of the annular regions must be connected to one another in some manner to form an integrated structure, that is, the bridge sleeve. A weakness in the traditional methods of making bridge sleeves with the distinct annular regions stems from eventual failures that are prone to occur at the interfaces between any two of the distinct annular regions. Each annular region is separately formed as a cylindrical shell, and then the interfacing cylindrical surfaces of adjacent annular regions are typically attached by an adhesive that is subject to degradation over time.

OBJECTS AND SUMMARY OF THE INVENTION

Therefore, it is an object of the present invention to disclose a sleeve that can be mounted onto one or more rotating mandrels of a commercial printing machine, which includes but is not limited to a flexographic printing machine. The sleeve thus can be any of different types. In the field of flexographic printing for example, the sleeve can be a print sleeve that mounts directly onto the mandrel of the printing machine or can be a bridge sleeve that mounts directly onto the mandrel of the printing machine and on which a print sleeve can be mounted. The print sleeve can include a single distinct shell of generally conical shape or cylindrical shape. However, a more complicated print sleeve or bridge sleeve can include at least three distinct annular regions that are being integrally formed at the same time as a unitary structure and thus without any need thereafter to adhere to one another in manufacturing steps separate from the manufacture of each distinctive region of the completed sleeve. Briefly, this object is achieved using a 3D printing technique so that at least three distinct regions are being printed at the same time as the printing platform moves downwardly from a horizontal printing plane where each one of multiple printing heads is extruding a separate road of material onto the immediately underlying helical road of the body that is the precursor to the finished sleeve while each of the other ones of the multiple printing heads is simultaneously printing that same helical road of the sleeve.

The 3D printing machine that makes the 3D print sleeve, according to the invention, has multiple printing heads, and each of the printing heads is aimed to extrude material at different radial locations within a horizontal printing plane. The 3D print sleeve is built up helical layer upon helical layer deposited in a horizontal printing plane along a vertically disposed axis, which coincides with both the build axis of the machine and the rotational axis of the sleeve. The support platform of the 3D printing machine moves vertically downward from the aforementioned horizontal printing plane as the multiple printing heads lay down layer upon layer of print material. Each layer of print material is sometimes called a road, as the road nomenclature adverts to the road being traveled by the printing heads as the 3D machine's build plate rotates and descends vertically from the print plane in which the printing heads extrude the print material. The discharge of the extruded material from the printing heads continues until the two-meter length (or whatever the final length) of the 3D-printed sleeve is attained. Because the properties of each of the distinctive regions of the 3D printed sleeve differ from each other, one of the printing heads is deployed to print the innermost region, one of the printing heads is deployed to print the outermost region, and one or more of the printing heads is/are deployed to print one or more region(s) that is/are between the innermost and outermost regions.

In an advantageous embodiment, the 3D printing apparatus includes a controller that manages the kinematics between multiple printing heads, a build plate that moves simultaneously vertically along a build axis and rotationally around the build axis, and a temperature control sub-assembly. Each of the multiple printing heads is movable in a radial direction toward and away from the build axis in the printing plane, and the build platform is movable both vertically and rotationally to permit continuous and simultaneous helical printing of different radial sections of the sleeve that is being 3D printed.

In an advantageous aspect of the present invention, the helical deposition of material extruded from the nozzle of each printing head assures the absence of any butting anomalies that otherwise occur with layer-by-layer stacked deposition of material in conventional 3D printing of cylindrical bodies. The helical 3D printing of the innermost surface of a sleeve, according to this aspect of the present invention, prevents the sleeve from exhibiting any zipper defect that would result in an unacceptable sleeve and produce undesirable manufacturing waste.

In an advantageous embodiment, the temperature control sub-assembly is continuously adjustable in the vertical direction to maintain a heated air column at the desired temperature inside the 3D printed sleeve during the 3D printing thereof. The temperature control sub-assembly is also configured to form a closed circuit for the circulation of the heated air, thereby reducing the energy demand from the heating element that generates the heat needed to maintain the temperature of the air inside the sleeve during the printing of the sleeve. The heated air flowing through the hollow interior of the sleeve during the 3D printing thereof ensures unitary adhesion between each helical ribbon of deposited material extruded from the printing heads in successive rotational cycles of the vertically descending build plate.

In an advantageous embodiment, the temperature control sub-assembly creates a confined space inside the central hollow opening through the sleeve. The continuous flow of heated air through this confined space facilitates uniform controlled heating that prevents the occurrence of structural anomalies in the body of the sleeve that otherwise would create rotational imbalances and/or structural weaknesses in the sleeve.

It is another advantage of the present invention to be able to make sleeves without having to use a forming mandrel.

It is another advantage of the present invention to be able to build up sleeves without having to use either a forming mandrel or a construction mandrel, thereby eliminating significant manufacturing costs attributed to requiring mandrels to make the sleeves.

It is a further advantage of the present invention to be able to build up sleeves without having to use either a forming mandrel or a construction mandrel, thereby eliminating the risk of accidental injury for the personnel tasked with handling and using the mandrels.

It is an additional advantage of the present invention to be able to build up sleeves without having to use a forming mandrel, thereby eliminating the risk of producing sleeves that fit either too loosely or too tightly on the mandrel of the commercial printing machine and thus become useless manufacturing waste.

In an advantageous embodiment, the 3D printed sleeve provides an internal structure having a majority of the interior taken up by essentially weightless void space rather than structural elements that contribute weight to the sleeve. The reduced weight of sleeves made in accordance with the present disclosure facilitates handling of the sleeves relative to the effort required to handle conventional sleeves. Easier handling means less risk of injury to workers and less incidence of sleeves being damaged during the handling thereof. The reduced weight of sleeves made in accordance with the present disclosure also reduces the sleeve's moment of inertia and accordingly reduces the energy required by the motors of the printing machine to rotate the rotary mandrels on which the sleeves are mounted.

It is an advantage that the entire sleeve in accordance with the present disclosure is formed of thermoplastic material that enables spent sleeves to be recycled by being ground up and remelted to form a material that can be repurposed. In this way, sleeves in accordance with the present disclosure are far more friendly to the environment than conventional sleeves.

BRIEF DESCRIPTION OF THE DRAWINGS

In the following, the invention will be explained in more detail by means of exemplary embodiments thereof referring to the figures in which:

FIG. 25 schematically illustrates an embodiment of a method for additively manufacturing a print sleeve in accordance with various aspects of the present disclosure; and FIG. 26 schematically illustrates an embodiment of control logic executable by a computing system for modeling the sleeve that is to be printed by a machine and producing the modeled sleeve in accordance with aspects of the present subject matter.

Throughout the figures, the same reference numerals denote the same objects.

DETAILED DESCRIPTION OF THE INVENTION

Figure 1:
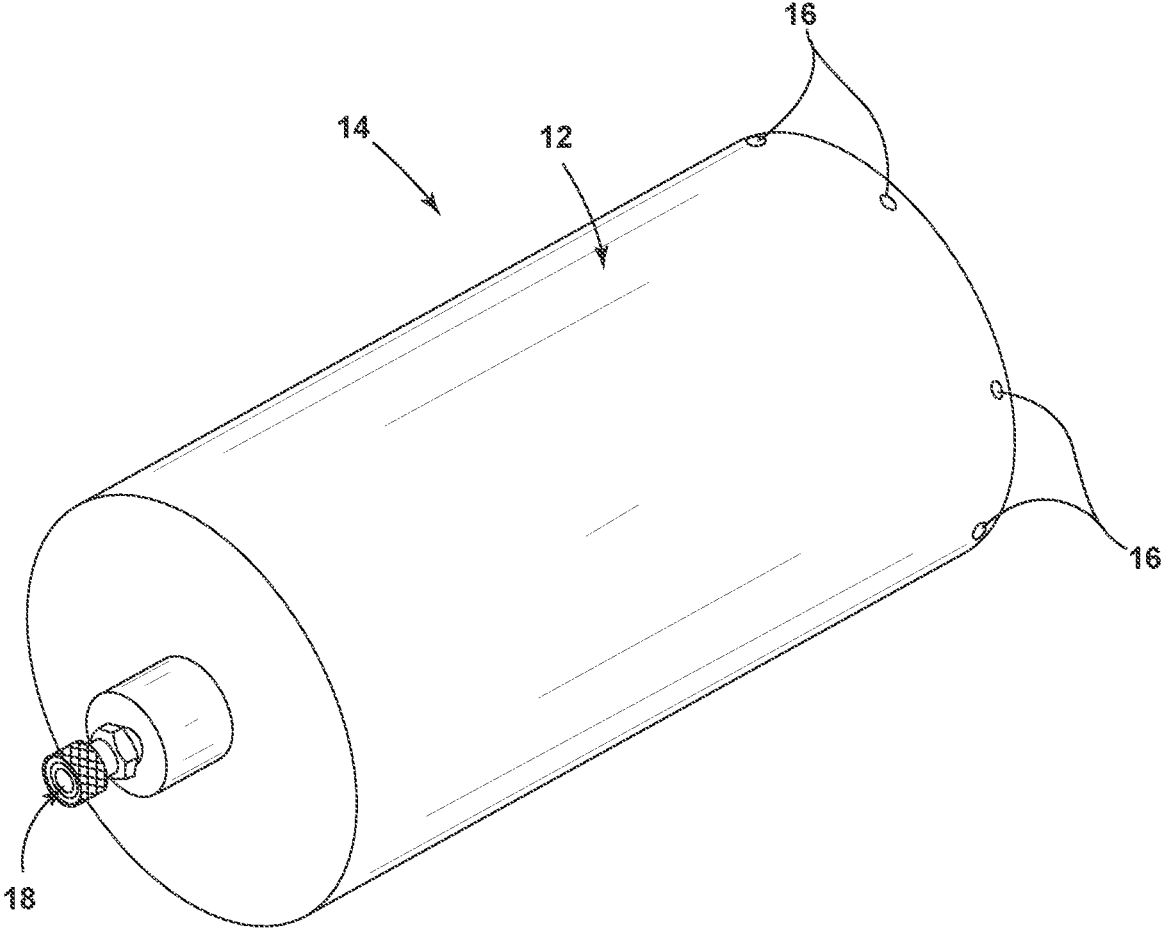
FIG. 1 is an elevated perspective view of an example of a printing cylinder that can be air-mounted with a print sleeve in accordance with various aspects of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action without necessarily requiring or implying any actual relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features unless otherwise specified herein. The terms "upstream" and "downstream" refer to the relative direction with respect to a flow or movement direction of a material and/or a fluid. For example, "upstream" refers to the direction from which a material and/or a fluid flows, and "downstream" refers to the direction to which the material and/or the fluid moves. The term "selectively" refers to a component's ability to operate in various states (e.g., an ON state and an OFF state) based on manual and/or automatic control of the component. The term "radial" defines a direction that is perpendicular to an axis of rotation and the term "axial" defines a direction that is parallel to the axis of rotation.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

For the purposes of the present disclosure, the term "extrudable" refers to composition, compound, substance, material, etc., which is sufficiently malleable, pliable, thermoplastic, etc., such that it may be forced through an extrusion orifice or die.

For the purposes of the present disclosure, the term "fusible" refers to a thermoplastic composition, substance, material, etc., which may be fused, sintered, joined together, combined, etc., by the application of heat.

For the purposes of the present disclosure, the term "printable material" refers to a composition, substance, material, etc., which may be formed into a three-dimensional (3D) article, device, component, object, structure, part, etc., by a three-dimensional (3D) printing technique.

For the purposes of the present disclosure, the term "three-dimensional (3D) printing" (also known as "additive printing" and "additive manufacturing") refers to any of various processes, techniques, etc. (e.g., coating, spraying, depositing, applying, extruding, fusing, sintering, etc., or any combination thereof) for making a three-dimensional (3D) article, device, object, component structure, part, etc., from a three-dimensional (3D) model, other electronic data source (e.g., computer-assisted drawing (CAD) program file, stereolithographic (STL) file, etc.), etc., through additive processes in which successive layers of material (e.g., filaments, films, powders, particles, pellets, etc.) may be laid down, for example, under computer control. Three-dimensional (3D) printing processes, techniques, etc., may include, for example, fused filament fabrication (FFF), selective laser sintering (SLS) (also referred to herein interchangeably as selective laser melting (SLM)), inkjet head 3D printing (also referred to herein interchangeably as inkjet 3D printing), etc.

For the purposes of the present disclosure, the term "fused filament fabrication (FFF) (also referred to herein interchangeably as fused deposition modeling (FDM), fused extrusion deposition (FED), or Plastic Jet Printing (PJP))" refers to a three-dimensional (3D) printing technique wherein a thermoplastic filament (preformed or formed in situ) is extruded from an extrusion (printing) nozzle (also referred to interchangeably as a "printing head") in layers which, due to being liquefied, molten, softened, melted, etc., adhere (fuse) together to form the three-dimensional (3D) article, device, component, object, structure, part, etc.

For the purposes of the present disclosure, the term "fused filament fabrication (FFF) printer" refers to any three-dimensional (3D) printer which operates by using a fused filament fabrication (FFF) technique.

For the purposes of the present disclosure, the term "road" refers to a continuous length of liquefied, molten, melted, or softened material that is laid down after the extrusion of the material from a fused filament fabrication (FFF) printer or additive manufacturing machine.

Referring now to FIGS. 1-10, various examples of print sleeves 10 are illustrated in accordance with various aspects of the present disclosure, which describes how to use 3D printing technology to make the sleeves 10 with the understanding that it is the main body of the sleeve 10 that is described. Because describing the 3D printing of the main body of the sleeve 10 is an important concern herein, discussion of post-print processing is de-emphasized. Post-print processing refers to such conventional processing of the sleeve's main body that occurs after the 3D printing of the main body of the sleeve 10. Such post-print processing may be desired to conform the main body into a commercially saleable sleeve 10. Such post-print processing typically includes one or more of the following processing operations: smoothing the outermost surface, drilling holes, cutting the opposite ends of the main body to size the length of the sleeve 10, and fitting the opposite ends of the sleeve 10 with end flanges that serve one or more functions of the sleeve 10. Thus, the sleeves and their main bodies are used interchangeably herein as the context deems appropriate.

Embodiments of the main body of the print sleeve 10 schematically shown in various aspects FIGS. 1-10 can be generally tubular and can have parallel or tapered cores depending on the different types of printing mandrels available (parallel or tapered). In various examples, the print sleeve 10 may be implemented within a flexographic printing machine, which may have one or more rotating cylindrical mandrels, typically formed of steel or steel plus carbon fiber. Each mandrel may be capable of carrying one of the one or more print sleeves 10 that in turn carry printing plates (not shown) on which images can be inked to print repetitions of the image onto a substrate that passes through nips, which are partially formed by the print printing plates carried by the print sleeves 10. Each printing plate carried on a print sleeve 10 can be configured to define and/or carry printing indicia that form a separate part of the final image that is printed on the substrate as the substrate is run past all of the print sleeves 10 mounted on the flexographic printing machine. The part of the final image printed on the substrate by the printing plate of a single print sleeve 10 might be all of a particular color of the final image, for example.

As shown in FIGS. 1-10, a generally cylindrical print sleeve 10 is provided that can be mounted onto an outer surface 12 of a printing mandrel that is generally designated by the numeral 14 in FIG. 1. Moreover, in various instances, the printing mandrel 14 can define holes 16 that are capable of providing pressurized air through a valve 18 from an air source (not shown). Although any pressure can be provided, pressures greater than about 65 pounds per square inch (psi) may be utilized. In some instances, particularly where mounting and dismounting the print sleeve 10 is aided by discharging pressurized air from within the mandrel 14, the print sleeve 10 can have a smaller inside diameter than the diameter of the exterior surface 12 of the printing mandrel 14.

Because the inner surface 12 of some print sleeves 10 is formed of a material that is repeatedly elastically and resiliently expandable and retractable to a limited extent, by providing pressurized air against the inner surface 12, the diameter of the inner surface 22 of a print sleeve 10 can be altered (e.g., increased) to be capable of fitting onto the outer surface 12 of a printing mandrel 14 such as a mandrel of a printing machine (not shown). Such an increase in the diameter of the inner surface 12 of the print sleeve 10 is caused by the introduction of pressurized air between the external surface 12 of the mandrel 14 of the printing machine and the inner surface 22 of the print sleeve 10 is believed to be typically less than 1 millimeter. For example, to mount the print sleeve 10 onto the mandrel 14, a user can position the sleeve 10 onto the mandrel 14 as pressurized air is simultaneously supplied. Once the entire length of the sleeve 10 has been positioned onto the mandrel 14, then the pressurized air can be turned off, thereby allowing the diameter of the inner surface 22 of the print sleeve 10 to shrink and resulting in the print sleeve 10 being retained on the printing mandrel 14 in a manner that assures an absence of relative rotation between the inner surface 22 of the sleeve 10 and the external surface 12 of the mandrel 14. To utilize the print sleeve 10, a printing plate (not shown), which defines the image to be printed on a substrate (not shown), can then be attached to the outer surface 38 (FIG. 4) of the print sleeve 10.

Figure 3:
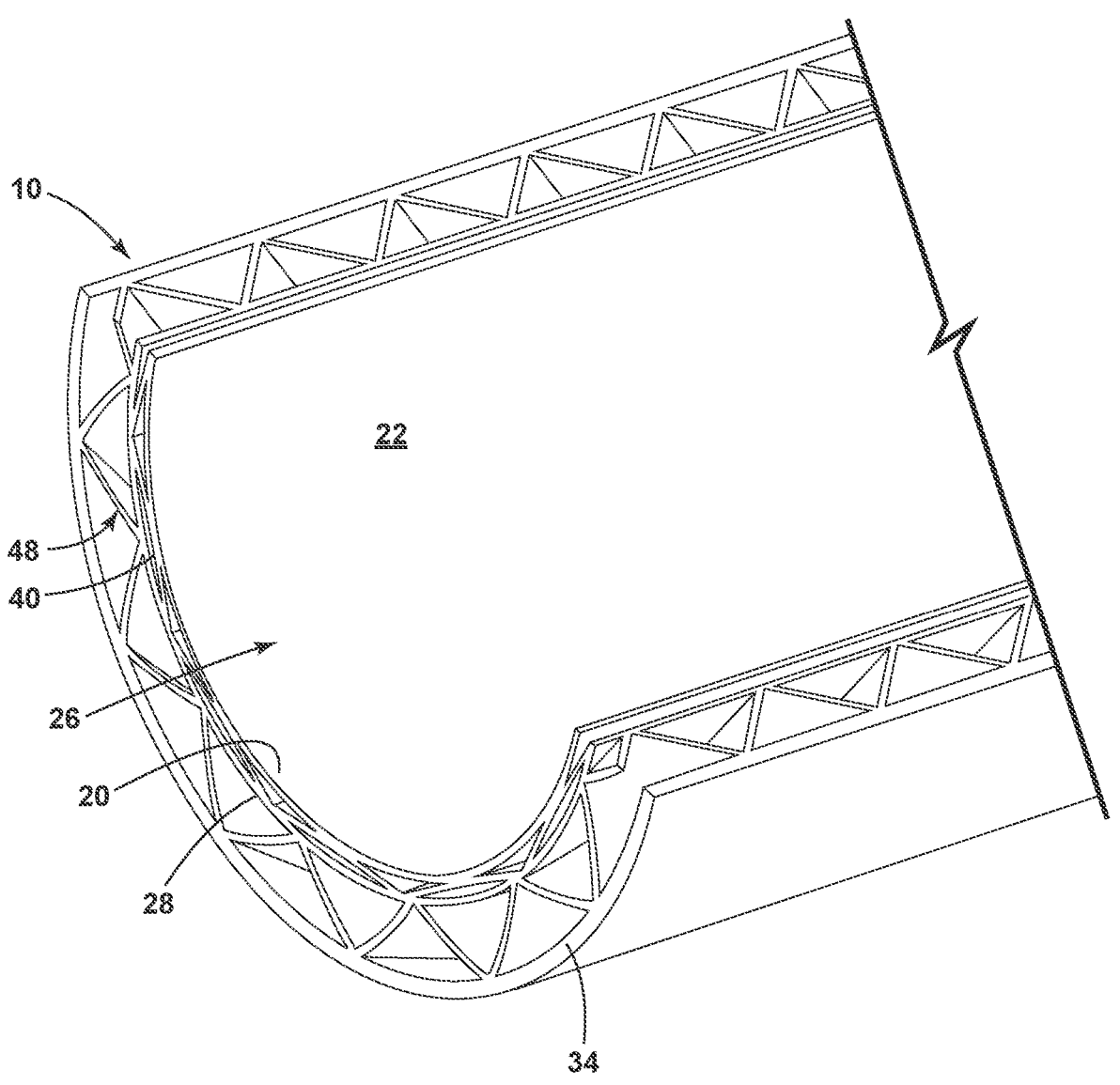
FIG. 3 is a cross-sectional view of the print sleeve of FIG. 2 taken along the line III-III of FIG. 2.
Figure 4:
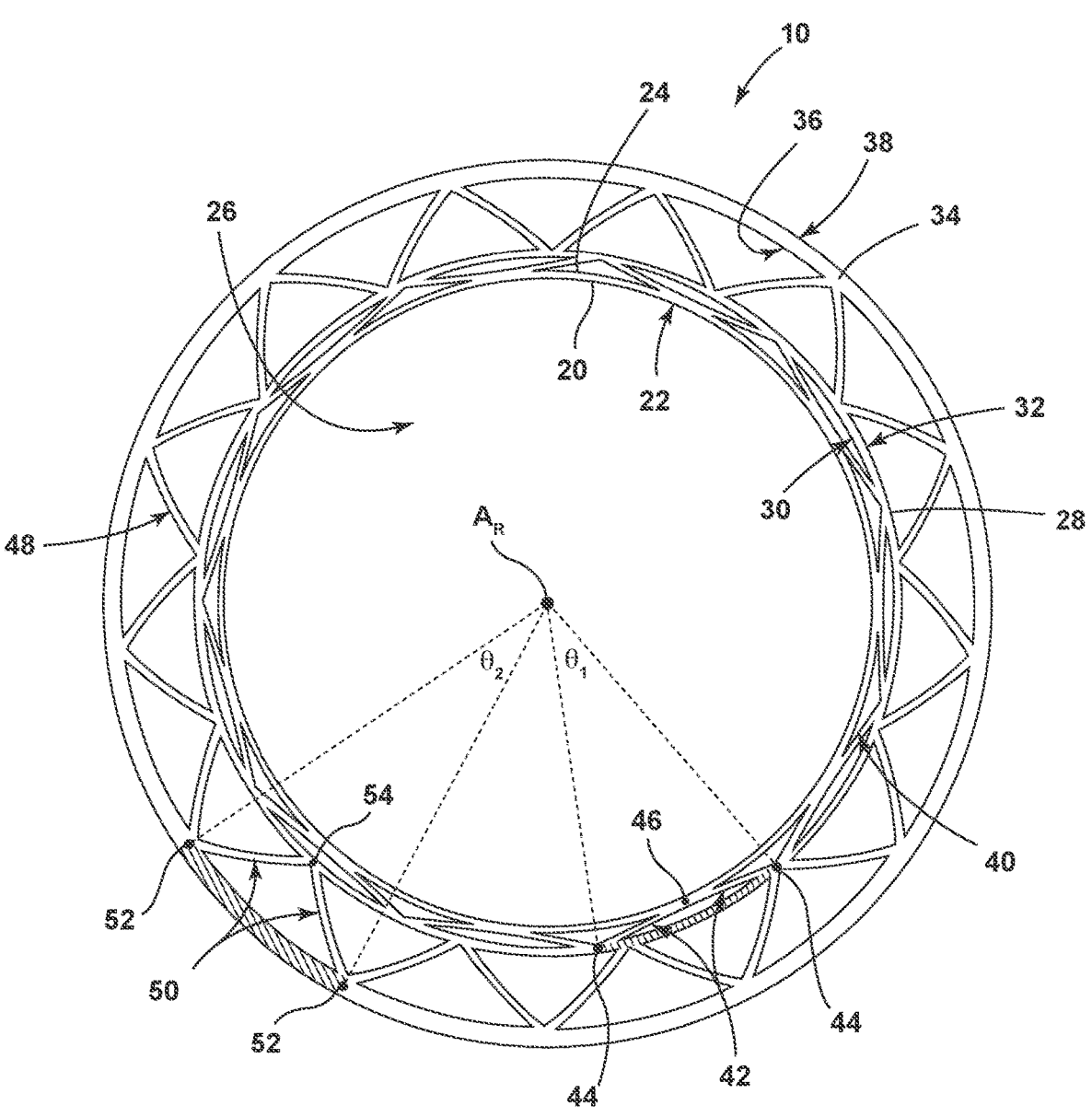
FIG. 4 is a cross-sectional view of the print sleeve of FIG. 2 taken along the line IV-IV of FIG. 2.

Illustrative embodiments of a print sleeve 10 of the present disclosure are depicted in more detail in FIGS. 2-10. For instance, as illustrated in the cut-away view of FIG. 3, the print sleeve 10 can include an inner shell 20. As shown in FIG. 4, the inner shell 20 can define a cylindrical inner surface 22 and a cylindrical outer surface 24 that is generally concentric with an inner surface 22. However, in other examples, the inner surface 22 and the outer surface 24 may be non-cylindrical, such as conical for example, without departing from the scope of the present disclosure. The inner surface 22 of the inner shell 20 can define a hollow internal region 26 of the print sleeve 10, which region 26 affords space for the inner surface 22 of the inner shell 20 to be positioned onto the outer surface 12 of the printing mandrel 14 (FIG. 1). In various examples, any of a variety of materials used in forming print sleeves 10 can be utilized to form the inner shell 20. In some embodiments, the inner shell 20 is formed of an expandable, high-rigidity material. Such materials nonetheless are chosen to have mechanical properties that allow the inner shell 20 to be resiliently expandable and contractable so that the inner shell 20 can be repeatedly expanded and contracted without adverse consequences to form an interference fit without relative slippage with the outer surface 12 of the printing mandrel 14 (FIG. 1).

As used herein, the term "expandable" refers to a material that can expand a certain radial distance relative to the axis of rotation $A_R$ upon the application of air at a certain pressure. It would be appreciated, however, that the amount of expansion for the inner shell 20 of the sleeve 10 is believed to be typically less than one millimeter. The actual amount of radial expansion can generally vary depending on a variety of factors, such as the diameter of the inner shell 20 of the sleeve 10, the interference fit utilized, the axial length of the sleeve 10, the mechanical properties of the material(s) forming the inner shell 20 of the sleeve 10, etc.

As shown in FIG. 3 for example, the print sleeve 10 also can include an intermediate shell 28. In various examples, the intermediate shell 28 can be utilized to increase the thickness of the print sleeve 10, as well as to allow the inner shell 20 to adequately expand for mounting and demounting the sleeve 10 onto the printing cylinder (FIG. 1). The inner shell 28 desirably provides a rigid backstop and is essentially not expandable radially. As schematically shown in FIG. 4 for example, an inner surface 30 of the intermediate shell 28 can be positioned outwardly of the inner shell 20 relative to an axis of rotation $A_R$ of the sleeve 10. The intermediate shell 28 also can define an outer surface 32, which may be generally concentric with the inner surface 30 about the axis of rotation $A_R$. In general, the intermediate shell 28 can be configured with a thickness measured in the radial direction from the axis of rotation $A_R$ of the sleeve 10, and this thickness can vary to accommodate different embodiments of the sleeve 10. For instance, the thickness utilized can vary depending on a variety of factors, such as the hardness and other mechanical properties of the material forming the intermediate shell 28, the diameter of the sleeve 10 and/or intermediate shell 28, the axial length of the sleeve 10 and/or intermediate shell 28, the amount of air pressure applied to mount or demount the sleeve 10, the interference fit utilized, etc.

Referring further to FIGS. 2-10, the sleeve 10 also can contain one or more outer shells 34 in addition to the inner shell 20 and/or the intermediate shell 28. The one or more outer shells 34 can be used to add further radial thickness to the sleeve 10 or as a cover layer for the sleeve 10. In some examples, such as depicted in FIG. 4, the outer shell 34 can define a cylindrical inner surface 36 and a cylindrical outer surface 38. In various examples, the sleeve 10 can contain additional shells disposed internally of the outer shell 34 without departing from the teachings provided herein. In general, the outer shell 34 and the aforementioned additional shells disposed internally of the outer shell 34, can be made from any of a variety of materials. For example, the outer shell 34 can be made from a rigid material and/or non-rigid material. For example, the outer shell 34 can be a generally rigid material having a hardness greater than the hardness of the intermediate shell 28. However, the hardness of any shell described herein may be equal to or varied from any other shell in any manner for particular desired embodiments of the sleeve 10 without departing from the scope of the present disclosure.

In some examples, the outermost surface of the print sleeve 10, e.g., an outer surface 38 of the outer shell 34 such as shown in FIG. 4, desirably can be provided with a smooth finish to a tolerance capable of supporting a printing plate thereon. For example, the outer surface 38 may be round and smooth enough so that the combined Total Indicated Runout (TIR) of the print sleeve 10, which can be determined according to techniques that are known in the art, is less than about 0.020 millimeters. Moreover, if desired, the outer surfaces of other layers, such as the intermediate shell 28 or the outer shell 34, also can be provided with a smooth finish.

As illustrated in FIGS. 2-10, one or more support structures may be positioned and/or operably coupled with any of the shells of the sleeve 10. For instance, as shown in FIG. 3, a first support structure 40 may be configured to contact the inner shell 20 and the intermediate shell 28 of the print sleeve 10. The first support structure 40 is integrated with both the inner shell 20 and the intermediate shell 28 to form a unitary structure.

As schematically illustrated in FIG. 4, when projected onto a flat plane that is disposed to extend normal to the axis of rotation $A_R$, the shape of this projection of the first support structure 40 onto the flat plane may be defined by the shapes of a plurality of first solid portions 42 that are repeated end to end around one complete circumferential path around the sleeve 10. For the sake of illustration and referring to FIG. 4, a section of the intermediate shell 28 is cross-hatched to call attention to the location of a first repetition of a first solid portion 42 of the first support structure 40. The first solid portion 42 is defined by a pair of legs that have opposite ends connected to each other and to the inner shell 20 at a point designated 46 in FIG. 4, while the opposite ends of each leg of the first solid portion 42 are connected to the intermediate shell 28 at points designated 44 in FIG. 4. In the embodiment depicted in FIG. 4, each leg of a first solid portion 42 extends between the adjacent contact points 44 and 46 in more of a circumferential direction than radially with respect to the axis of rotation $A_R$ as each leg extends between of the inner shell 20 and the intermediate shell 28. In other words, the leg spans a greater distance in the circumferential direction than the span of the leg in the radial direction. However, in alternative configurations of the first support structure 40, each leg of a first solid portion 42 can extend between the adjacent contact points 44 and 46 a greater distance in the radial direction than in the circumferential direction or equal distances in both the radial and circumferential directions with respect to the axis of rotation $A_R$ as each leg extends between of the inner shell 20 and the intermediate shell 28.

The contact points 44 of the first solid portion 42 also may be defined by a first central angle $\theta_1$. However, the first support structure 40 is integrated with the intermediate shell 28 to form a unitary structure. As shown in FIG. 4, when moving around one complete circumferential path around the sleeve 10, the first solid portion 42 is repeated a number of times, and the repetitions of the solid portion 42 are connected end to end around one complete circumferential path around the sleeve 10. Each pair of the contact points 44 defines one repletion of the first solid portion 42, and the sum of all of the first central angles $\theta1$ equals 360°. The number of contact points 46 equals the number of repetitions of the first solid portion 42 around one circumferential trip around the sleeve 10. The number of such repetitions of the first solid portion 42 in a particular first support structure 40 will depend for example on the diameter of the inner surface 30 of the intermediate shell 28 and the shapes of the legs of the first solid portion 42. Apart from the plurality of legs defining the first solid portions 42 of the first support structure 40, there is empty space between the inner shell 20 and the intermediate shell 28.

Figure 6:
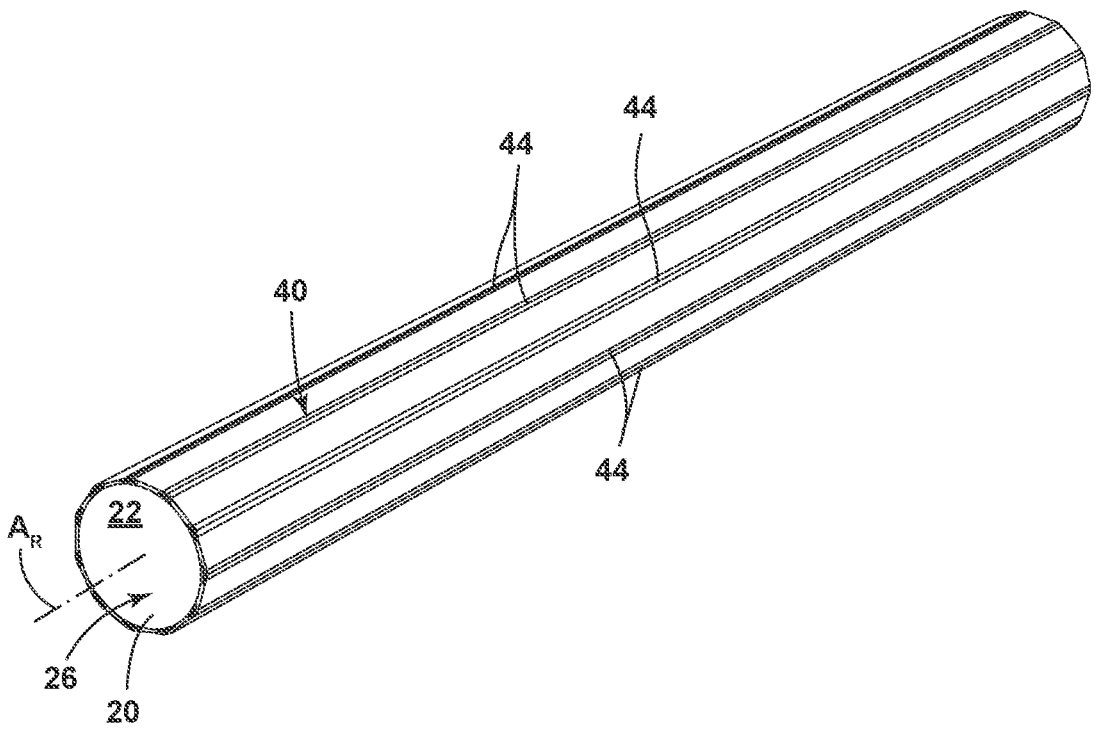
FIG. 6 is an elevated perspective view of an embodiment of a first support layer of an embodiment of a multi-layer print sleeve in accordance with various aspects of the present disclosure.

With further reference to FIG. 6, which schematically shows what would be seen if the intermediate shell 28 were somehow to be eliminated to reveal only the first support structure 40 connected to the inner shell 20, the positions of the contact points 44 with the intermediate shell 28 would be radially aligned along the axial length of the sleeve 10. As such, the positions of the contact points 44 would form lines along the axial direction of the sleeve 10. The lines would be generally parallel to one another in the axial direction. In some desired embodiments of the sleeve 10, the first support structure 40 may generally be resiliently compressible in the radial direction.

In accordance with an advantageous aspect of the present invention, the first support structure 40 desirably is configured to provide the function of resilient compressibility between the inner shell 20 and the intermediate shell 28 to allow sufficient expansion of the inner surface 22 of the inner shell 20 to be able to mount and dismount the sleeve 10 from a mandrel 14, whether the mandrel 14 is on a printing machine or is functioning as a construction mandrel. The amount of compressibility of the first support structure 40 will be based on the cross-sectional shape of the first support structure 40, among other factors such as the thickness of the solid portions 42 defining the shape of the first support structure 40 and the composition of the material extruded to form the first support structure 40.

As the first support structure 40, the inner shell 20 and the intermediate shell 28 are desirably formed of the same thermoplastic material in a simultaneous 3D printing thereof as described herein according to an aspect of the present invention, the first support structure 40 is integrated with both the inner shell 20 and the intermediate shell 28 to form a unitary structure. Such a unitary structure avoids the problems that otherwise affect compressible layers formed of different material than the material that forms the inner shell 20 and the intermediate shell 28 in conventional sleeves.

Additionally, the large proportion of empty space within the first support structure 40 desirably reduces the overall weight of the sleeve 10 relative to the weight of a conventional sleeve.

Referring back to FIGS. 2-4 and 7 for example, a second support structure 48 may be configured to contact the intermediate shell 28 and the outer shell 34 of the print sleeve 10. For instance, as shown in FIG. 3, a second support structure 48 is integrated with the outer shell 34, the intermediate shell 28, the first support structure 40, and the inner shell 20 to form a unitary structure.

As schematically illustrated in FIG. 4, when projected onto a flat plane that is disposed to extend normal to the axis of rotation $A_R$, the shape of this projection of the second support structure 48 onto the flat plane may be defined by the shapes of a plurality of second solid portions 50 that are repeated end to end around one complete circumferential path around the sleeve 10. For the sake of illustration and referring to FIG. 4, a section of the outer shell 34 is cross-hatched to call attention to the location of a first repetition of a second solid portion 50 of the second support structure 48. The second solid portion 50 is defined by a pair of legs that have opposite ends connected to the outer shell 34 at a pair of points designated 52 in FIG. 4, while the opposite ends of each leg of the second solid portion 50 are connected to each other and to the intermediate shell 28 at a point designated 54 in FIG. 4. Each leg of a second solid portion 50 extends between the adjacent contact points 52 and 54 in a circumferential direction and radially with respect to the axis of rotation $A_R$ as each leg extends between of the outer shell 34 and the intermediate shell 28 in the exemplary embodiment depicted in FIG. 4. Desirably, the leg spans a greater distance in the radial direction than the span of the leg in the circumferential direction. However, in alternative configurations of the second support structure 48, each leg of a second solid portion 50 can extend between the adjacent contact points 52 and 54 a greater distance in the circumferential direction than in the radial direction or equal distances in both the radial and circumferential directions with respect to the axis of rotation $A_R$ as each leg extends between of the outer shell 34 and the intermediate shell 28.

The contact points 52 of the second solid portion 50 also may be defined by a second central angle $\theta_2$. In some examples, such as the one illustrated in FIG. 4, the second central angle $\theta_2$ may be less than the first central angle $\theta_1$. As such, the second support structure 48 may have more contact points 52 with the outer shell 34 than the contact points 44 between the first support structure 40 with the intermediate shell 28. However, the second support structure 50 is integrated with the outer shell, the intermediate shell 28, the first support structure 42, and the inner shell 20 to form a unitary structure.

As shown in FIG. 4, when moving around one complete circumferential path around the sleeve 10, the second solid portion 50 is repeated a number of times, and the repetitions of the second solid portion 50 are connected end to end around one complete circumferential path around the sleeve 10. Each pair of the contact points 52 defines one repletion of the second solid portion 50, and the sum of all of the second central angle θ2 equals 360°. The number of contact points 54 equals the number of repetitions of the second solid portion 50 around one circumferential trip around the sleeve 10. The number of such repetitions of the second solid portion 50 in a particular second support structure 48 will depend for example on the diameter of the outer surface 33 of the intermediate shell 28, the diameter of the inner surface 36 of the outer shell 34 and on the shapes of the legs of the second solid portion 50.

Apart from the plurality of legs defining the solid portions 50 of the second support structure 48, there is empty space between the outer shell 34 and the intermediate shell 28. Thus, the large proportion of empty space within the second support structure 48 desirably reduces the overall weight of the sleeve 10 relative to the weight of a conventional sleeve.

Figure 7:
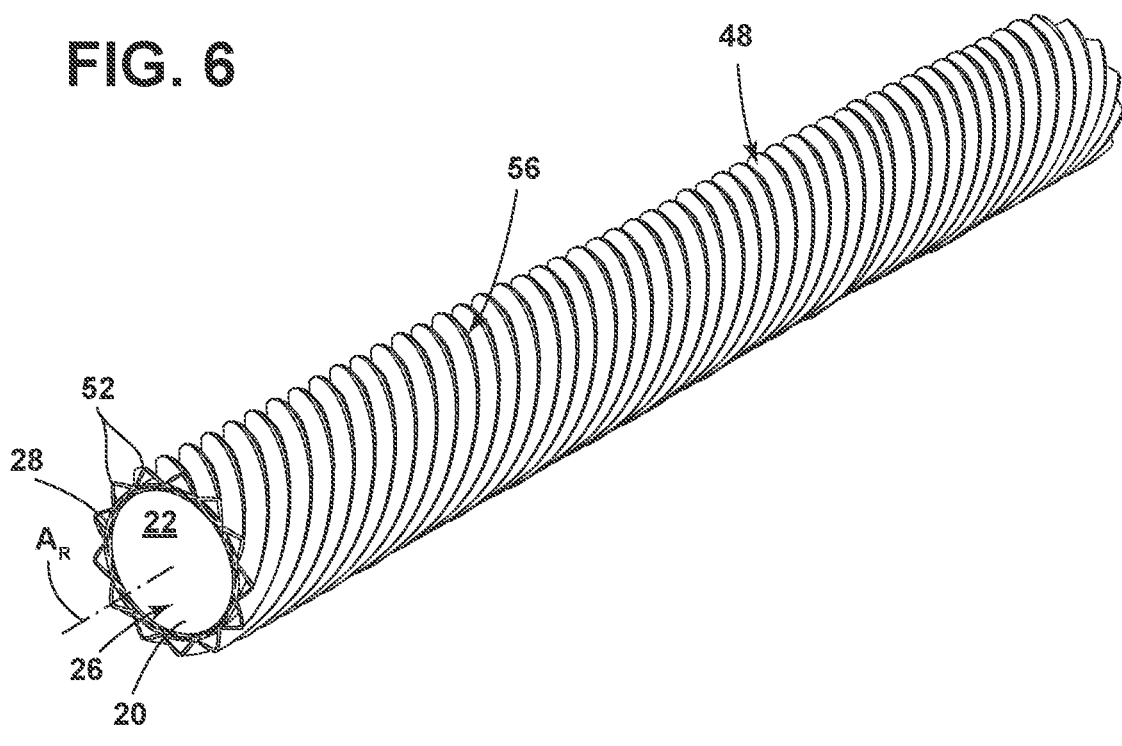
FIG. 7 is an elevated perspective view of an embodiment of a second support layer of an embodiment of a multi-layer print sleeve in accordance with various aspects of the present disclosure.

Referring further to FIG. 7, as schematically illustrated with the outer shell 34 removed for the sake of explanation, the contact points 52 may define apex regions 56 at the maximum radial distances from the axis of rotation $A_R$. As shown in FIG. 7, the apex regions 56 that define the second support structure 48 desirably form a helical or spiraling shape. In the view of the end of the second support structure 48 in the plane that is normal to the axis of rotation as shown in FIG. 7, the apex regions 56 project onto this plane as the points 52 of a plurality of teeth projecting from the intermediate shell 28. As will be described further herein, the sleeve 10 may be formed through a helical pattern of a print material PM. The helical pattern of print material PM forming each sequential layer of the sleeve 10 may have a different pitch from what is shown in FIG. 7 for example.

In some embodiments, the second support structure 48 desirably is generally rigid and incompressible, with the amount of rigidity based on the cross-sectional shape of the second support structure 48, among other factors such as the thickness of the legs of the second solid portions 50 of the second support structure 48 and the composition of the material extruded to form the second support structure 48. In alternative embodiments, the second support structure 48 desirably is slightly compressible, with the degree of permitted compressibility based on the cross-sectional shape of the second support structure 48, among other factors such as the thickness of the legs of the second solid portions 50 of the second support structure 48 and the composition of the material extruded to form the second support structure 48. In such alternative embodiments of the sleeve 10 with a slightly compressible second support structure 48, it becomes possible to use a non-compressible type of double-sided adhesive tape to adhere a printing plate to the outer surface of a print sleeve 10, and such non-compressible type of double-sided adhesive tape is less expensive than the compressible type of double-sided tape that is convention-ally used to adhere a printing plate to the outer surface of a print sleeve 10.

In accordance with an advantageous aspect of the present invention, the second support structure 48 desirably can be configured to provide the function of rigid support between the intermediate shell 28 and the outer shell 34 to maintain the uniform diameter of the outer surface 38 on which a printing plate (not shown) would be mounted. As the second support structure 48, the outer shell 34 and the intermediate shell 28 are desirably formed of the same thermoplastic material in a simultaneous 3D printing thereof as described herein according to an aspect of the present invention, the problems encountered by conventional sleeves that include rigid fill layers formed of different material than the material that forms the outer shell 34, are avoided. Additionally, the large proportion of empty space within the second support structure 48 in place of any rigid fill layers of conventional sleeves, desirably reduces the overall weight of the sleeve 10 in accordance with the present disclosure relative to the weight of a conventional sleeve.

Figure 8:
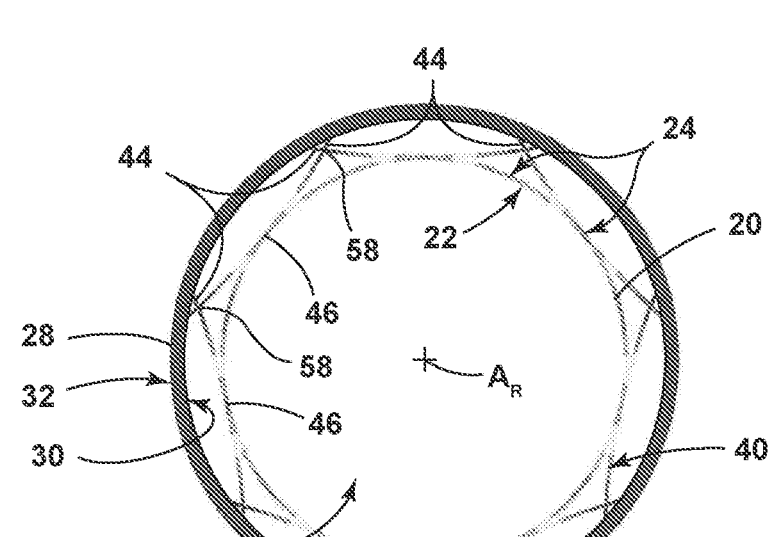
FIG. 8 is an end view of an embodiment of an inner shell, an intermediate shell, and a first support structure positioned between the inner shell and the intermediate shell in accordance with various aspects of the present disclosure.
Figure 9:
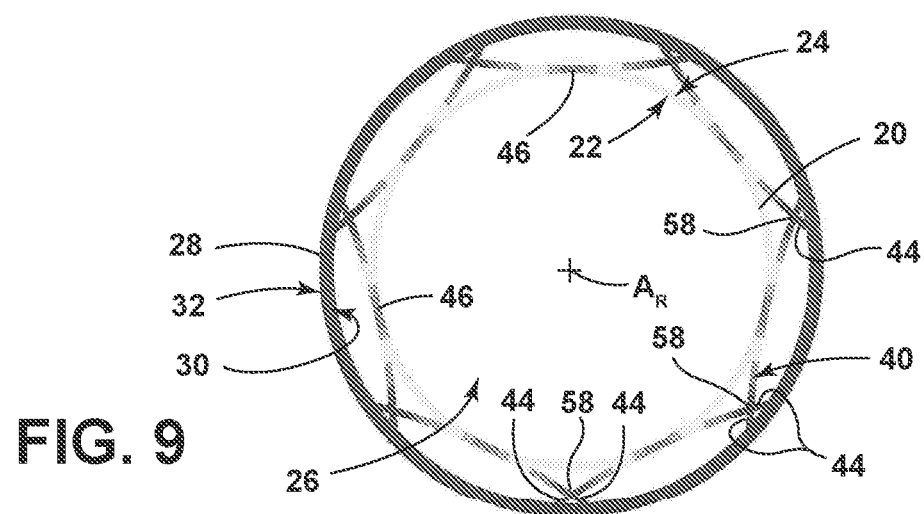
FIG. 9 is an end view of an embodiment of an inner shell, an alternative embodiment of an intermediate shell, and an alternative embodiment of a first support structure positioned between the inner shell and the intermediate shell in accordance with various aspects of the present disclosure.
Figure 10:
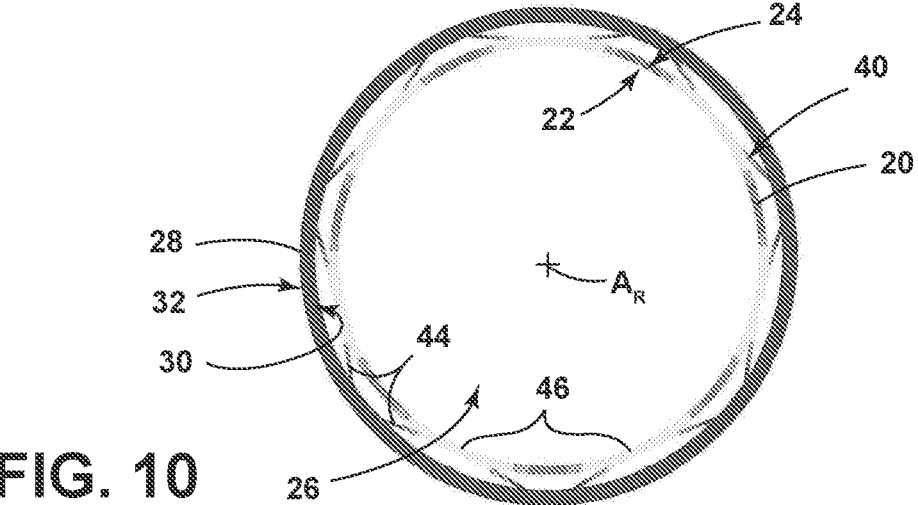
FIG. 10 is an end view of an embodiment of an inner shell, an alternative embodiment of an intermediate shell, and an alternative embodiment of a first support structure positioned between the inner shell and the intermediate shell in accordance with various aspects of the present disclosure.

Referring to FIGS. 8-10, various configurations of the first support structure 40 are illustrated in accordance with vari-ous aspects of the present disclosure. As shown schemati-cally in FIGS. 8 and 9, the first support structure 40 may include a road having a plurality of contact points 44 with the intermediate shell 28 and a plurality of connection points 46 with the inner shell 20. Moreover, the road of the first support structure 40 may have an intersection point 58 that is circumferentially positioned between a pair of contact points 44. In such instances, the intersection points 58 may alter the compressibility of the first support structure 40. However, as shown schematically in FIG. 10, the road of the first support structure 40 may be free of intersection points 58 without departing from the scope of the present disclo-sure.

Referring now to FIGS. 11-24C, in some examples, the sleeve 10 (or portions thereof, may be formed through an additive manufacturing process (also referred to as three-dimensional (3D) printing), which makes the sleeve 10 based upon a computer-controlled program that instructs an additive manufacturing machine, which is generally desig-nated by the numeral 100, to deposit successive layers of material. The successive layers of material may then fuse to form the printed sleeve 10 (or portions thereof). For instance, fused deposition modeling (FDM), also referred to herein as fused filament fabrication (FFF), is one such additive manufacturing process. In fused filament fabrica-tion (FFF), a thermoplastic print material PM may be supplied from a supply of such print material PM to an extrusion print head 102 shown in FIGS. 13-15 and 17 for example. In various FFF machines, a worm-drive gear system can engage and push the print material PM into and through the print head 102 at a controlled rate. The print head 102 may be heated to melt the print material PM, with the melted print material PM filament then being deposited by a print head 102 as beads of material, which forms a road of material that may then harden after extrusion from the print head 102 and fusing to the underlying road of print material PM.

While depositing the melted print material PM, the print head 102 may be moved in any direction(s) under the control of a computing system. For example, the positioning of the print head 102 may follow a build path controlled by a computer-aided manufacturing (CAM) software program implemented within the computing system. The build path defines the pattern for how the melted print material PM is deposited from the print head 102 as the "road(s)" of material to form a given layer that fuses with a road immediately above and a road immediately below to com-bine into a unitarily formed section of the body being printed by a particular print head 102. Accordingly, when the sleeve 10 (or portions thereof) are formed through FFF additive manufacturing, the sleeve 10 to be produced is thus built from the bottom up, layer by layer, road by road, until a completed sleeve 10 has been unitarily formed. In accor-dance with the present disclosure, each of multiple print heads 102 simultaneously extrudes an individual road of print material PM and the individual roads join together in a pattern that forms each layer of the sleeve 10.

Figure 5A:
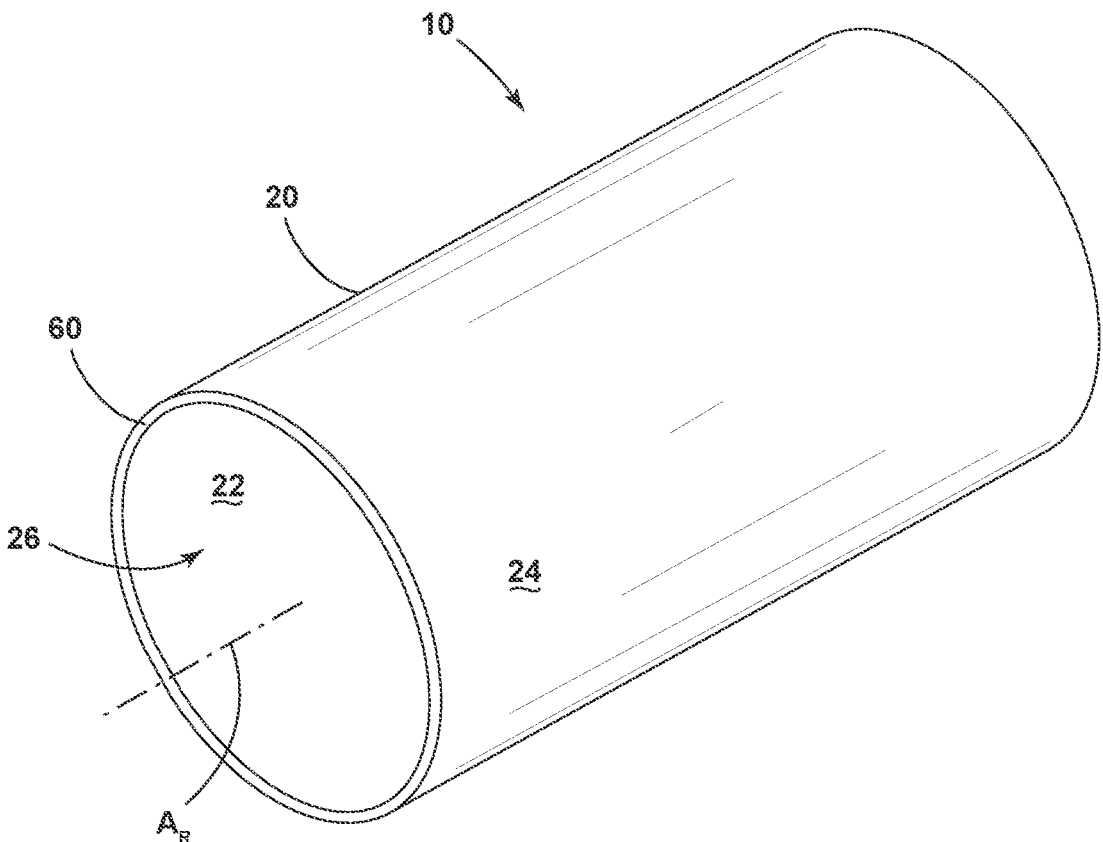
FIG. 5A is an elevated perspective view of an embodiment of a single layer print sleeve in accordance with various aspects of the present disclosure.
Figure 5B:
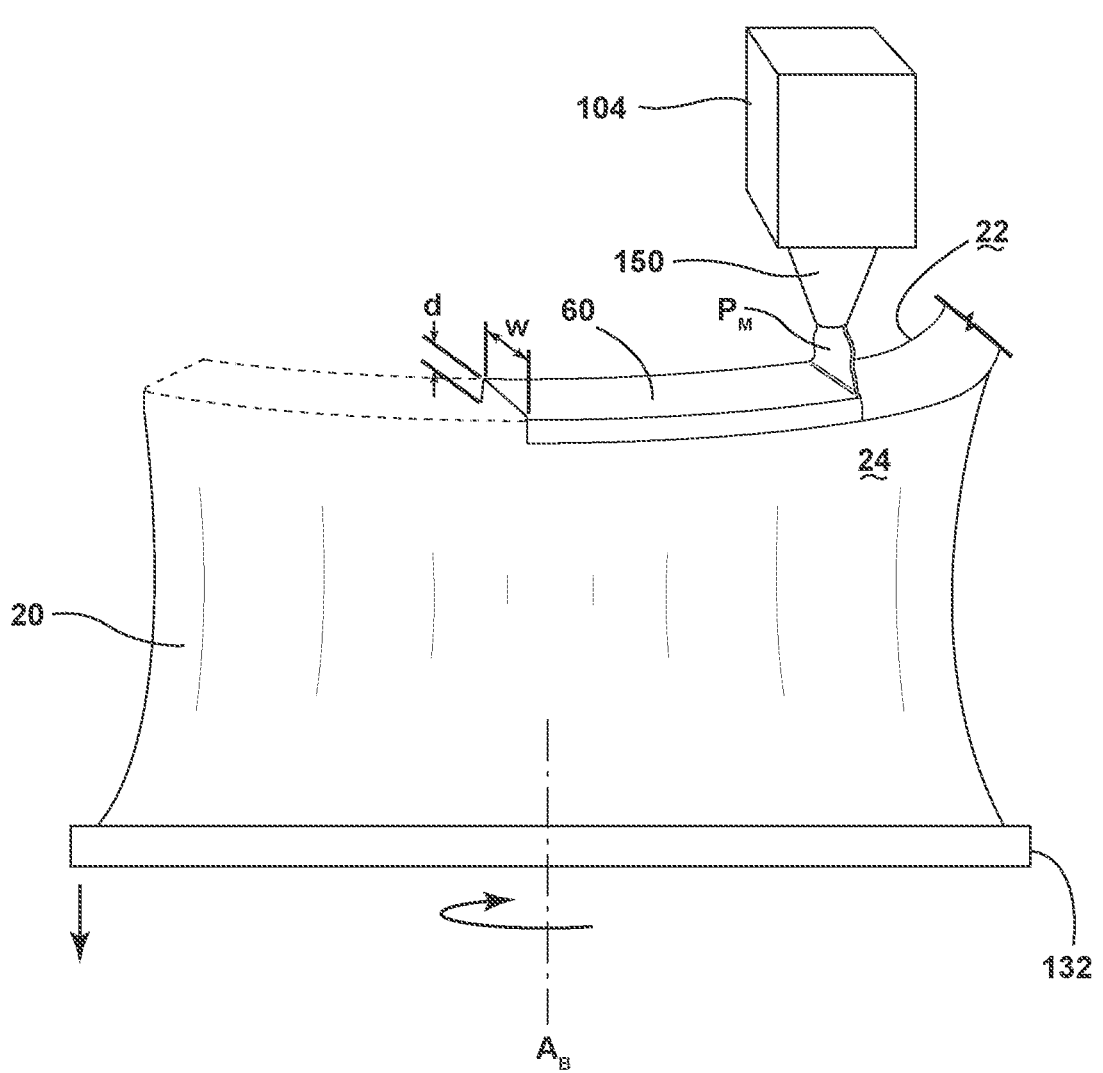
FIG. 5B is a schematic representation of an elevated perspective view of a print system in the process of depositing print material in a section of a road during the formation of an embodiment of a single layer print sleeve in accordance with various aspects of the present disclosure.

FIG. 5A depicts a perspective view of a precursor tube 20. The precursor tube 20 has been 3D printed in accordance with an embodiment of the present invention described below. FIG. 5B schematically represents a print system 104 in the process of depositing print material PM in a section of a road 60 during the formation of an embodiment of a precursor tube 20 of a single layer print sleeve 10 shown in FIG. 5A. Thus, as schematically represented in FIG. 5B, as the build plate 132 rotates in a clockwise direction around the build axis $A_B$, the precursor tube 20 shown in FIG. 5A has been unitarily formed by vertically depositing a spiraling road 60 of thermoplastic print material PM without the need of a forming mandrel to define the contour of the precursor tube's inner surface 22, which defines the hollow interior space 26 of the precursor tube 20 as shown in FIG. 5A. In accordance with an embodiment of the present disclosure, each 360 degree rotation of the build plate 132 (described below) results in the extrusion of one road cycle of material from a nozzle 150 of a printing head 102 of a print system 104 of the 3D printing machine 100. Each road 60 in each road cycle has a radial width "w" measured from the inner cylindrical surface 22 of the road cycle to the outer cylin-drical surface 24 of the road cycle. Each road cycle has a thickness "d" measured in a direction that is normal to both the upper surface of the road 60 and the opposing lower surface of the road 60. In accordance with an embodiment of the present invention, each successive road cycle fits exactly overlying the immediately underlying road cycle. Thus, the inner cylindrical surface 22 of the overlying road cycle is aligned evenly with the inner cylindrical surface 22 of the underlying road cycle, and the outer cylindrical surface 24 of the overlying road cycle is aligned evenly with the outer cylindrical surface 24 of the underlying road cycle.

Once the external surface 24 of the precursor tube 20 shown in FIG. 5A has been machined according to dimen-sional specifications needed to receive a printing plate thereon, then the 3D printed precursor tube 20 will have been transformed into a 3D printing sleeve 10 in accordance with the present invention. Because the precursor tube 20 has been unitarily formed by vertically depositing a spiraling road 60 of thermoplastic material without the need of a forming mandrel to define the contour of the inner surface 22 of the precursor tube 20, such inner surface 22 is devoid of any anomalies that would result in a zipper defect. Thus, a supply of pressurized air can be used to mount the precursor tube 20 on a construction mandrel (not shown) to undergo the process of machining the external surface 24 of the precursor tube 20 to form a printing sleeve 10.

In some examples, the sleeve 10 described herein may be formed with more than one printing print head 102. In such cases, each of the various print heads 102 may be capable of printing with print material PM that is composed of different materials. Additionally or alternatively, each of the various print heads 102 may be configured to print the various shells, support structures, or other sections of the sleeve 10 contemporaneously. For instance, a first print system 104 can have a first print head 102 configured and dedicated to print at least a portion of the inner shell 20, a second print system 106 can have a second print head 102 configured and dedicated to print an intermediate shell 28, a third print system 108 can have a third print head 102 configured and dedicated to print an outer shell 34, etc. Additionally or alternatively, additional print heads 102 (or the same print heads 102) may be configured and dedicated to generate any structure in an area that lies radially between any two of the printed roads. For example, a fourth print system 110 can have a fourth print head 102 configured and dedicated to generate a first support structure 40 operably positioned at least partially between the inner shell 20 and the intermediate shell 28. Likewise, a fifth print system 112 can have a fifth print head 102 configured and dedicated to generate a second support structure 48 operably positioned at least partially between the intermediate shell 28 and the outer shell 34.

The sleeve 10 can be provided with additional functionality by providing additional print heads 102 and additional print systems. For example, as shown in FIG. 4C, an alternative embodiment of a sleeve 710 desirably can include a supplemental compressible support structure 740, which is similar to the first support structure 40, and can be printed by a sixth print head 102 integrally with the printing of the outer shell 34 by the third print system 108. The supplemental compressible support structure 740 is configured to be slightly compressible due to th egeometry and/or composition of the supplemental compressible support structure 740. In this embodiment, a supplemental shell 720, which is similar to the inner shell 20, can be printed by a seventh print head 102 of a seventh print system. The seventh print system prints the supplemental shell 720 contemperoaneously and integrally with the printing of the supplemental compressible support structure 740 by the sixth print system. In this embodiment schematically shown in FIG. 4C, the outer surface 724 of the supplemental shell 720 would support a layer of double sided adhesive tape 750 on which a printing plate can be adhered to supplemental shell 720, which is slightly radially deformable against the supplemental compressible support structure 740 in a fashion similar to the way that the inner shell 20 is slightly radially deformable against the first support structure 40. This embodiment of the sleeve 710 enables the use of a non-compressible type of double sided adhesive tape that is less expensive than the compressible type of double-sided tape that is conventionally used to adhere a printing plate to the outer surface of a print sleeve 10.

In some cases, each print head 102 can be provided with a separate print material PM which is controlled and driven to a print head 102. In various instances, the print material PM exhausted from each print head 102 may be common with a print material PM from an additional print head 102 and/or varied from at least one other print material PM. In various examples, the print material PM may be configured as and/or include a natural or synthetic resin, a metal, glass, carbon, an inorganic material, or a combination of such materials. Moreover, in some examples, the print heads 102 may be configured to deposit different print materials PM, e.g., at least one different feature in terms of composition, appearance, functional properties, etc. For example, these differences in features may include one or more of following: (1) different structural materials, sacrificial (removable) materials, etc.; (2) materials of different color (e.g., different colorants), including materials which are different in terms of opaqueness, transparency, translucency, fluorescence, etc.; (3) different additives, e.g., fillers, plasticizers, solvents, etc., including different types and amounts of such additives; (4) materials having different functional properties, e.g., electrically conductive materials, semiconductive materials, insulating materials, etc., such as electroactive polymers, piezoelectric materials, etc.; (5) materials having different mechanical and physical properties, such as in terms of modulus, viscoelasticity, plasticity; magneticity, etc.; (6) materials, such as quantum dots, which impart different optical or spectroscopic properties, including different refractive indices, fluorescence properties, etc.; (7) materials which are different in being infused with, having incorporated therein, etc., other two-dimensional (2D) materials such as graphene nanoplatelets, carbon nanotubes or/and inorganic nanotubes, flakes of graphene-like materials such as molybdenum and tungsten disulfides, boron nitride flakes, carbon black, carbon fibers, fullerenes, etc.; (8) materials having different thermal stability, chemical stability or solubility; (9) materials having different thermal conductivity; (10) materials having higher and lower atomic numbers (i.e., different Z numbers), higher or lower molecular weights, etc.; and/or (11) materials with different permeability for gases, ions, liquids, etc.

With further reference to FIGS. 11-24C, the machine 100 desirably includes a machine housing, which is generally designated by the numeral 114. The machine 100 desirably includes a base assembly 116, which is generally designated by the numeral 116. The machine 100 further desirably includes a print assembly, which is generally designated by the numeral 118 and can include a plurality of separate print systems 104, 106, 108, 110, and 112 for example.

Figure 11:
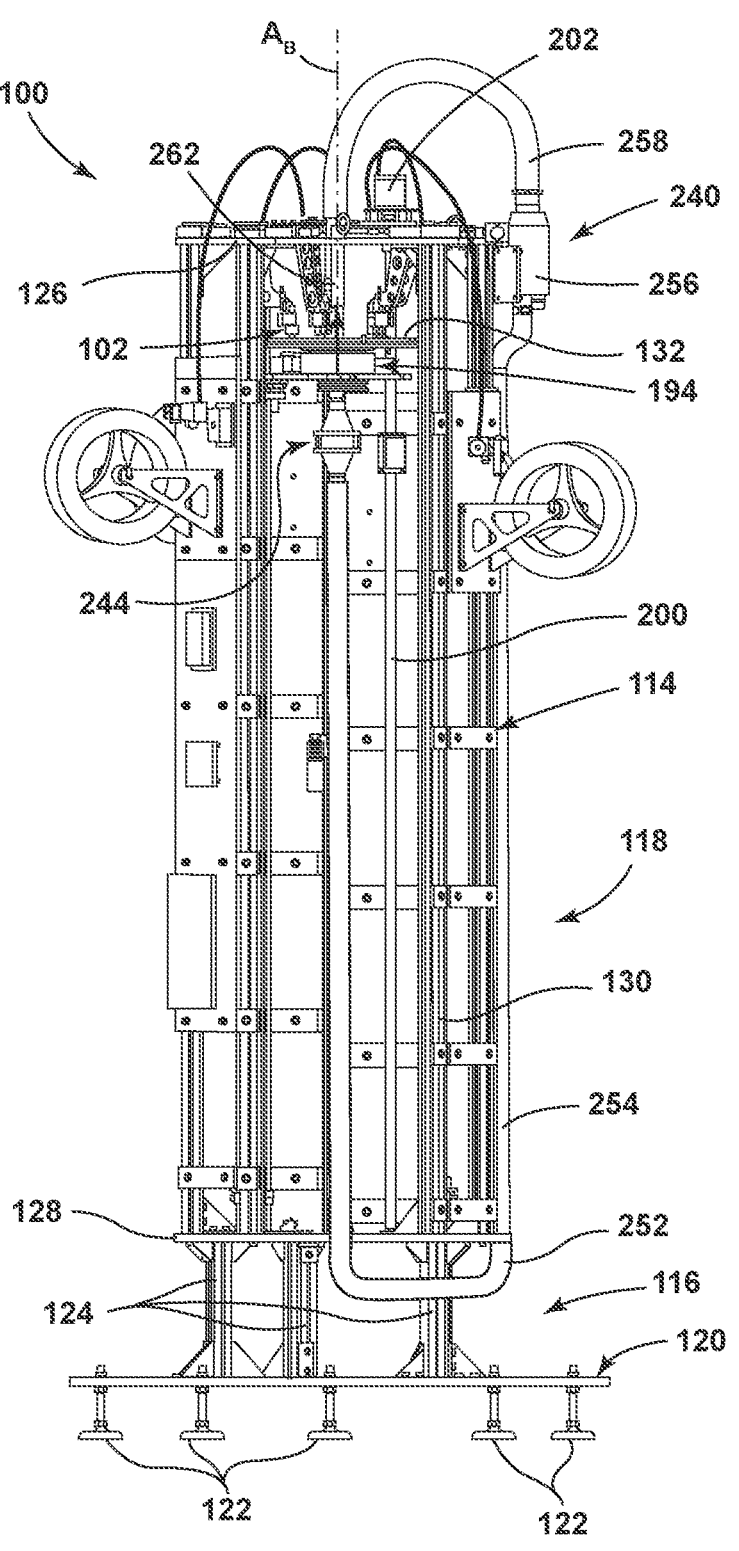
FIG. 11 is a side perspective view of an embodiment of a machine for manufacturing the print sleeve with a build plate in a first position in accordance with various aspects of the present disclosure.
Figure 12:
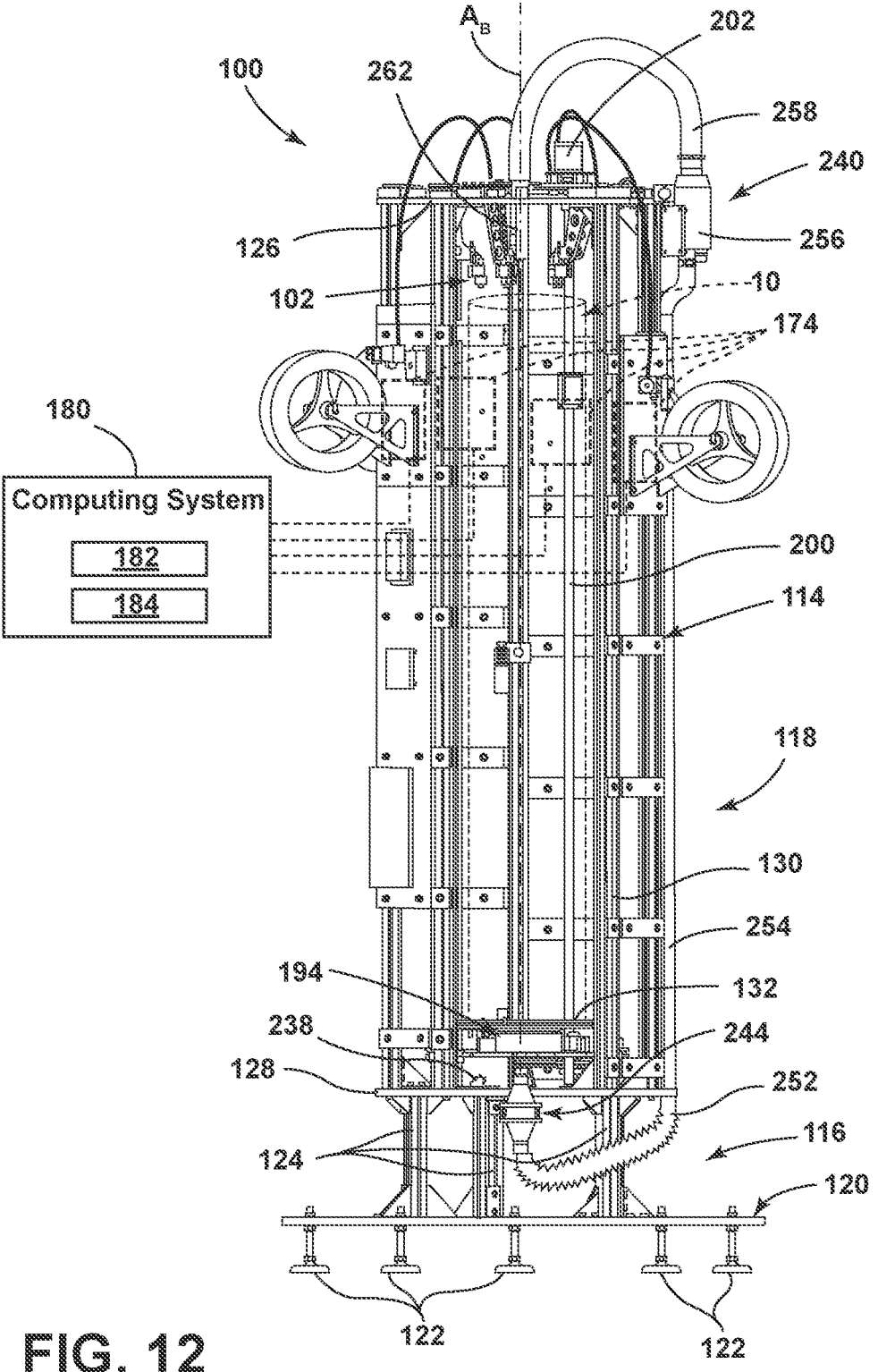
FIG. 12 is a side perspective view of the machine shown in FIG. 11 but with a build plate vertically displaced in a different position in accordance with various aspects of the present disclosure.

As schematically shown in FIGS. 11 and 12 for example, the base assembly 116 can include a base plate 120. In some cases, the base plate 120 may be operably coupled with one or more feet 122 on a lower portion thereof and one or more supports 124 on an upper portion thereof. In various examples, the feet 122 may be adjustable for altering an angle of the base assembly 116 relative to a supporting ground surface. It will be appreciated, however, that the base assembly 116 may include any additional components and/or be configured in any other manner without departing from the teachings provided herein.

In various examples, the print assembly 118 can include a first plate 126 and a second plate 128 that are spaced apart from one another and operably coupled with one another through one or more supports 130 as shown in FIGS. 11 and 12 for example. As illustrated, the first plate 126 may be positioned proximately to an upper portion of the print assembly 118, and the second plate 128 may be operably coupled with the one or more supports 124 of the base assembly 116. However, the first plate 126 and the second plate 128 may be placed in any other position without departing from the scope of the present disclosure. Furthermore, the print assembly 118 may be free of the first plate 126 and/or the second plate 128 without departing from the teachings provided herein.

Each print system (e.g., 104, 106, 108, 110, 112) may include a print head 102 from which a print material PM (e.g., a molten thermoplastic polymeric material) is discharged. The print material PM exiting the print head 102 is deposited in layers (or "roads") initially on a work surface of a build plate 132, which is shown in a relatively elevated orientation with respect to the base plate 120 in FIG. 11 and a relatively descended orientation with respect to the base plate 120 in FIG. 12. Once deposited, the subsequent print material PM exiting the print head 102 solidifies to bind to a layer (i.e., road) of the underlying material. The succession of superimposed layers (roads) thus combines into a unitary body that forms a solid structure or final article of the desired shape, such as the print sleeve 10.

Figure 13:
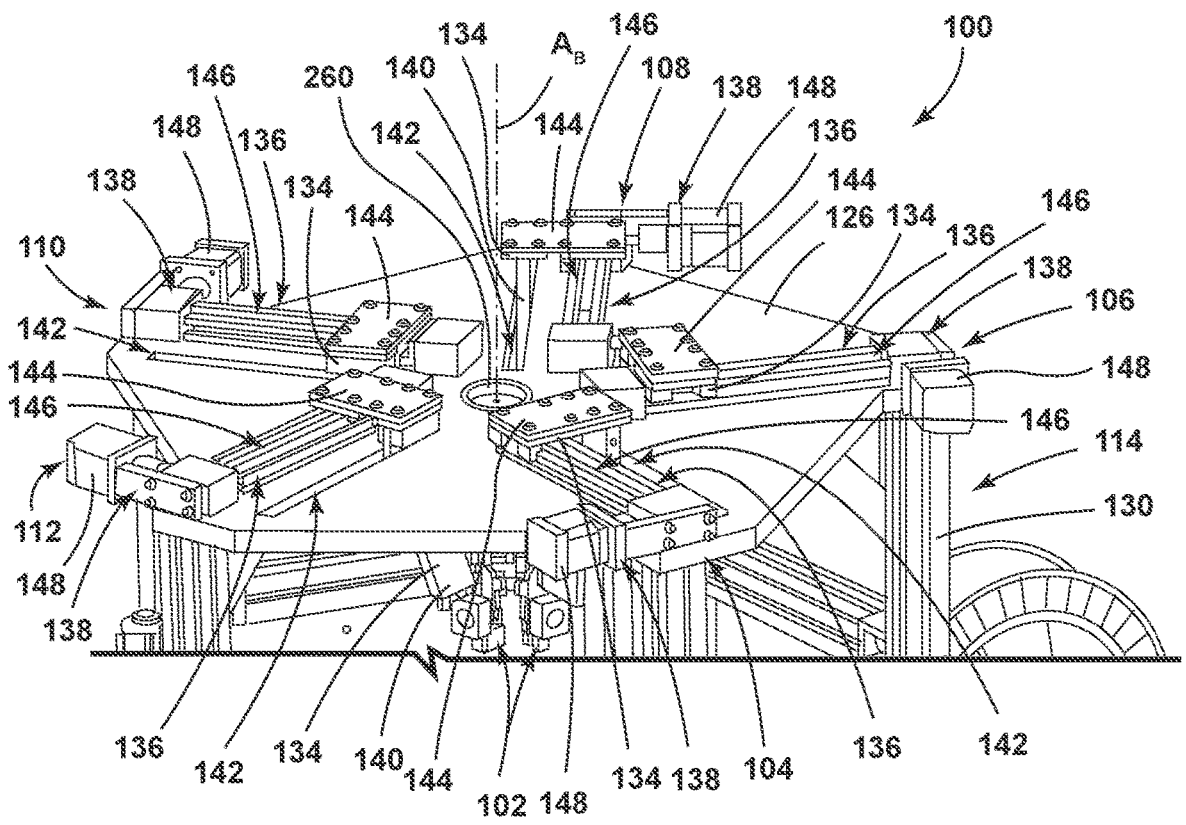
FIG. 13 is an elevated perspective view of a top portion of the machine shown in FIG. 11 in accordance with various aspects of the present disclosure.
Figure 14:
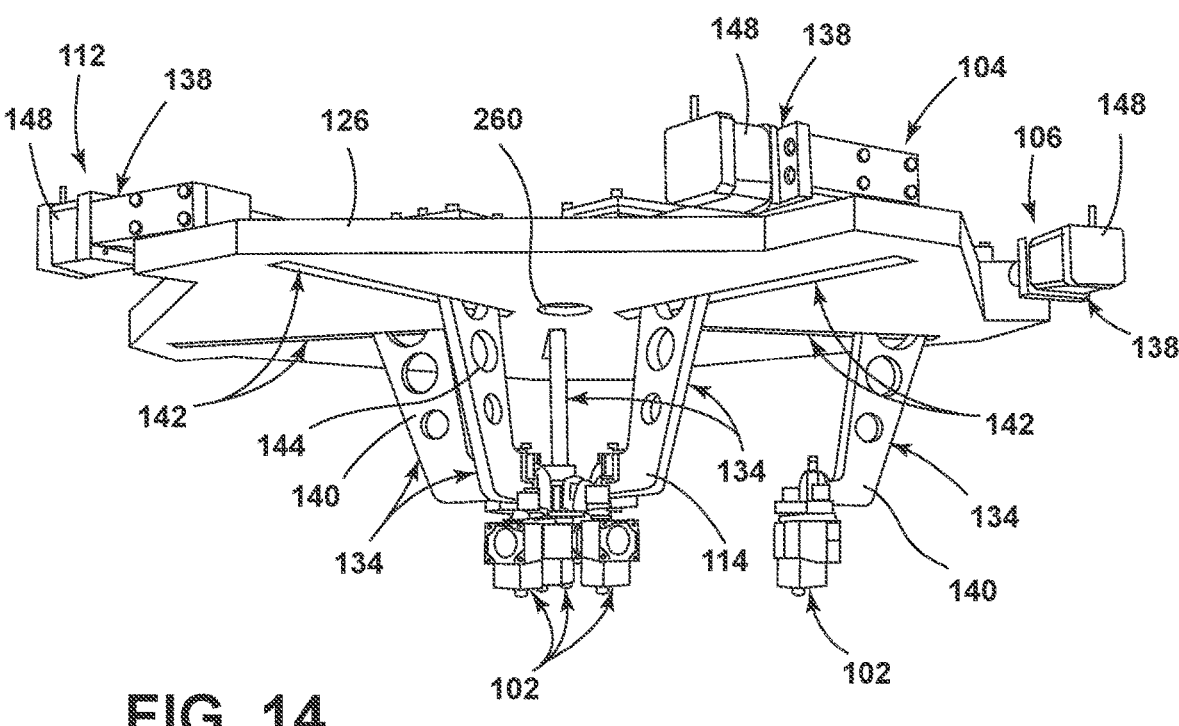
FIG. 14 is a bottom perspective view of a top portion of the machine shown in FIG. 11 in accordance with various aspects of the present disclosure.
Figure 15:
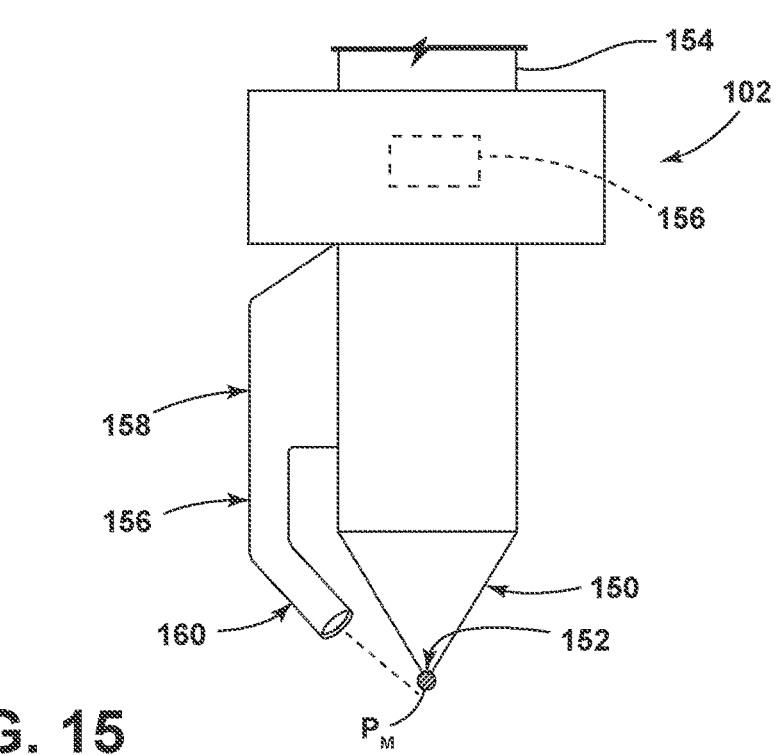
FIG. 15 is a schematic view of an embodiment of a print head of an embodiment of a machine for manufacturing the print sleeve in accordance with various aspects of the present disclosure.

With further reference to FIGS. 13-15, each print system (e.g., 104, 106, 108, 110, 112) may also include a brace 134, a slide assembly 136, and a radial actuator assembly 148. The brace 134 is configured to operably couple the print head 102 with the slide assembly 136. As illustrated, in some examples, the brace 134 can include a first portion 140 that extends through a slot 142 defined by the first plate 126 of the print assembly 118. The brace 134 may further include a second portion 144 that is positioned on an opposing side of the first plate 126 from the print head 102. In addition, the second portion 144 of the brace 134 may be operably coupled with the slide assembly 136. For instance, the second portion 144 of the brace 134 may be configured to slidingly engage with a track 146 of the slide assembly 136. In such instances, the brace 134 may move along the track 146, which may be in a direction that is perpendicular to a build axis $A_B$ of the machine 100. As such, each print head 102 may slide along a respective slide assembly 136 between at least a first position at a first radial distance from the build axis $A_B$ and a second position at a second radial distance from the build axis $A_B$.

In some cases, a respective radial actuator assembly 148 may be operably coupled with the second portion 144 of the brace 134. As such, the radial actuator assembly 148 may be configured to move each respective brace 134 between respective first position and second positions. The radial actuator assembly 148 may include any device practicable for moving the slide assembly 136 in any direction, such as ballscrew electric actuators, linear electric actuators, pneumatic cylinders, hydraulic cylinders, delta drives, belt systems, or any other practicable device.

With further reference to FIG. 15, in various examples, a nozzle 150 may be positioned at a lower-end portion of the print head 102. In some cases, the nozzle 150 can define a dispensing opening 152 for dispensing a flow of the print material PM, which is fed to the print head 102 through a feeding conduit 154. The print head 102 desirably is held in an orientation so that the print material PM exits through the dispensing opening 152 of the nozzle 150 in the vertical direction along which acts the force of gravity. In operation, the temperature of the print material PM exiting the dispensing opening 152 of the nozzle 150 can be controlled to a desired temperature. The temperature of the print material PM can be altered inside the print head 102.

The print head 102 is configured to cause the print material PM to exit the dispensing opening 152 of the nozzle 150 to be deposited to form a "road" of material to form a given layer, which lies generally normal to the axis of rotation $A_R$ of the print sleeve 10. As the build plate 132 rotates around the build axis $A_B$, which coincides with the axis of rotation $A_R$ of the precursor 20 or sleeve 10 being made, while descending axially along the build axis $A_B$ and beneath one or more of the print heads 102, the road printed by each print head 102 is laid down along a defined spiral path established by a predefined three-dimensional model that determines axial and rotational movements of the build plate 132 as well as any radial movements of one or more of the print heads 102. Depending on the set-up of the machine 100, which determines the number of print heads 102 activated for dispensing print material PM, a precursor tube 20 defining a single shell or a precursor body to a print sleeve 10 with multiple shells 20, 28, 34 and structures 40, 48, can be formed to elongate along a central axis of rotation $A_R$ of the precursor of a sleeve 10. That is to say, the final finished body coming off the machine 100 will need to be mounted onto a construction mandrel for the finishing touches such as machining the outer surface 38 of the outer layer 34 to the desired degree of roundness and smoothness before a final sleeve 10 is made.

The shape of the dispensing opening 152 projected onto a flat plane that is disposed normal to the build axis $A_B$ and coincidentally normal to the vertical direction of extrusion of print material PM, defines a dispensing area of the dispensing opening 152. When the shape of the dispensing opening 152 is circular, then the dispensing area likewise is the area of a circle. The print head 102 and the nozzle 150 are configured to permit the nozzle 150 to be detached for cleaning and to permit the use of different nozzles 150 in the print head 102. While nozzles 150 having a dispensing opening 152 with a circular dispensing area are desired, other shapes for the opening 152 in the nozzle 150 can be employed and include shapes with curvature like ovals and ellipsoids, as well as polygons like triangles, squares, rectangles, hexagons and the like. The size and/or shape of the dispensing area of the opening 152 of the nozzle 150 desirably can be selected to accommodate the type of the print material PM, the temperature of the print material PM that is to be dispensed, the rotational speed of the build plate 132, the rate of axial displacement of the build plate 132, the rate of radial displacement of the print head 102, as well as the desired dimensions of the road of print material PM being printed from the dispensing opening 152 by the print head 102.

In some cases, a concentrated heat source 156 also may be movable in conjunction with the print head 102. In various examples, the concentrated heat source 156 can be a laser source, a source of hot air, a source of light, and/or any other practicable heat source. In some instances, the intensity of the heat source 156 can be controlled based on various factors, including, but not limited to, the width and axial thickness of the road of print material PM, the composition of the print material PM, the geometry of the road of print material PM, etc. As illustrated schematically in FIG. 15, in several examples, the concentrated heat source 156 can be operably coupled with the print head 102 and can include a housing 158, which protrudes laterally from the print head 102 and below which an appendage 160 extends. In various instances, the heat provided by the heat source 156 can heat an area of the road of the print sleeve 10 before the deposition of an overlying road of the print material PM. Alternatively, the concentrated heat source 156 can be mounted on a dedicated assembly, for example, a dedicated robotic arm, to move in accordance with the predefined three-dimensional model and possibly to rotate on itself by 360°, independently of the print head 102.

Figure 16:
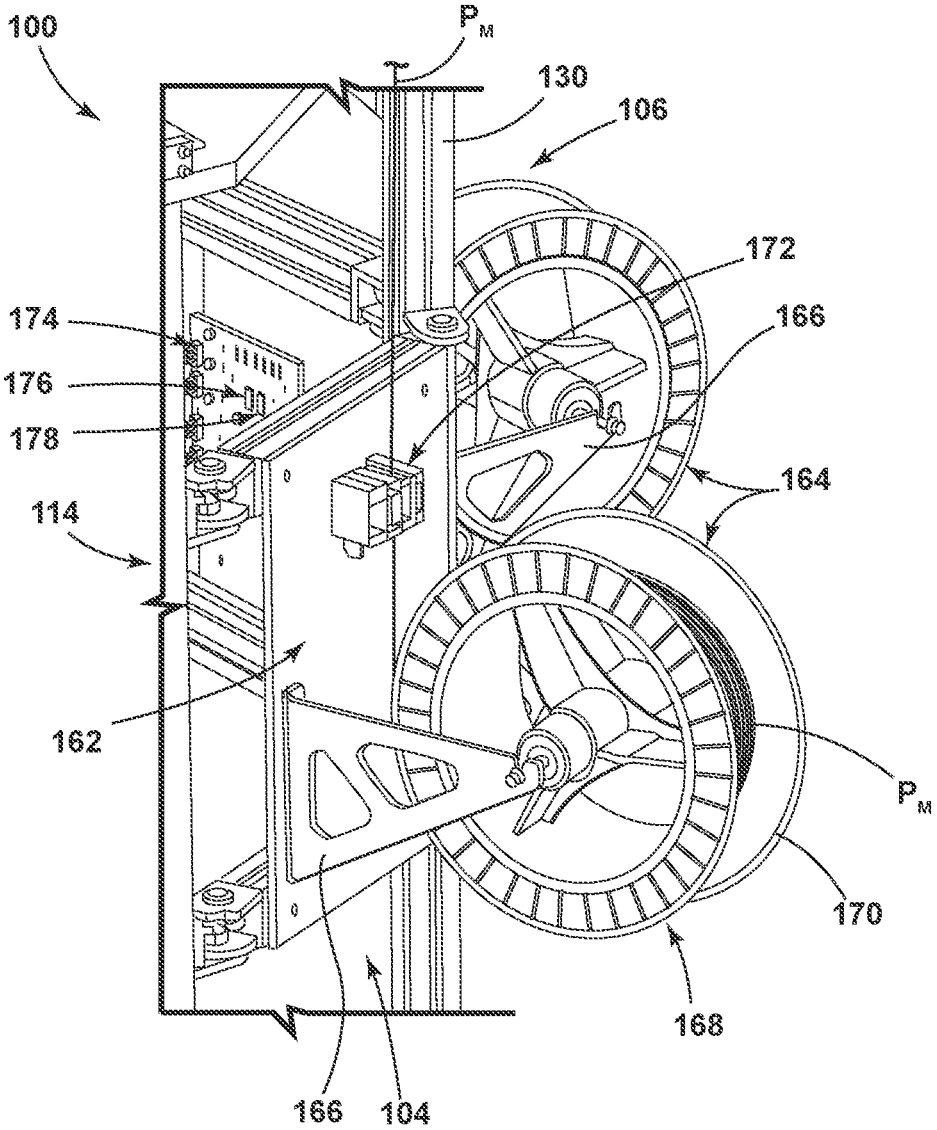
FIG. 16 is an elevated perspective view of a side portion of the machine shown in FIG. 11 in accordance with various aspects of the present disclosure.

With further reference to FIG. 16 for example, each print system (e.g., 104, 106, 108, 110, 112) can include a mounting plate 162 operably coupled with one or more of the supports 124, 130 of the housing 114, and/or any other portion of the machine 100. The mounting plate 162 may allow for components of the print system to be mounted thereto. For example, a material supply assembly 164 may include a supply bracket 166 that may be operably coupled with the mounting plate 162. The supply bracket 166 may further support a feeder 168, such as a reel 170 and/or other supply systems, that provides a supply of print material PM (e.g., a filament) for the print system (e.g., 104, 106, 108, 110, 112). In some cases, the mounting plate 162 may further support a guide 172 that is configured to direct the print material PM (e.g., the filament) from the reel 170 to the print head 102.

Additionally or alternatively, as schematically shown in FIG. 12, each print system (e.g., 104, 106, 108, 110, 112) can include a control system 174, which desirably is configured to control the operation of various components of the respective print system, such as the components of the print head 102 and/or any other component. Additionally or alternatively, the control system 174 may be configured to control various components of more than one print system. In such cases, the control system 174 may be operably coupled and/or communicatively coupled with the various components of the print systems.

In general, each control system 174 may include any suitable processor-based device, such as a computing device or any suitable combination of computing devices. Thus, in several embodiments, and as schematically shown in FIG. 16, each control system 174 may include one or more processors 176 and associated memory 178 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 178 of each control system 174 may generally comprise memory element(s) including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 178 may generally be configured to store suitable computer-readable instructions that, when implemented by the processor 176, configure each control system 174 to perform various computer-implemented functions. In addition, each control system 174 may also include various other suitable components, such as a communications circuit or module, one or more input/output channels, a data/control bus, and/or the like.

In some cases, each respective control system 174 may be operably coupled with a computing system 180 as schematically shown in FIG. 12 for example. In such instances, the computing system 180 may be configured to provide instructions to one or more of the control systems 174 and/or control one or more components of one or more print systems (e.g., 104, 106, 108, 110, 112). Like each control system 174, the computing system 180 can include any a suitable processor-based device, such as a computing device or any suitable combination of computing devices. Thus, in several embodiments, the computing system 180 may include one or more processors 182 and associated memory 184 configured to perform a variety of computer-implemented functions.

The control software for the machine 100 desirably is stored in memory 184 from which the control software can be loaded into and executed on one or more processors 182. A suitable example of the control software is commercially available as Rhino7 software with a Grasshopper graphical user interface available from McNeel Europe S. L. of Barcelona, Spain as modified with a plug-in that permits the control software to simultaneously control multiple printing heads 102 of multiple print systems (e.g., 104, 106, 108, 110, 112) depositing print material PM in a printing plane disposed above a build plate 132, which simultaneously rotates and descends from a printing plane during 3D printing of objects like the sleeves 10 disclosed herein. The control software is configured to determine and control the rate at which the build plate 132 descends along the build axis $A_B$ from the printing plane during each complete 360° rotation of the build plate 132 around the build axis $A_B$ in coordination with each control system 174 of each of the print systems (e.g., 104, 106, 108, 110, 112) in order to generate each road cycle of print material PM in accordance with the configuration of the 3D model of the sleeve 10 being printed.

Additionally, the memory 184 of the computing system 180 may generally comprise memory element(s) including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 184 may generally be configured to store suitable computer-readable instructions that, when implemented by the processor 182, configure the computing system 180 to perform various computer-implemented functions. In addition, the computing system 180 may also include various other suitable components, such as a communications circuit or module, one or more input/output channels, a data/control bus, and/or the like. In some examples, one or more of the print systems (e.g., 104, 106, 108, 110, 112) may be free of a control system 174. In such instances, the computing system 180 may control the components of that print system.

It will be appreciated that, although the various control functions and/or actions will generally be described herein as being executed by the control system 174 (and/or the computing system 180), one or more of such control functions/actions (or portions thereof) may be executed by a separate computing system or may be distributed across any combination of one or more control systems 174 (including, for example, the control systems 174) and/or one or more computing systems (including, for example, the computing system 180 and/or a separate computing system). For instance, in some embodiments, the computing system 180 may be configured to acquire or generate a model for a print sleeve 10, and each control system 174 may be configured to operate the components of a respective print system to form a portion of the print sleeve 10 of the model.

Figure 17:
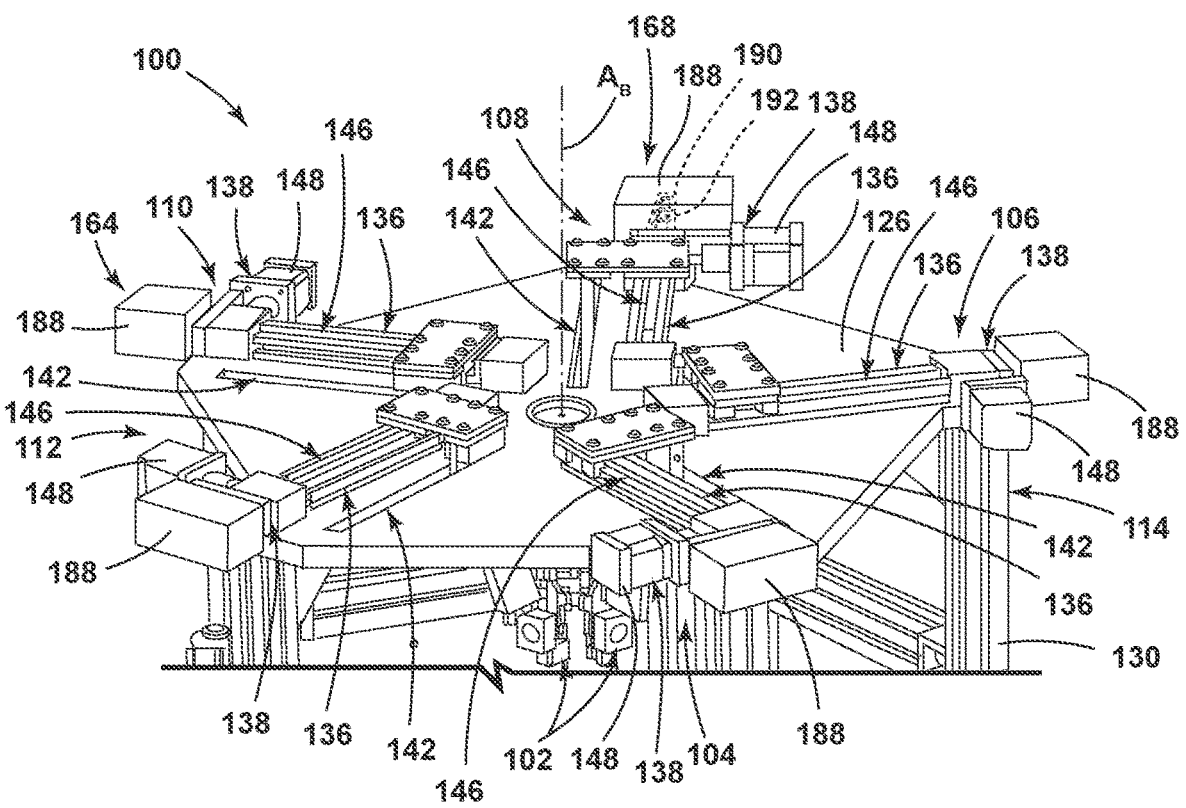
FIG. 17 is an elevated perspective view of an alternative embodiment of a top portion of an embodiment of a machine for manufacturing the print sleeve in accordance with various aspects of the present disclosure.

As shown in FIG. 17, in addition to or in lieu of the material supply assembly 164 illustrated in FIG. 16, the machine 100 can include any other type of feeder, which is generally designated by the numeral 168 in FIG. 17. For instance, the feeder 168 may be configured as a hopper 188 that is configured to retain a print material PM (e.g., a pellet material, a powder material, a resin material, etc.) therein. In such examples, the print material PM can be drawn from the hopper 188 through a barrel 190 via a rotating screw conveyor 192 (e.g., a feed screw or auger) that traverses through the hopper 188. The screw is coupled to a stepper or servo motor. The direction and speed of rotation of the screw are controlled by the motor, with rotation in one direction drawing the pellets from the hopper 188. As provided herein, a heating element can be placed at the end of the barrel 190 such that the pellets are melted at the end of the screw and extruded through a nozzle 150 (FIG. 15) onto the build plate 132.

With further reference to FIGS. 11, 12, 18, and 19, the machine 100 can further include a build assembly 194 that is configured to have portions thereof that allow for movement of the build assembly 194 along the build axis A$_B$ and/or about the build axis A$_B$.

Figure 18:
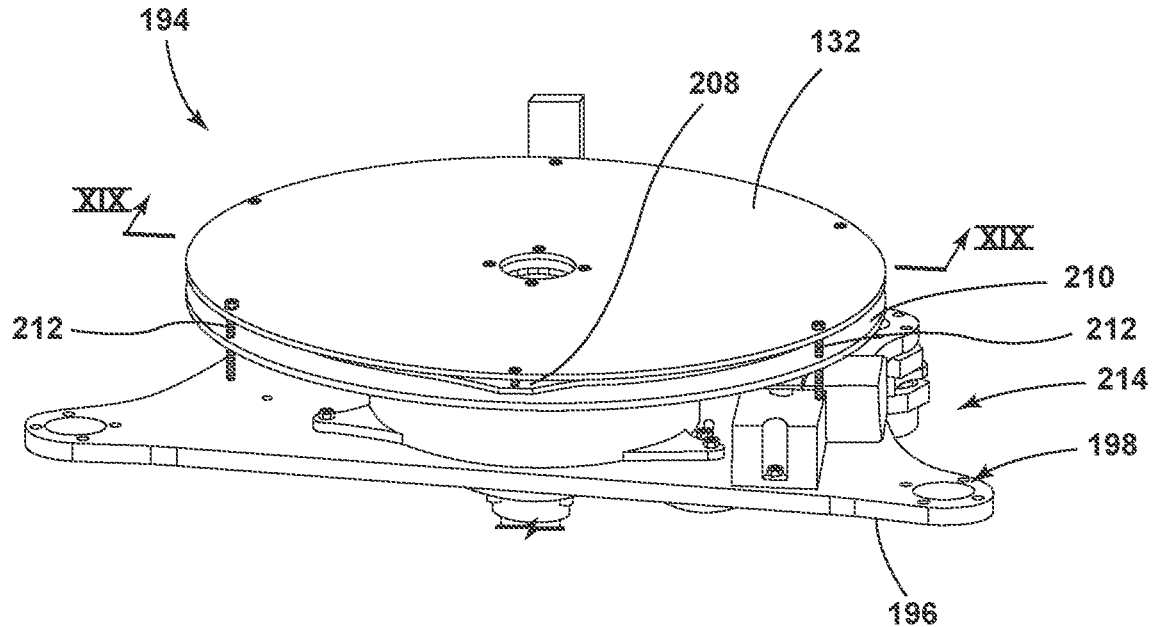
FIG. 18 is an elevated perspective view of an embodiment of a build assembly of an embodiment of a machine for manufacturing the print sleeve in accordance with various aspects of the present disclosure.

For example, in some cases, the build assembly 194 can include an anchor plate 196 defining an attachment region 198 as shown in FIG. 18 for example. A guide 200 (FIGS. 11 and 12) may be operably coupled with the first plate 126 of the print assembly 118 and the anchor plate 196. An axial actuator assembly 202 may be operably coupled with the anchor plate 196 such that the anchor plate 196 may be moveable along the build axis A$_B$ relative to the first plate 126 and guided by the guide 200 when the axial actuator assembly 202 is activated, which activation desirably is under the control of the computing system 180. In various examples, the axial actuator assembly 202 may include any device practicable for moving the anchor plate 196 in any direction, such as ballscrew electric actuators, linear electric actuators, pneumatic cylinders, hydraulic cylinders, delta drives, belt systems, or any other practicable device.

The build plate 132 may be operably coupled with the anchor plate 196, disposed to face the first plate 126, and moveable along the build axis A$_B$ with the anchor plate 196. The build plate 132 is a structure that defines a "build surface," which is shown as being planar but could alternatively be arcuate (depending on the shape of the build plate 132). Since a reliable adhesion between the first deposit of print material PM and the build surface defined by the upper surface of the build plate 132 is desired when printing a sleeve 10, it is desirable is to apply a coating of adhesive onto the build surface of the build plate 132 before depositing the first road of print material PM. Because the print material PM is largely composed of polypropylene, a polypropylene-based adhesive is desired.

If desired for other applications of the machine 100, the build surface may be configured to be "non-stick," that is, resistant to the adhesion of a cured print material PM. The non-stick properties may be embodied by a combination of variables such as the chemistry of the build plate 132, its surface finish, and/or applied coatings. For instance, a permanent or semi-permanent non-stick coating may be applied. One non-limiting example of a suitable coating is polytetrafluoroethylene ("PTFE"). In some examples, all or a portion of the build surface may incorporate a controlled roughness or surface texture (e.g. protrusions, dimples, grooves, ridges, etc.) with nonstick properties. Additionally or alternatively, the build plate 132 may be made in whole or in part from an oxygen-permeable material.

Figure 19:
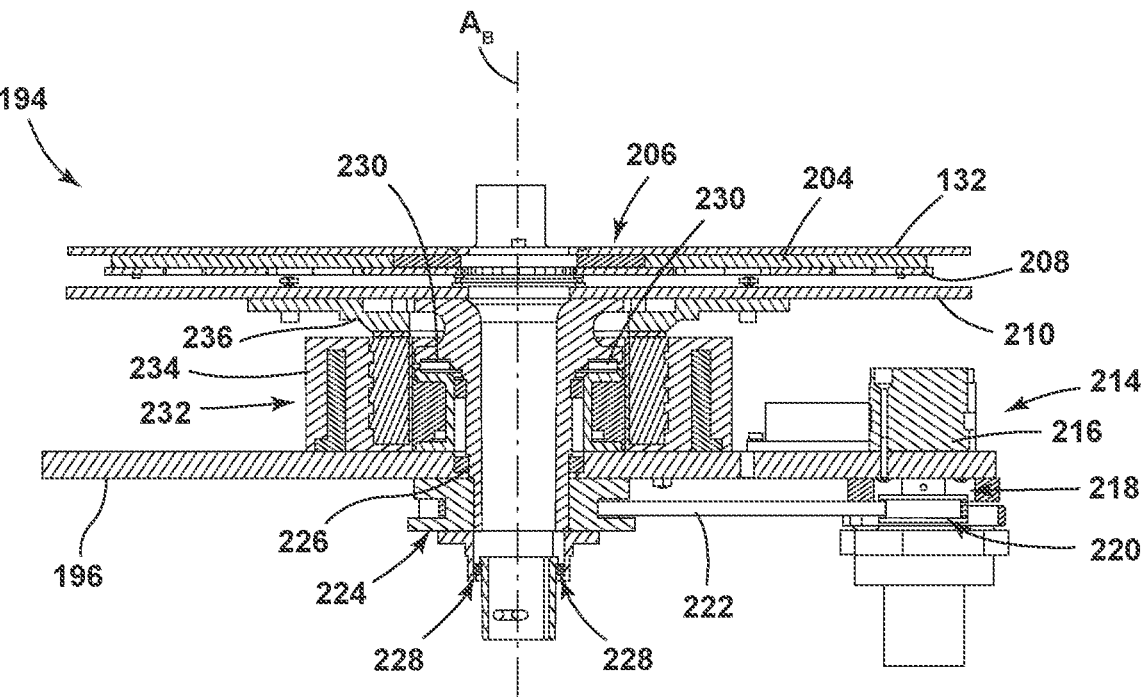
FIG. 19 is a cross-sectional view of the build assembly of FIG. 18 taken along the line XIX-XIX of FIG. 18.
Figure 20:
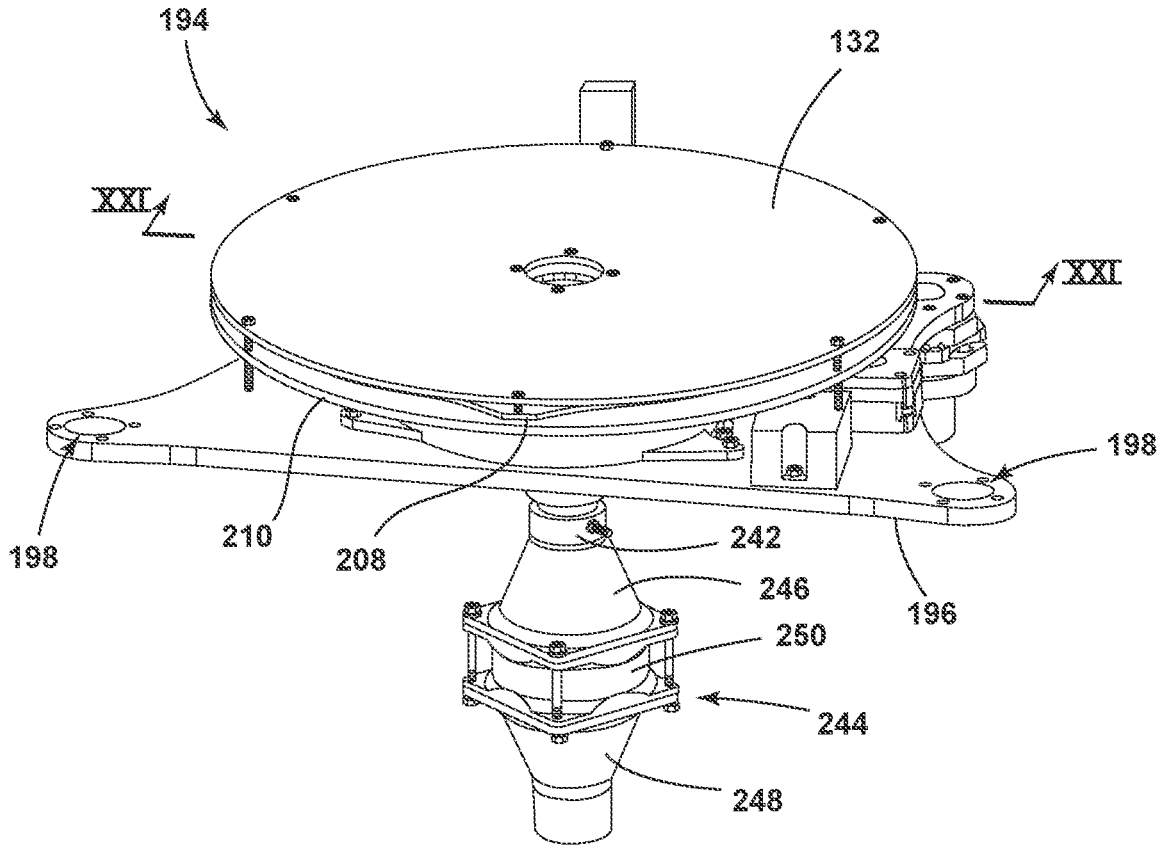
FIG. 20 is an elevated perspective view of an embodiment of a build assembly of an embodiment of a machine for manufacturing the print sleeve in accordance with various aspects of the present disclosure.
Figure 21:
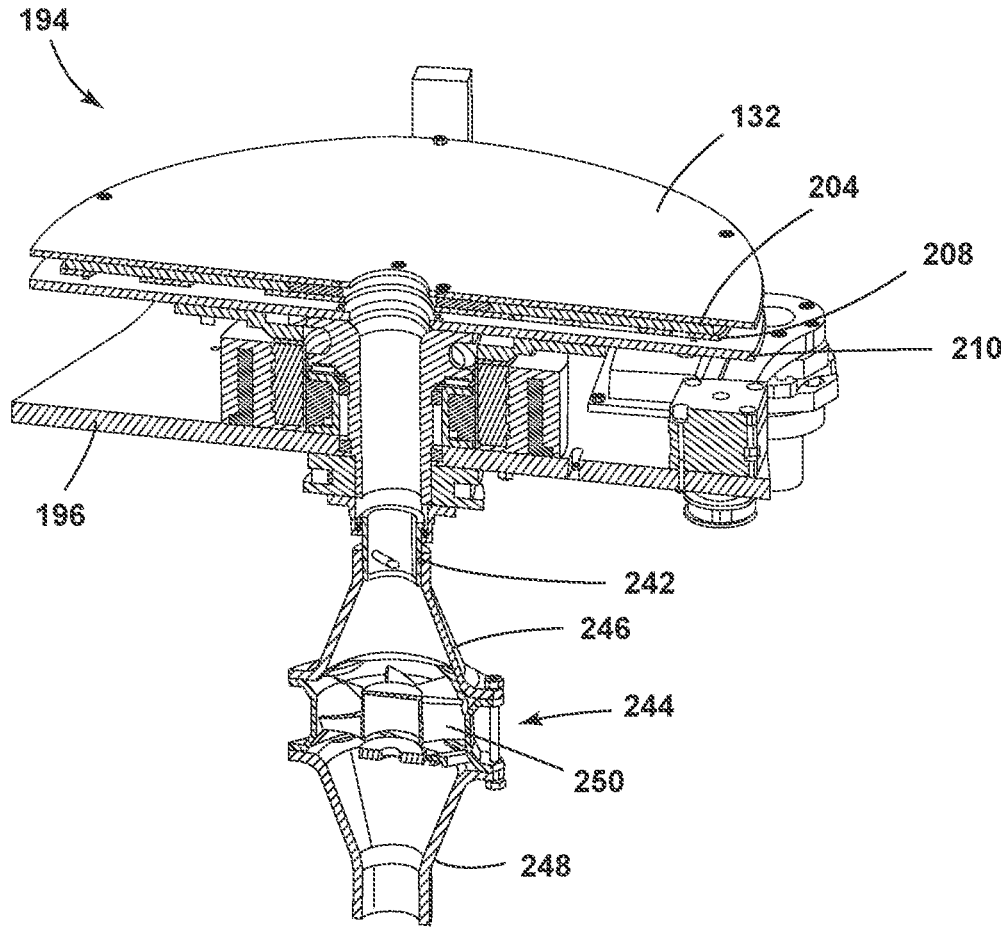
FIG. 21 is a cross-sectional view of the build assembly of FIG. 20 taken along the line XXI-XXI of FIG. 20.

In some examples, a heating source 204 may be operably coupled with a second opposing surface of the build plate 132. As shown in FIG. 19 for example, the heating source 204 may define a cavity 206 in a central portion thereof. The heating source 204 may be configured as any type of assembly, such as metallic heating elements (e.g., resistance wire, nichrome wire, etched foil), ceramic and semiconductor heating elements (e.g., molybdenum disilicide compounds, silicon carbide, silicon nitride, PTC ceramic materials, quartz halogen infrared heaters, etc.), thick film heaters (e.g., a thick film heater printed on a mica sheet), liquid heating elements (e.g., an electrode boiler utilizing electricity flowing through streams of water), composite heating elements (e.g., tubular Heating Elements, tubular Oven Heating Elements, tubular (sheathed) elements normally comprise a fine coil of nichrome (NiCr) resistance heating alloy wire, screen-printed metal-ceramic tracks deposited on ceramic insulated metal (generally steel) plates, radiative heating elements, gold dichroic films, removable ceramic core elements), combination heating element systems, and/or any other practicable heating element.

Wither further reference to FIGS. 18 and 19, a cover plate 208 may be positioned on an opposing side of the heating source 204 from the build plate 132. Like the build plate 132, the cover plate 208 may also be movable along the build axis A$_B$ with the anchor plate 196.

In some examples, a support plate 210 may be positioned on an opposing side of the cover plate 208 from the heating source 204. The support plate 210 may support one or more standoffs 212 that define an offset distance between the support plate 210 and the cover plate 208 as shown in FIG. 18 for example. In some instances, the offset distance can allow for heat generated by the heating source 204 to be directed there through, thereby allowing for more consistent temperature regulation of the build plate 132 by the heating source 204.

As illustrated in FIGS. 18 and 19, in several examples, the build plate 132, the cover plate 208, and/or the support plate 210 are configured to be rotatable in unison about the build axis A$_B$ and/or rotatable relative to the anchor plate 196. In such instances, a rotational actuator assembly, which is generally designated by the numeral 214, may be operably coupled between the build plate 132 and the anchor plate 196 to induce the relative rotation therebetween. For instance, as schematically shown in FIG. 19 for example, a rotational actuator 216 may be operably coupled with the anchor plate 196. The operation of the rotational actuator 216 desirably is controlled by the computing system 180 and may include any device practicable for providing rotational movement when activated, such as stepper motors, ballscrew electric actuators, linear electric actuators, pneumatic cylinders, hydraulic cylinders, delta drives, belt systems, or any other practicable device. As shown, the rotational actuator 216 may be operably coupled with a transmission 218. The transmission 218 can include a power-transmitting component 220 having a first set of gears thereon that are configured to transfer rotational movement through a belt 222 (and/or any other device). A second set of gears may be defined by a power-receiving component 224. The power-receiving component 224 may be operably coupled with a rotational support 226 that is configured to support the build plate 132, the cover plate 208, and/or the support plate 210. Moreover, the rotational support 226 may be configured to rotate with the build plate 132, the cover plate 208, and/or the support plate 210. In such instances, one or more bearings may be placed between the anchor plate 196 and the rotational support 226. For example, a first bearing 228 may be positioned axially below the anchor plate 196, and a second bearing 230 may be positioned axially above the anchor plate 196. However, it will be appreciated that a single bearing or other rotation device may be utilized without departing from the scope of the present disclosure.

In some cases, a rotary joint 232 may be positioned within the build assembly 194 to provide power from the anchor plate 196 to a rotational component rotatable with the build plate 132 (such as the heating source 204). The rotary joint 232 can include one or more conductive rings on a first power component 234 and one or more respective conductive brushes on a second power component 236. The conductive brushes may be configured to make contact with the conductive rings to allow for power flow between the first power component 234 and the second power component 236. It will be appreciated that the conductive rings or the brushes may be coupled with the first power component 234, and the other of the conductive rings or the brushes may be coupled with the second power component 236 without departing from the teachings provided herein. In some examples, the power transfer may be provided by a conventional metal-contact slip ring and/or through any other manner without departing from the teachings provided herein.

With further reference to FIG. 12, in some examples, a contact sensor 238 may be operably coupled with the computing system 180. When the anchor plate 196 shown in FIGS. 18 and 19 touches the contact sensor 238 schematically shown in FIG. 12, then the computing system 180 receives from the contact sensor 238, a signal that triggers the machine 100 to stop the vertical descent of the anchor plate 196. In this way, axial movement of the anchor plate 196 in the direction of the build axis $A_B$ becomes restricted from damaging operation of the machine 100. Alternatively, the contact sensor 238 can be a proximity sensor that does not require actual physical contact in order to send a signal to the computing system 180.

In operation, the one or more of the print heads 102 may be configured to deposit print material PM therefrom. As the print material PM is deposited, the rotational actuator assembly 214 may rotate the build plate 132 so that the print material PM may be deposited in a defined pattern. For instance, if the radial actuator remains stationary and the rotational actuator assembly 214 completes a full rotation, then the print material PM may form a completely closed geometric shape from the print material PM. Additionally or alternatively, the axial actuator assembly 202 may cause the build plate 132 to move further from the print heads 102 to allow for subsequent layers (roads) of print material PM to be deposited on one another. Accordingly, the wider the print sleeve 10, the larger the length of movement of the axial actuator assembly 202, which, in turn, causes a greater movement length of the build plate 132 with respect to the print heads 102.

Referring further to FIGS. 11, 12, 20, and 21, in some examples, the printing machine 100 desirably can include a temperature control system 240. In general, as the print sleeve 10 is formed, the temperature control system 240 may be configured to provide an airflow of a defined temperature through an interior that runs the length of the sleeve 10 to alter a temperature of at least a portion of the sleeve 10. As such, the build plate 132, the cover plate 208, the support plate 210, and/or the anchor plate 196 may respectively define openings therethrough. Each of the respective openings may be at least partially axially aligned to form a channel that air (and/or any other fluid) may pass through. As shown in FIG. 19 for example, the rotational support 226 may also define a cavity therethrough. In such instances, the cavity may be at least partially axially aligned with the respective openings of the build plate 132, the cover plate 208, and/or the support plate 210. In addition, in some cases, the rotational support 226 may be positioned through the opening of the anchor plate 196. However, in other examples, the cavity of the rotational support 226 may be otherwise aligned with the opening of the anchor plate 196 without departing from the scope of the present disclosure.

In some examples, the temperature control system 240 can include a first adapter 242 axially aligned with the rotational support 226. In various examples, the first adapter 242 may be operably coupled with the rotational support 226 through the first bearing 228. However, the first adapter 242 and the rotational support 226 may be operably coupled with one another in any other manner and/or aligned and separated with one another without departing from the teachings provided herein.

In some examples, an airflow system 244 desirably may be operably coupled with the first adapter 242 and configured to generate an airflow within the temperature control system 240. As shown, the airflow system, which is generally designated by the numeral 244 in FIG. 20 for example, can be configured to include a first housing portion 246 operably coupled with the first adapter 242 and a second housing portion 248 that is separated from the first housing portion 246 by an airflow device 250. The airflow device 250 desirably may be configured as a fan, blower, pump, and/or any other practicable device that is configured to generate an airflow through the airflow device 250. The airflow system 244 desirably is coupled beneath the anchor plate 196 and thus moves axially with the anchor plate 196 along the direction of the build axis $A_B$ as schematically shown in FIGS. 11 and 12. Thus, the placement of the airflow system 244 does not impose any constraint on the axial length of the sleeve 10.

With further reference to FIGS. 11, 12, 20, and 21, a duct 252 can be fluidly coupled with the second housing portion 248 on a first end portion thereof and a conduit 254 on a second end portion. In some instances, the duct 252 desirably may be elastically deformable to accommodate for movement of the anchor plate 196 relative to the print heads 102. Accordingly, as the build plate 132 moves from a first position, as illustrated in FIG. 11, to a second position, as illustrated in FIG. 12, the duct 252 may collapse on itself in an accordion-like fashion to reduce in length between the opposing end portions of the duct 252. In turn, when the build plate 132 returns to the first position, the duct 252 may elongate between opposing end portions. Due to the ability to deform elastically, the duct 252 may shrink and elongate multiple times with minimal to no material degradation. Additionally or alternatively, the duct 252 may be capable of withstanding variances in temperature. In various examples, the duct 252 may be formed from a polymeric material, an elastomeric material, a composite material, and/or any other practicable material.

In various examples such as shown in FIGS. 11 and 12, the temperature control system 240 also may include a temperature-altering device 256, such as a chiller and/or a heat exchanger, operably coupled with the conduit 254, which is connected in fluid communication with the duct 252. In general, the temperature-altering device 256 can be configured to alter a temperature of the airflow within the temperature control system 240. The heat exchanger may be configured as a shell and tube heat exchanger, a plate heat exchanger, a plate and shell heat exchanger, an adiabatic wheel heat exchanger, a plate-fin heat exchanger, a pillow plate heat exchanger, a fluid heat exchanger, a waste heat recovery unit, a dynamic scraped surface heat exchanger, a phase-change heat exchanger, a direct contact heat exchanger, a microchannel heat exchanger, and/or any other type of heat exchanger. The chiller may be configured as an air-cooled chiller, a water-cooled chiller, an evaporative condensed chiller, and/or any other type of chiller.

As illustrated, a second adapter 258 may be fluidly coupled with the temperature-altering device 256. The second adapter 258 may be configured to direct airflow from the temperature-altering device 256 through an opening 260 (FIG. 14) defined by the first plate 126 (FIG. 14) of the print assembly 118. In some examples, the second adapter 258 may be operably coupled with an outlet device 262. For example, the outlet device 262 may be in the form of a diffuser. However, it will be appreciated that the outlet device 262 may be configured as a nozzle and/or any other practicable device without departing from the teachings provided herein.

In operation, the airflow device 250 may create a flow through the duct 252. The airflow may be provided from the duct 252 to the conduit 254 and through the temperature-altering device 256 with a heater and/or the chiller, which can respectively raise or lower the temperature of the airflow. The airflow may then be directed through the second adapter 258 and, possibly, the outlet device 262 and into interior hollow channels of the print sleeve 10 (e.g., through central hollow interior region 26 and the inner shell 20), and/or along any of the surfaces of the print sleeve 10. The airflow may exit the print sleeve 10 through the channel defined by the build plate 132, the cover plate 208, the support plate 210, and/or the rotational support 226. In turn, the airflow may be directed through the first adapter 242 (FIG. 20) and back through the airflow system 244. In some cases, a valve may be operably coupled with the temperature control system 240, which valve desirably is configured and disposed to allow for the at least a portion of the airflow to be exhausted from the duct 252 and/or for additional environmental air to be introduced into the duct 252. Accordingly, the temperature control system 240 may be configured to maintain the print sleeve 10 and/or portions thereof at a defined temperature during the manufacturing of the print sleeve 10 by the machine 100.

Referring now to FIGS. 22A-23B, which schematically represents a first print system 104 as P1, a second print system 106 as P2, a third print system 108 as P3, a fourth print system 110 as P4, and a fifth print system 112 as P5, the print sleeve 10 may be formed from one or more layers of print material PM. For example, the print sleeve 10 can include a first print system 104 (P1) having a first print head 102 configured to print at least a portion of an inner shell 20, a second print system 106 (P2) having a second print head 102 configured to print an intermediate shell 28, and/or a third print system 108 (P3) having a third print head 102 configured to print an outer shell 34. In some instances, each of the inner shell 20, the intermediate shell 28, and the outer shell 34 can be configured as an annular cylindrical structure. In such instances, each shell can be defined by a respective inner cylindrical surface defining a first constant radially measured distance from the shell's axis of rotation $A_R$. Additionally, each shell can be defined by a respective outer cylindrical surface defining a second constant radially measured distance from the shell's axis of rotation $A_R$. Moreover, each shell can be further defined by a respective radial thickness, which measures a distance that is equal to the difference between the radius of the outer cylindrical surface and the radius of the inner cylindrical surface. As embodied herein and shown in FIG. 4 for example, the radius of the inner cylindrical surface 30 of the intermediate shell 28 is greater than the radius of the outer cylindrical surface 24 of the inner shell 20. Moreover, as embodied herein, the radius of the inner cylindrical surface 36 of the outer shell 34 is greater than the radius of the outer cylindrical surface 32 of the intermediate shell 28.

Additionally or alternatively, additional print heads 102 (or the same print heads 102) may be configured to generate any features within the print sleeve 10. For example, as schematically represented in FIGS. 22A-23B, a fourth print head 102 of a fourth print system 110 (P4) desirably is configured to generate a first support feature 40 operably positioned at least partially between the inner shell 20 and the intermediate shell 28 as shown in FIG. 4 for example. Likewise, a fifth print head 102 of a fifth print system 112 (P5) desirably is configured to generate a second support structure 48 operably positioned at least partially between the intermediate shell 28 and the outer shell 34 as shown in FIG. 4 for example.

As provided herein, while one or more of the print heads 102 deposit(s) material, the build plate 132 may rotate about the build axis $A_B$. In addition, any of the print heads 102 (e.g., in print systems P1, P2, P3 in FIGS. 22A-23B) may remain in a generally fixed common location relative to the build axis $A_B$, thereby forming a circular cross-section when the build plate 132 completes a full rotation about the build axis $A_B$. Additionally or alternatively, one or more of the print heads 102 may move in a direction that is perpendicular to the build axis $A_B$ as the build plate 132 rotates to form various features. For instance, the fourth print head 102 (print system P4 in FIGS. 22A-23B) may be controlled to actuate in radial movements toward and away from the build axis $A_B$ so that the first support structure 40 is printed with a first non-circular cross section. Similarly, the fifth print head 102 (print system P5 in FIGS. 22A-23B) may be controlled to actuate in radial movements toward and away from the build axis $A_B$ so that the second support structure 48 is printed with a second non-circular cross section.

Referring still to FIGS. 22A-23B, as a layer (or "road") of the print material PM is deposited, which may occur while the build plate 132 rotates about the build axis $A_B$, the axial actuator assembly 202 may alter a distance between the build plate 132 and the print heads 102 so that a subsequent layer of print material PM may be deposited on the previously deposited layer. The vertical movement of the build plate 132 along the build axis $A_B$ combines with the rotational movement of the build plate 132 around the build axis $A_B$ to produce a continuous helical deposition of material extruded from each of the multiple printing heads 102 during each complete revolution of the build plate 132. The build plate's vertical movement, which is illustrated by the dashed line arrow 266 in FIGS. 22A and 23A, along the build axis $A_B$, may be performed until the desired axial length of the 3D-printed sleeve 10 is completed. Due to the formation of the sleeve 10 from spiraling simultaneous deposits of road upon road of print material PM from each print head 102, the machine 100 operates to avoid the formation of undesirable features within the sleeve 10. For example, a "zipper" defect in the inner surface 22 of the inner shell 20 is avoided. Moreover, the sorts of problems associated with interfacing different types of material in different annular regions of conventional sleeves, leading to diminished strength and degrading the functionality of the conventional sleeve, are likewise avoided.

In some examples, the print sleeve 10 provided herein may include one or more additional layers thereon. For example, an outer covering, which may be in the form of a fiberglass layer or any other layer, may be positioned on at least the outer surface 38 of the outer shell 34. Further, in various examples, such outer covering may be produced by finely machining the outer surface 38 of the outer shell 34 for example. In such instances, a printing plate may be positioned on the machined outer surface 38.

Figure 24A:
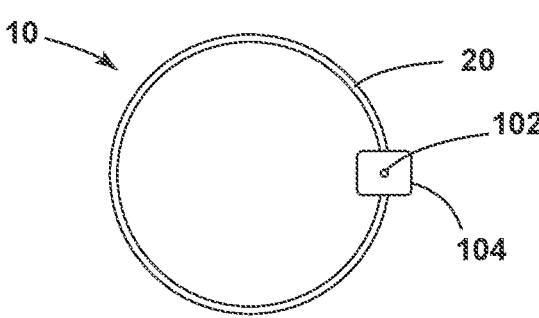
FIG. 24A is a schematic representation of a top plan view of a single print head forming an embodiment of a single layer sleeve in accordance with various aspects of the present disclosure.
Figure 24B:
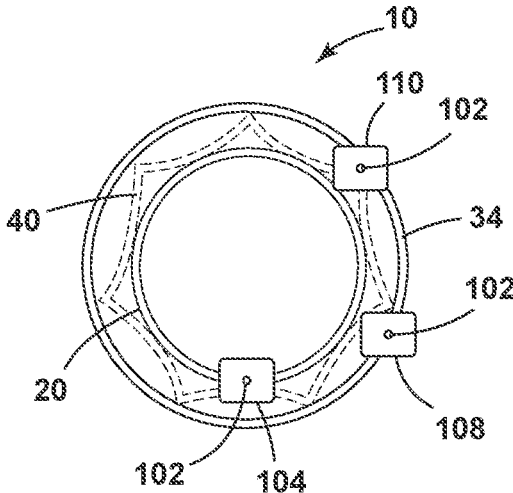
FIG. 24B is a schematic representation of a top plan view of three print heads that can move independently of each other while forming an embodiment of a multi-layer sleeve in accordance with various aspects of the present disclosure.
Figure 24C:
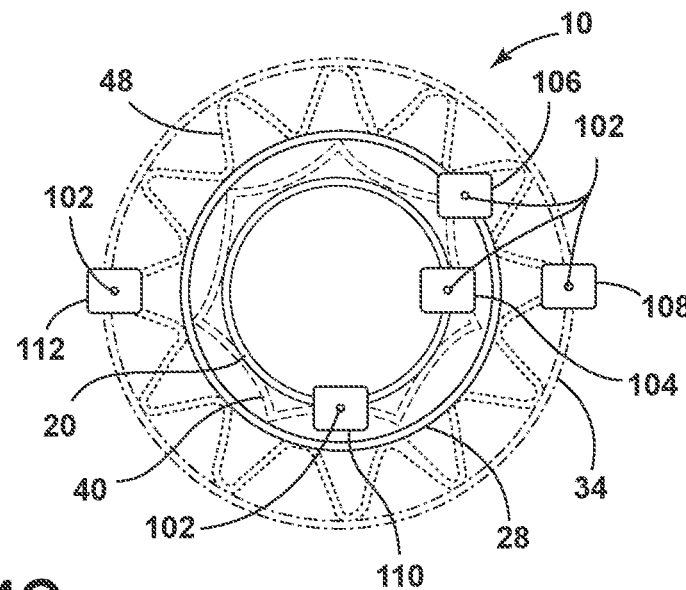
FIG. 24C is a schematic representation of a top plan view of five print heads that can move independently of each other while forming an embodiment of a multi-layer sleeve in accordance with various aspects of the present disclosure.

Referring to FIGS. 24A-24C, based on a number of print heads 102, various numbers of distinct shells may be contemporaneously formed by the operative print systems 104, 106, 108, 110, 112 of the machine 100 described herein. For example, as shown in FIG. 24A, if the machine 100 is set up to operate only a first print system 104, then the machine 100 can form an inner shell 20 or the precursor to a single layer print sleeve 10. As shown in FIG. 24B, if the machine 100 is set up for simultaneous operation of a first print system 104, a third print system 108, and a fourth print system 110, that are radially offset from one another, then the machine 100 can form an inner shell 20, an outer shell 34, and a first support structure 40 simultaneously as a unitary structure. As shown in FIG. 24C, if the machine 100 is set up for simultaneous operation of a first print system 104, a second print system 106, a third print system 108, a fourth print system 110, and a fifth print system 112 that are radially offset from one another, then the machine 100 can form an inner shell 20, an intermediate shell 28, an outer shell 34, a first support structure 40, and a second support structure 48 simultaneously as a unitary structure. Accordingly, as the number of print assemblies changes, then the number of distinctive sections of a print sleeve 10 that may be formed contemporaneously as a unitary structure, may also change accordingly.

Referring now to FIG. 25, a flow diagram of a method, which is generally designated by the numeral 300, for additively manufacturing a print sleeve is illustrated in accordance with aspects of the present subject matter. In general, the method 300 will be described herein with reference to the print sleeve shown in FIGS. 2-10 and the various machine components shown in FIGS. 11-24C. However, it will be appreciated that the disclosure herein may permit implementation of the disclosed method 300 with additive manufacturing machines having any other suitable machine configurations and/or within systems having any other suitable system configuration. In addition, although FIG. 25 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure and in order to make sleeves of different configurations in accordance with the present disclosure.

As illustrated, at (302), the method 300 can include rotating a build plate 132 about a build axis $A_B$ with a rotational actuator assembly 214.

At (304), the method 300 can include depositing a print material PM with one or more print assemblies 118. As provided herein, each of the one or more print assemblies 118 can include a separate print material PM which is controlled and driven to a respective print head 102 for each of the one or more print systems 104, 106, 108, 110, 112. In various instances, the print material PM provided to each respective print head 102 for each of the one or more print systems 104, 106, 108, 110, 112 may be configured as and/or include a natural or synthetic resin, a metal, glass, carbon, an inorganic material, or a combination of such materials.

In some cases, as shown, at (306), depositing print material PM with one or more print assemblies 118 can include depositing a first a road 60 of print material PM from a first print system 104 of the one or more print assemblies 118 to print at least a portion of an inner shell 20 as schematically shown in FIG. 5B for example. As provided herein and schematically shown in FIG. 5A for example, the inner shell 20 defines a channel 26 therethrough.

As shown, at (308), depositing a print material with one or more print assemblies can include depositing a second print material from a second print system 106 of the one or more print assemblies to print at least a portion of an intermediate shell 28.

As shown, at (310), depositing a print material with one or more print assemblies can include depositing a third print material from a third print system 108 of the one or more print assemblies to print at least a portion of an outer shell 34.

At (312), depositing a print material with one or more print assemblies can include depositing a fourth print material from a fourth print system 110 of the one or more print assemblies to print at least a portion of a first support structure 40 operably positioned at least partially between the inner shell 20 and the intermediate shell 28. At (314), the method can include moving a print head of the fourth print system 110 between a first radial position and a second radial position as the build plate 132 is rotated. In some examples, the first radial position is a first distance from a build axis $A_B$ and the second radial position is a second distance from the build axis $A_B$. In some examples, the second distance is greater than the first distance.

At (316), depositing a print material with one or more print assemblies can include depositing a fifth print material from a fifth print system 112 of the one or more print assemblies to print at least a portion of a second support structure 48 operably positioned at least partially between the intermediate shell 28 and the outer shell 34. At (318), the method can include moving a print head of the fifth print system 112 between a third radial position and a fourth radial position as the build plate is rotated. The third radial position is a third distance from the build axis $A_B$ and the fourth radial position is a fourth distance from the build axis $A_B$. In some examples, the third distance is greater than the fourth distance.

In various examples, a print head of the fourth print system 110 moves between the first radial position and the second radial position during a first time period, and a print head of the fifth print system 112 moves between the third radial position and the fourth radial position during a second time period. In various examples, the first time period may be varied from the second time period.

At (320), the method 300 can include translating the build plate from the one or more print systems 104, 106, 108, 110, 112 from a first axial position to a second axial position with an axial actuator assembly 202. In various examples, the second distance can be further from the one or more print systems 104, 106, 108, 110, 112 than the first position. In some cases, an anchor plate 196 is linearly moved with the build plate 132 while the build plate 132 rotates relative to the anchor plate 196.

At (322), the method 300 can include directing an airflow through the channel 26 of the inner shell 20 with a temperature control system 240. As provided herein, the temperature control system 240 can be configured to alter the temperature of the airflow within the temperature control system prior to distributing the airflow through the inner shell 20.

At (324), the method 300 can include heating a portion of the build plate 132 with a heating element such as the heating source 204 depicted in FIG. 19 for example. In some cases, the heating element is configured to rotate with the build plate 132. In various examples, the heating element can rotate with the build plate and relative to the anchor plate 196. However, in other examples, the build plate 132 may rotate relative to the anchor plate 196. At (326), the method 300 can include transferring electrical power to the build plate 132 during rotation of build plate 132 through a rotary joint 232.

In various examples, the method 300 may implement machine learning methods and algorithms that utilize one or several machine learning techniques, including, for example, decision tree learning, including, for example, random forest or conditional inference trees methods, neural networks, support vector vehicles, clustering, and Bayesian networks. These algorithms can include computer-executable code that can be retrieved by the computing system and/or through a network/cloud and may be used to evaluate and update the build model. In some instances, the machine learning engine may allow for changes to the build model to be performed without human intervention.

It is to be understood that the steps of any method disclosed herein may be performed by a computing system upon loading and executing software code or instructions that are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions that are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

With reference to FIG. 26, a flow diagram is provided as an example of control logic 400 that may be executed by the computing system 180 (or any other suitable computing system) for modeling the sleeve 10 that is to be printed by the machine 100 and producing the modeled sleeve 10 in accordance with aspects of the present subject matter. Specifically, the control logic 400 shown in FIG. 26 may use the Rhinoceros CAD graphic engine to model the sleeve 10 that is to be printed by the machine 100 with the distinct sections (20, 28, 34, 40, 48). The Rhinoceros CAD graphic engine currently is accessible at the following URL: rhino3d.com. However, any computer-aided design software package other than the Rhinoceros CAD graphic engine may be used to model the sleeve to be printed. The software executed on the computing system 180 to control the machine 100 to print the sleeve 10 uses Grasshopper's open source platform, which currently is accessible at the following URL: grasshopper3d.com. The software likewise uses Grasshopper's adaptable and user-friendly user interface. The digital files generated by the Rhinoceros CAD graphic engine to describe the desired dimensions and configuration of the sleeve 10 that is to be printed by the machine 100, are provided, at 402, to the computing system 180 executing the software used to control the machine 100 to print the sleeve 10. The software executed on the computing system 180 is configured with slicing algorithms, which are developed on Grasshopper's open-source platform. The slicing algorithms, at 404, are configured to slice the digital description of the sleeve 10 from the Rhinoceros CAD graphic engine so as to define a single 360° rotation of the build plate 132 for each of the print systems (104, 106, 108, 110, 112) that is responsible for printing a respective one of the distinctive radially disposed sections (20, 28, 34, 40, 48) of the sleeve 10.

Each of the 3D print systems 104, 106, 108, 110, 112 that prints a respective one of the distinct sections (20, 28, 34, 40, 48) of the sleeve 10 is controlled by a modified version of the RepRap open-source firmware that uses the G-code computer language and that is compatible with DUET electronics control electronics for controlling the 3D print systems 104, 106, 108, 110, 112. DUET electronics can be contacted at Brunswick, Victoria Australia, and accessed using the following URL: duet.com.au. The RepRap open-source firmware, which ordinarily exercises control based on the 3-axis orthogonal (X, Y, Z) kinematics, currently is accessible at the following URL: reprap.org. The software executed on the computing system 180, at 406, converts the digital output of the slicing algorithms into the G-code language that is cognizable by the RepRap firmware that controls the operation of the individual 3D print systems 104, 106, 108, 110, 112. Moreover, the software executed on the computing system 180 has modified the RepRap open-source firmware in order to make the necessary transformation to exercise simultaneous control over the 3D print systems 104, 106, 108, 110, 112 based on the cylindrical (r, θ, Z) kinematics that are desired for the generally cylindrical structure of the sleeve 10. Thus, for example, each of the fourth print system 110, which prints the first support structure 40, and the fifth print system 112, which prints the second support structure 48, is controlled by the software to move radially back and forth between end points at specified radial distances from the build axis $A_B$ a specified number of times during each 360° rotation of the build plate 132. The software's slicing algorithms provide the slicing outputs in G-code, at 406, for controlling each of the 3D print systems 104, 106, 108, 110, 112 that prints a respective one of the distinct sections (20, 28, 34, 40, 48) of the sleeve 10. Moreover, based on the dimensions of the sleeve 10, the configurations of the distinctive sections (20, 28, 34, 40, 48) of the sleeve 10, the composition of the print material PM, and the dispensing rate of the print material PM from the dispensing area of each of the nozzles 102 of the print systems 104, 106, 108, 110, 112, the software, at 408, simultaneously controls multiple print systems 104, 106, 108, 110, 112 and calculates the relative timing of the rotational speed of the build plate 132, the axial speed of descent of the build plate 132, and the specific geometrical trajectory that each of the print systems 104, 106, 108, 110, 112 is to follow in order to print the respective distinctive portion of the sleeve 10. As to the latter for example, the software, at 408 would specify the number of times the fourth and fifth print systems 110, 112 must move back and forth between their end points. The software, at 410, also accordingly controls the temperature of the build plate 132, the temperature of the extruders of the print systems 104, 106, 108, 110, 112 and the heated air circulating through the hollow internal region 26 defined by the inner surface 22 of the inner shell 20.

While an almost infinite variety of sleeves 10 can be made according to the present disclosure when taking account of possible different diameters, lengths, and internal constructions, a detailed description of a fairly typical example of a multi-layer print sleeve 10 made in accordance with an embodiment of the present invention now will be described below. The overall dimensions of the print sleeve 10 include a length along the central axis of rotation $A_R$ of the sleeve 10 of 1.290 meters, an external diameter of 148 mm, and an unexpanded internal diameter of 108 mm. The sleeve 10 includes five identifiable sections that are distinctive because of the different functions performed by each section and accordingly lend themselves to a better understanding of the present invention.

Each of the five functionally distinctive sections is identifiable by its unique configuration and dimensions, and accordingly, the machine 100 is set up to include five separate print heads 102. A first print head 102 is set up in a first print system 104 and configured to print at least a portion of the inner shell 20 such as shown in one or more than FIGS. 2-10, 22B, 23B, and 24E for example. The function of the inner shell 20 is resiliently repeatable expansion and contraction that enables the sleeve 10 to be repeatedly mounted and dismounted on mandrels, whether on a printing machine or a construction mandrel for further processing of the sleeve 10.

A second print head 102 is set up in a second print system 106 and configured to print at least a portion of an intermediate shell 28 such as shown in one or more than FIGS. 2-4 and 8-10 for example. A third print head 102 is set up in a third print system 108 and configured to print at least a portion of an outer shell 34 such as shown in one or more than FIGS. 2-4, 22B, and 23B for example. The outer shell 34 functions as a rigid member that maintains diametric integrity under the inertial forces that affect a rapidly rotating sleeve 10 in use on a printing machine. The outer shell 34 additionally functions to provide an outer surface 38 that lends itself to machining to a high tolerance of cylindrical dimension.

A fourth print head 102 is set up in a fourth print system 110 configured to generate a first support structure 40, which is connected to the inner shell 20 as schematically shown in FIG. 6 for example. In the printed sleeve 10, this first support structure 40 is operably positioned at least partially between the inner shell 20 and the intermediate shell 28 as shown in one or more of FIGS. 2-4, 22B, 23B, and 24E for example. The first support structure 40 functions as a light weight spring between the inner shell 20 and the intermediate shell 28 and absorbs the expansion and contraction of the inner shell 20 with relation to the intermediate shell 28, which functions as a backstop for the spring-like action of the first support structure 40.

A fifth print head 102 is set up in a fifth print system 112 configured to generate a second support structure 48 schematically shown in FIG. 7 for example. In the printed sleeve 10, this second support structure 48 is operably positioned at least partially between the intermediate shell 28 and the outer shell 34 as shown in one or more than FIGS. 2-4, 22B, 23B, and 24E for example. The second support structure 48 functions as a light weight rigid bolster between the intermediate shell 28 and the outer shell 34 and provides additional rigidity that assures against undesired deviation of the cylindrical dimension of the outer surface 38 of the outer shell 34 under the inertial forces that affect a rapidly rotating sleeve 10 in use on a printing machine.

The machine 100 described in detail above to unitarily generate the sleeve 10 in this example has been provided with the following construction. The diameter of the build plate 132 is 450 millimeters and rotates at a rate that makes one complete 360° rotation about the build axis $A_B$, which coincides with the central axis $A_R$ of the sleeve 10, in eight (8) seconds during which the build plate 132 moves axially along the central axis $A_R$ of the sleeve 10 a distance of 0.3 mm. As schematically shown in FIG. 5B for example, the 0.3 mm distance that the build plate 132 descends during each 360° rotation of the build plate 132, becomes the axial thickness "d" of each road 60 being printed in a single complete rotation of the build plate 132.

The nozzle 150 in the print head 102 of the first print system 104 has an opening 152 defining a circular dispensing area with a diameter of 0.7 mm. The first print system 104 holds the first print head 102 in a fixed orientation as the build plate 132 rotates and descends axially so that the center of the opening 152 of the nozzle 150 of the first print head 102 is maintained at a radial distance of 54.45 mm from the central axis $A_R$ of the sleeve 10 while the machine 100 prints each road cycle of the inner shell 20 of the sleeve 10. As schematically shown in FIG. 5B, the width "w" of the road 60 being printed by the first print head 104 becomes the 0.7 mm radial thickness of the inner shell 20.

The nozzle 150 in the print head 102 of the second print system 106 has an opening 152 defining a circular dispensing area with a diameter of 1.0 mm. The second print system 106 holds the second print head 102 in a fixed orientation as the build plate 132 rotates and descends axially so that the center of the opening 152 of the nozzle 150 of the second print head 102 is maintained at a radial distance of 59.1 mm from the central axis $A_R$ of the sleeve 10 while the machine 100 prints each road cycle of the intermediate shell 28 of the sleeve 10.

The nozzle 150 in the print head 102 of the third print system 108 has an opening 152 defining a circular dispensing area with a diameter of 1.2 mm. The third print system 108 holds the second print head 102 in a fixed orientation as the build plate 132 rotates and descends axially so that the center of the opening 152 of the nozzle 150 of the third print head 102 is maintained at a radial distance of 74.7 mm from the central axis $A_R$ of the sleeve 10 while the machine 100 prints each road cycle of the outer shell 34 of the sleeve 10.

Figures 22A, 22B, 23A, 23B:
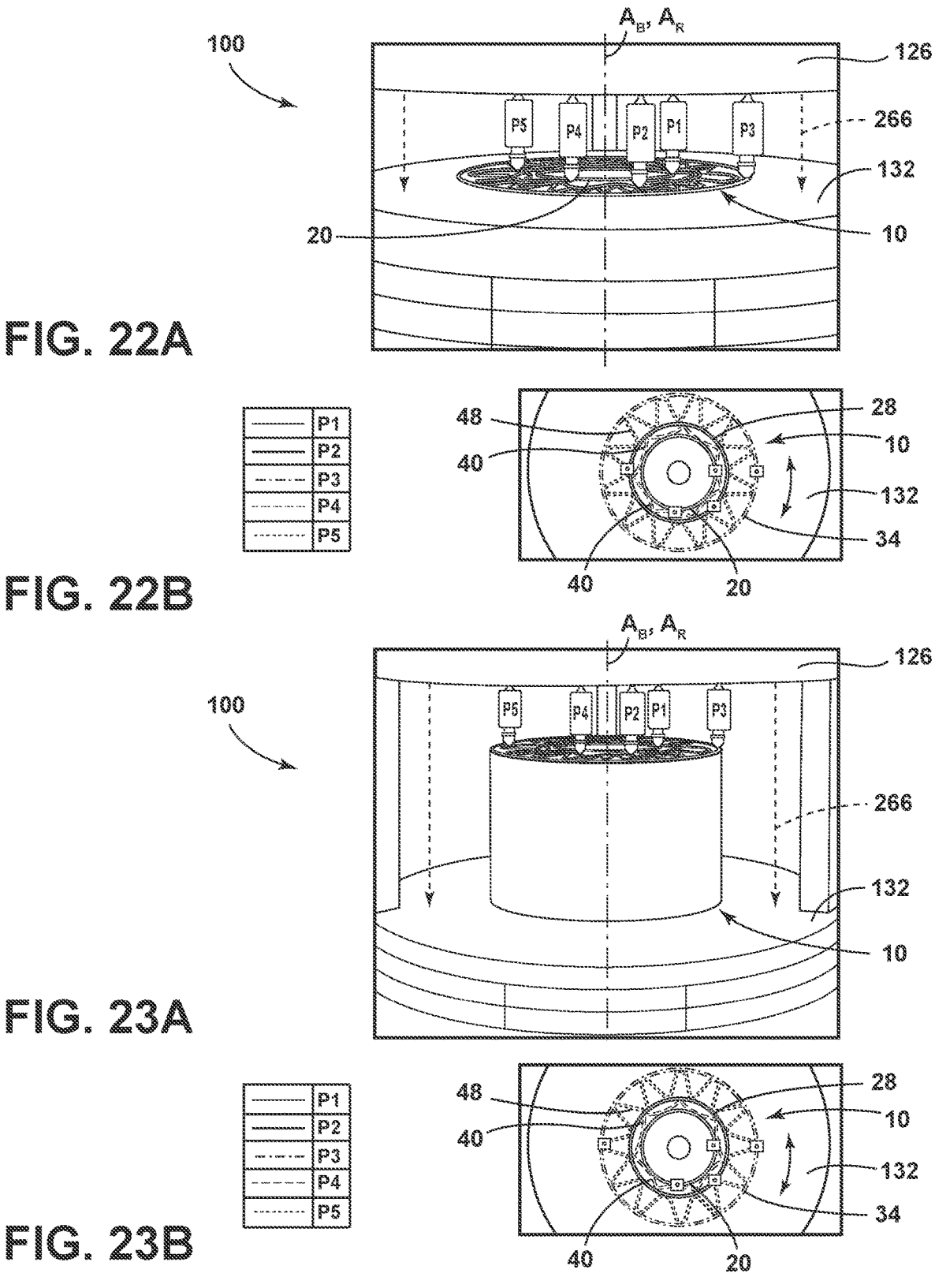
FIG. 22A is a schematic perspective view of an embodiment of the machine and the sleeve at a first build position in accordance with various aspects of the present disclosure.
FIG. 22B is a top view of the of the machine and the sleeve at the first build position in accordance with various aspects of the present disclosure.
FIG. 23A is a schematic perspective view of an embodiment of the machine and the sleeve at a second build position in accordance with various aspects of the present disclosure.
FIG. 23B is a top view of the of the machine and the sleeve at the second build position in accordance with various aspects of the present disclosure.

The nozzle 150 in the print head 102 of the fourth print system 110 has an opening 152 defining a circular dispensing area with a diameter of 0.7 mm. The fourth print system 110 moves the fourth print head 102 in a radial direction as the build plate 132 rotates and descends axially to print each road cycle of the first support structure 40 shown schematically in FIG. 6. The end points of the radial distance between which the center of the opening 152 in the nozzle 150 in the print head 102 is moved by the fourth print system 110 as measured from the central axis $A_R$ of the sleeve 10 is between 55.25 mm and 58 mm. While the machine 100 prints each road cycle of the first support structure 40 of the sleeve 10 as schematically shown in FIG. 22B for example, the fourth print system 110 moves the center of the opening 152 in the nozzle 150 in the print head 102 of the fourth print system 110 ten (10) times between 55.25 mm and 58 mm from the central axis $A_R$ of the sleeve 10.

The nozzle 150 in the print head 102 of the fifth print system 112 has an opening 152 defining a circular dispensing area with a diameter of 1.2 mm. The fifth print system 112 moves the fourth print head 102 in a radial direction as the build plate 132 rotates and descends axially to print each road cycle of the second support structure 48 shown schematically in FIG. 7. The end points of the radial distance between which the center of the opening 152 in the nozzle 150 in the print head 102 is moved by the fifth print system 112 as measured from the central axis $A_R$ of the sleeve 10 is between 60.2 mm and 73.4 mm. While the machine 100 prints each road cycle of the second support structure 48 of the sleeve 10 shown in FIG. 22B for example, the fifth print system 112 moves the center of the opening 152 in the nozzle 150 in the print head 102 of the fifth print system 112 twelve (12) times between 60.2 mm and 73.4 mm from the central axis $A_R$ of the sleeve 10.

Each of the print systems 104, 106, 108, 110, 112 is dispensing the identical thermoplastic material PM, which is chemically resistant. The thermoplastic material PM is a polyolefin and specifically 75% by weight polypropylene, 20% by weight carbon fibers, and 5% by weight conductivity fillers and available from suppliers such as, for example, Lehmann & Voss & Co. KG of Hamburg, Germany. The conductivity fillers desirably are carbon black, but can be carbon nanotubes. The thermoplastic material PM has a conductivity of about one Mohm, a density of 1.02 g/cm^3, a Young's modulus of 6.5 GPa, a tensile stress of 60 MPa, and an impact resistance of 39 KJ/m^2. The thermoplastic material PM is dispensed in an environment with temperatures between 2° and 40° C., here specifically 27° C. for this example, and relative humidity between 30% and 60%, here 40% relative humidity for this example.

The thermoplastic material PM is dispensed from the opening 152 of the nozzle 150 of the first print head 102 by the first print system 104 at a temperature of 255° C. The thermoplastic material PM is dispensed from the opening 152 of the nozzle 150 of the first print head 102 by the first print system 104 at a rate of 42.72 mm per second.

The thermoplastic material PM is dispensed from the opening 152 of the nozzle 150 of the second print head 102 by the second print system 106 at a temperature of 255° C. The thermoplastic material PM is dispensed from the opening 152 of the nozzle 150 of the second print head 102 by the second print system 106 at a rate of 46.0375 mm per second.

The thermoplastic material PM is dispensed from the opening 152 of the nozzle 150 of the third print head 102 by the third print system 108 at a temperature of 255° C. The thermoplastic material PM is dispensed from the opening 152 of the nozzle 150 of the third print head 102 by the third print system 106 at a rate of 46.42 mm per second.

The thermoplastic material PM is dispensed from the opening 152 of the nozzle 150 of the fourth print head 102 by the fourth print system 110 at a temperature of 255° C. The thermoplastic material PM is dispensed from the opening 152 of the nozzle 150 of the fourth print head 102 by the fourth print system 110 at a rate of 60 mm per second.

The thermoplastic material PM is dispensed from the opening 152 of the nozzle 150 of the fifth print head 102 by the fifth print system 110 at a temperature of 255° C. The thermoplastic material PM is dispensed from the opening 152 of the nozzle 150 of the fifth print head 102 by the fifth print system 110 at a rate of 57.88 mm per second.

As the sleeve 10 is being printed, the temperature control system 240 provides a constant air flow through the center of the sleeve 10 at a temperature of 50° C.±5° C. The structure made by the machine will be mounted onto a construction mandrel for inspection and possibly some fine machining to the desired tolerance of the outer surface 38 of the sleeve 10 before being deemed a finished sleeve 10. And in this sense, the structure made by the machine can be considered a precursor of the finished sleeve 10.

While the above example pertains to a flexographic printing sleeve 10, persons schooled in the present disclosure will appreciate that a bridge sleeve is similarly attainable in accordance with the present disclosure. Bridge sleeves come in two basic types that are distinguishable by the manner in which pressurized air is provided to the bridge sleeve's external surface on which a print sleeve 10 is mounted. One type of bridge sleeve disclosed in commonly owned in U.S. Pat. No. 5,819,657 to Rossini, which patent is hereby incorporated herein in its entirety by this reference for all purposes, relies on axially supplied pressurized air to expand the inner shell of a print sleeve during mounting of the print sleeve on the external surface of the axial air bridge sleeve. In the axial air bridge sleeve, pressurized air is provided from one end of the axial air bridge sleeve and travels axially along an internal channel before exiting from holes bored radially through the outer shell of the axial air bridge sleeve. Plant air provides the source of the pressurized air and is selectively connected via a pressure hose to one end of the axial air bridge sleeve.

Figure 3A:
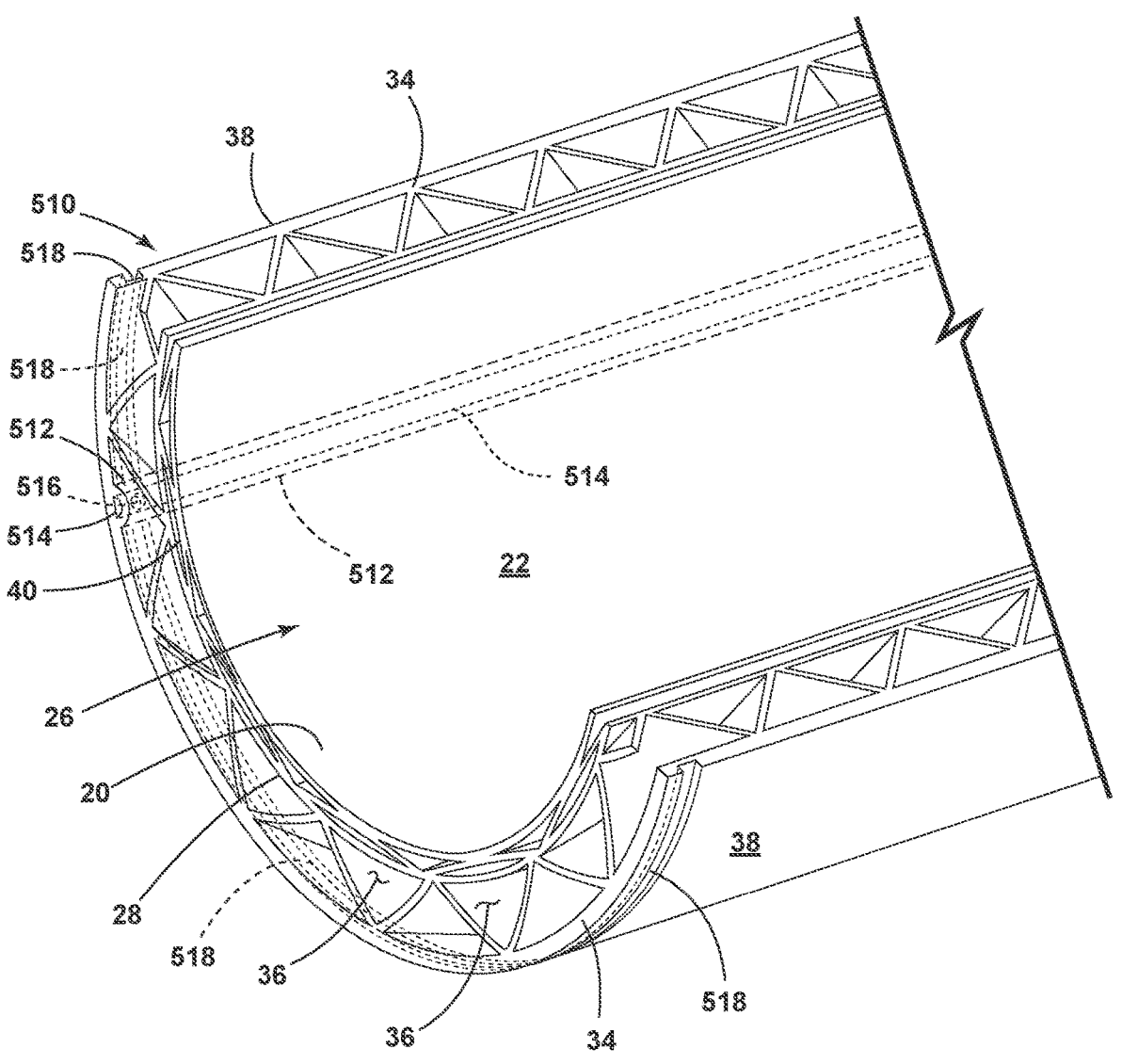
FIG. 3A is a schematic perspective view of an end portion of an embodiment of an axial air bridge sleeve in accordance with various aspects of the present disclosure.
Figure 4A:
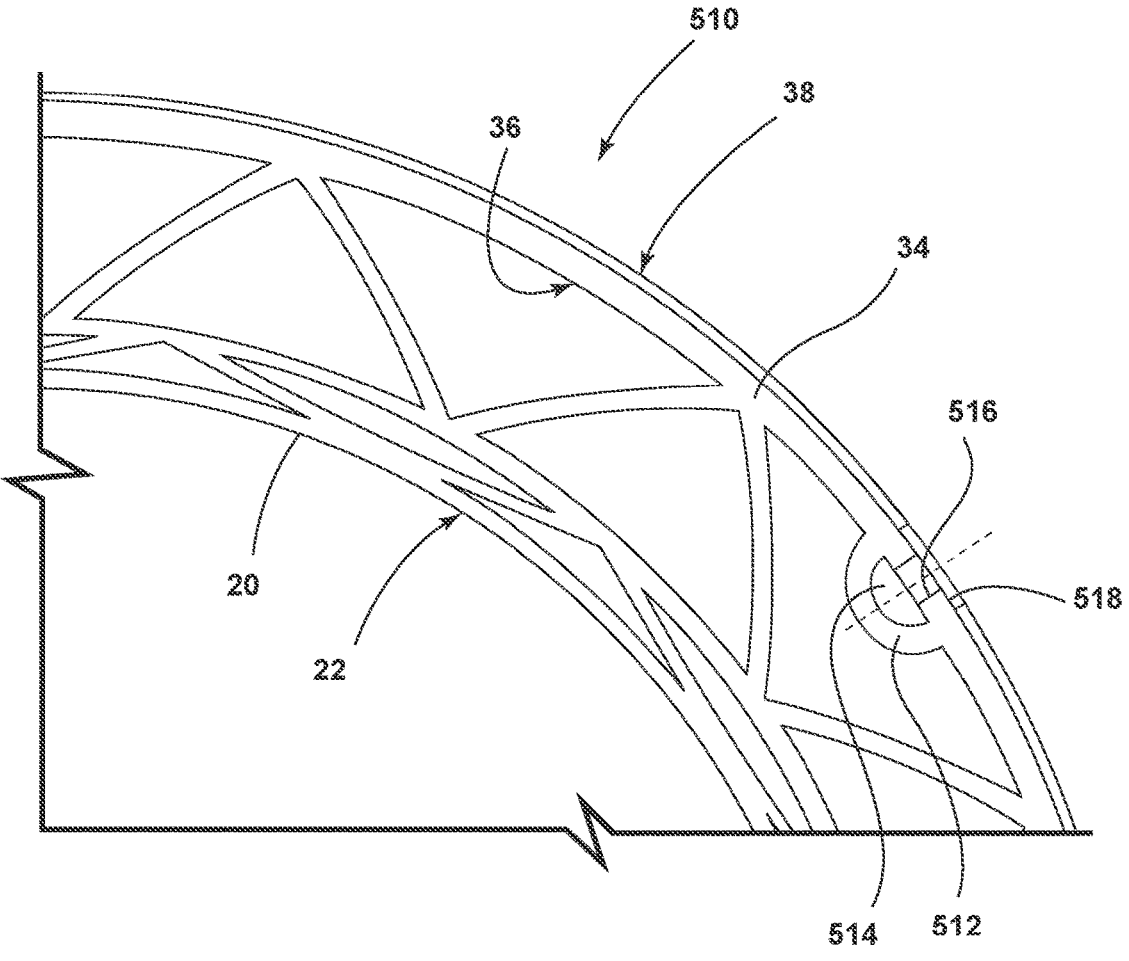
FIG. 4A is a schematic cross-sectional view, but without normal cross-hatching, looking along the direction of the axis of rotation at a portion of an embodiment of an axial air bridge sleeve in accordance with various aspects of the present disclosure.

The main difference between the 3D print sleeve 10 and an axial air 3D bridge sleeve 510 is schematically illustrated in FIGS. 3A and 4A. As shown therein, a 3D bridge sleeve 510 of the axial air supply type is formed by the 3D printing of at least one axially extending air channel 512 on the inner surface 36 of the outer shell 34 of the 3D bridge sleeve 510. The axial air channel 512 defines a hollow interior providing a continuous air passage 514 stretching axially along the length of the sleeve 510. The outline of part of the air channel 512 in FIG. 3A is shown in parallel dashed lines because that part of the air channel 512 would be hidden from the viewer in the view shown in FIG. 3A. The outline of part of the air passage 514 in FIG. 3A is shown in parallel dashed lines because that part of the air passage 514 would be hidden from the viewer in the view shown in FIG. 3A. The print machine 100 desirably allocates a sixth printing system, which is configured like each of the other five printing systems 104, 106, 108, 110, 112, to print the feature that becomes the axial air channel 512. While the shape of the structure that defines the axial air channel 512 is half-cylindrical in the embodiment shown, the shape also could be more of a half-triangular shape or an arcuate shape that is not strictly a half-cylinder.

Figure 2:
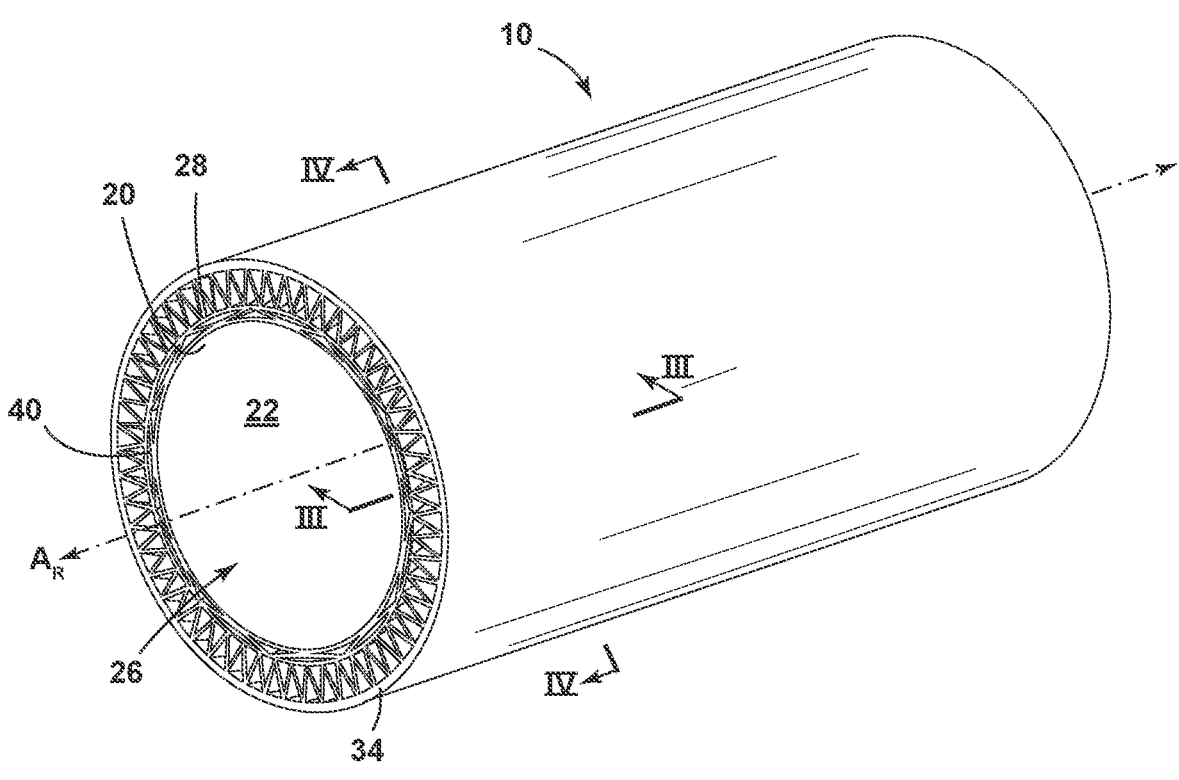
FIG. 2 is an elevated perspective view of an embodiment of a multi-layer print sleeve made in accordance with various aspects of the present disclosure.
Figure 2A:
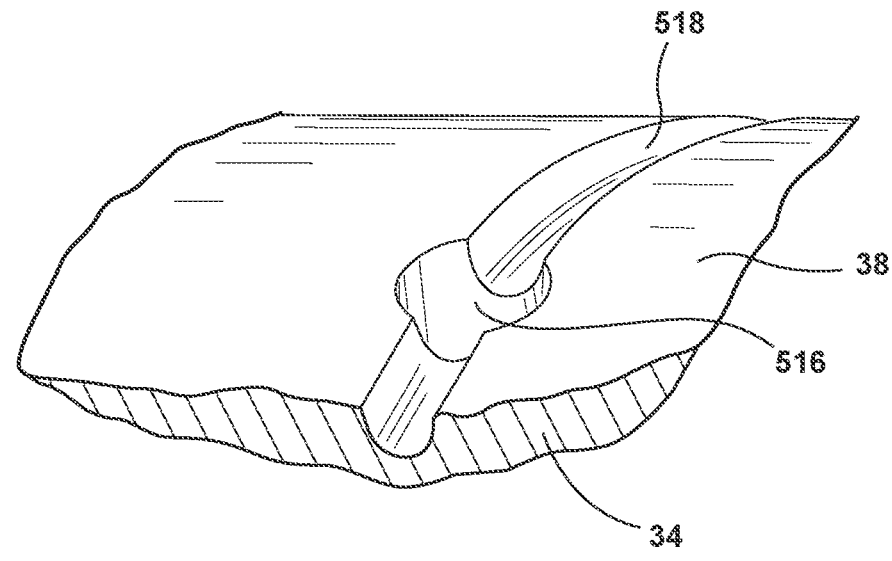
FIG. 2A is a schematic perspective view of a partial section of an outer shell of an embodiment of a radial air bridge sleeve in accordance with various aspects of the present disclosure.

As shown schematically in FIGS. 3A and 4A, pressurized air is brought to the outer surface 38 of the axial air bridge sleeve 510 via one or more air discharge apertures 516 that are drilled in post-print processing. The outline of the air discharge aperture 516 in FIG. 3A is represented in a dashed line because it would be hidden from the viewer in the view shown in FIG. 3A. The diameter of each air discharge aperture 516 desirably is on the order of 3 mm. As shown schematically in FIG. 4A, each air discharge aperture 516 extends radially through the outer shell 34 of the axial air bridge sleeve 510. In one embodiment schematically shown in FIGS. 2A, 3A, and 4A, a shallow air distribution groove 518 is defined circumferentially around the outer surface 38 of the outer shell 34 of the axial air bridge sleeve 510 during post-print processing of the axial air bridge sleeve 510. The outline of the air distribution groove 518 in FIG. 3A is represented in parallel dashed lines because the air distribution groove 518 would be hidden from the viewer in the view shown in FIG. 3A. As shown in FIG. 4A, the air discharge aperture 51 is aligned to be connected to the air distribution groove 518 and aligned to be connected with the axial air channel 512. The view schematically represented in FIG. 4A is taken through the center of the air distribution groove 518 and looking along the axis of rotation $A_R$ but forgoing any cross-hatching normally depicted in a cross-section view. The circumferential groove 518 desirably is located about 15 mm from one free edge of the axial air bridge sleeve 510 and desirably measures 5 mm to 6 mm in the direction of the axis of rotation $A_R$ of the axial air bridge sleeve 510. The depth of the circumferential groove 518 desirably is on the order of 0.3 mm measured in the radial direction with respect to the axis of rotation $A_R$ of the axial air bridge sleeve 510.

Depending on the length and diameter of the axial air bridge sleeve 510, additional features such as additional axial air channels 512 can be printed symmetrically around the inner surface 36 of the outer shell 34. An air discharge aperture 516 is aligned to be connected with each additional axial air channel 512. Moreover, additional circumferential grooves 518 can be disposed in the outer surface 38 of the outer shell 34 and disposed spaced apart from the first circumferential groove 518 in the direction of the axis of rotation $A_R$ of the axial air bridge sleeve 510. Each of the additional circumferential grooves 518 likewise is connected to communicate with an air discharge aperture 516 that is drilled in post-print processing. In a further embodiment, each opposite end of each of the axial air channels 512 of the axial air bridge sleeve 510 can be connected during post-print processing to a respective end fixture that itself is 3D printed and configured for example to function in a similar manner as the end flanges of the bridge sleeve shown in FIG. 2 of the aforementioned U.S. Pat. No. 5,819,657 to Rossini.

Figure 3B:
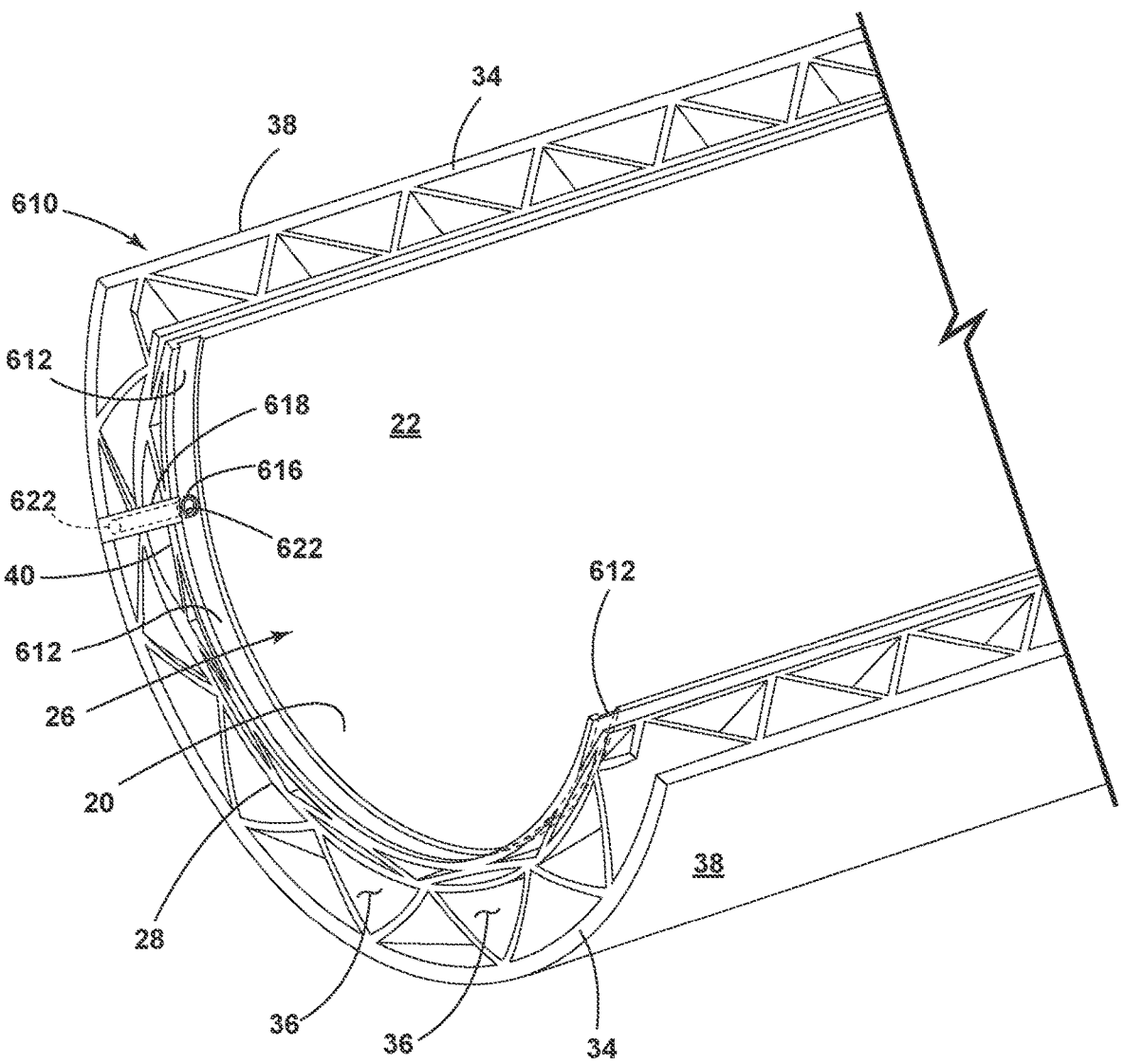
FIG. 3B is a schematic perspective view of an end portion of an embodiment of a radial air bridge sleeve in accordance with various aspects of the present disclosure.
Figure 4B:
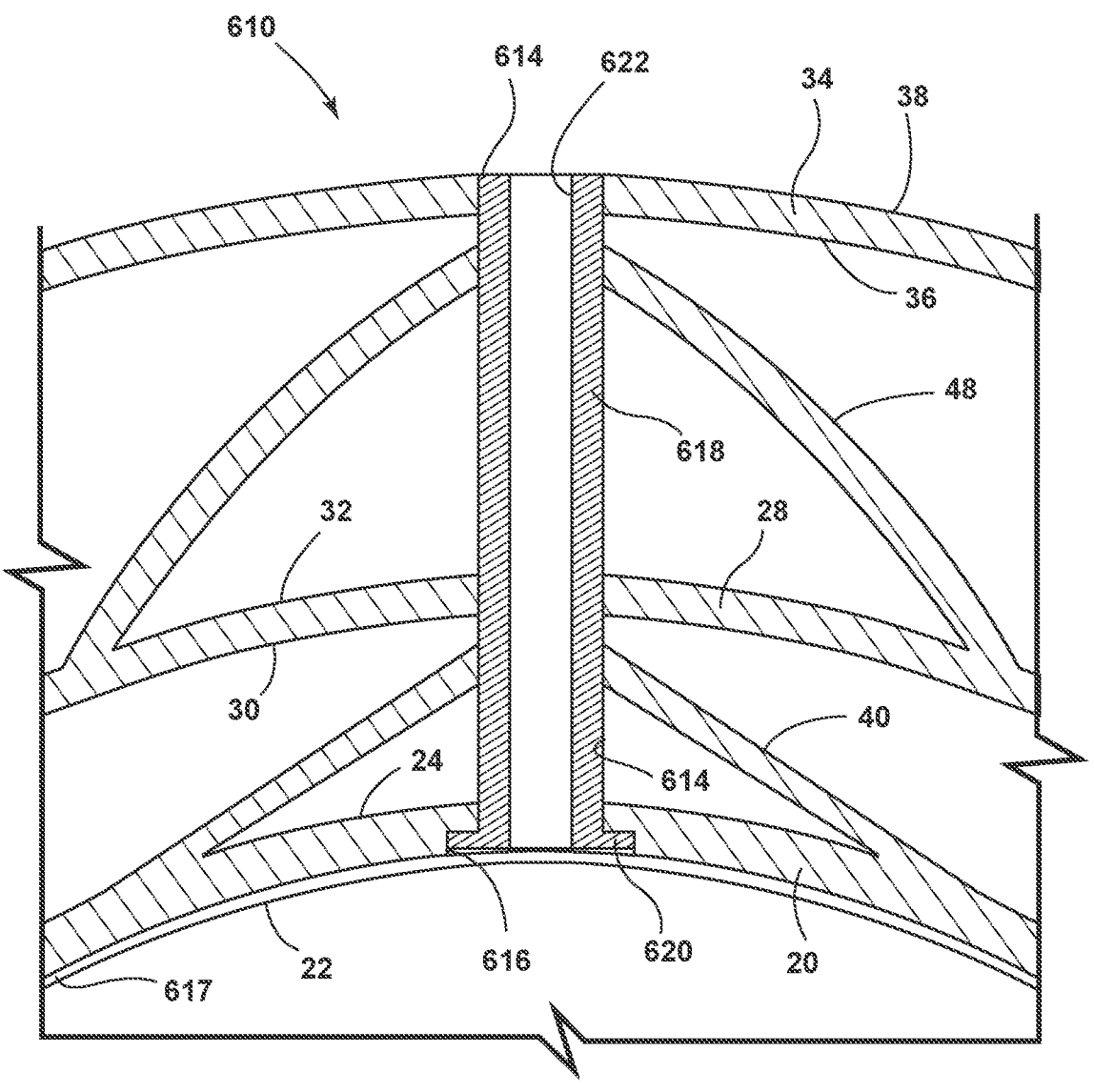
FIG. 4B is a schematic cross-sectional view, but without normal cross-hatching, looking along the direction of the axis of rotation at a portion of an embodiment of a radial air bridge sleeve in accordance with various aspects of the present disclosure.
Figure 4C:
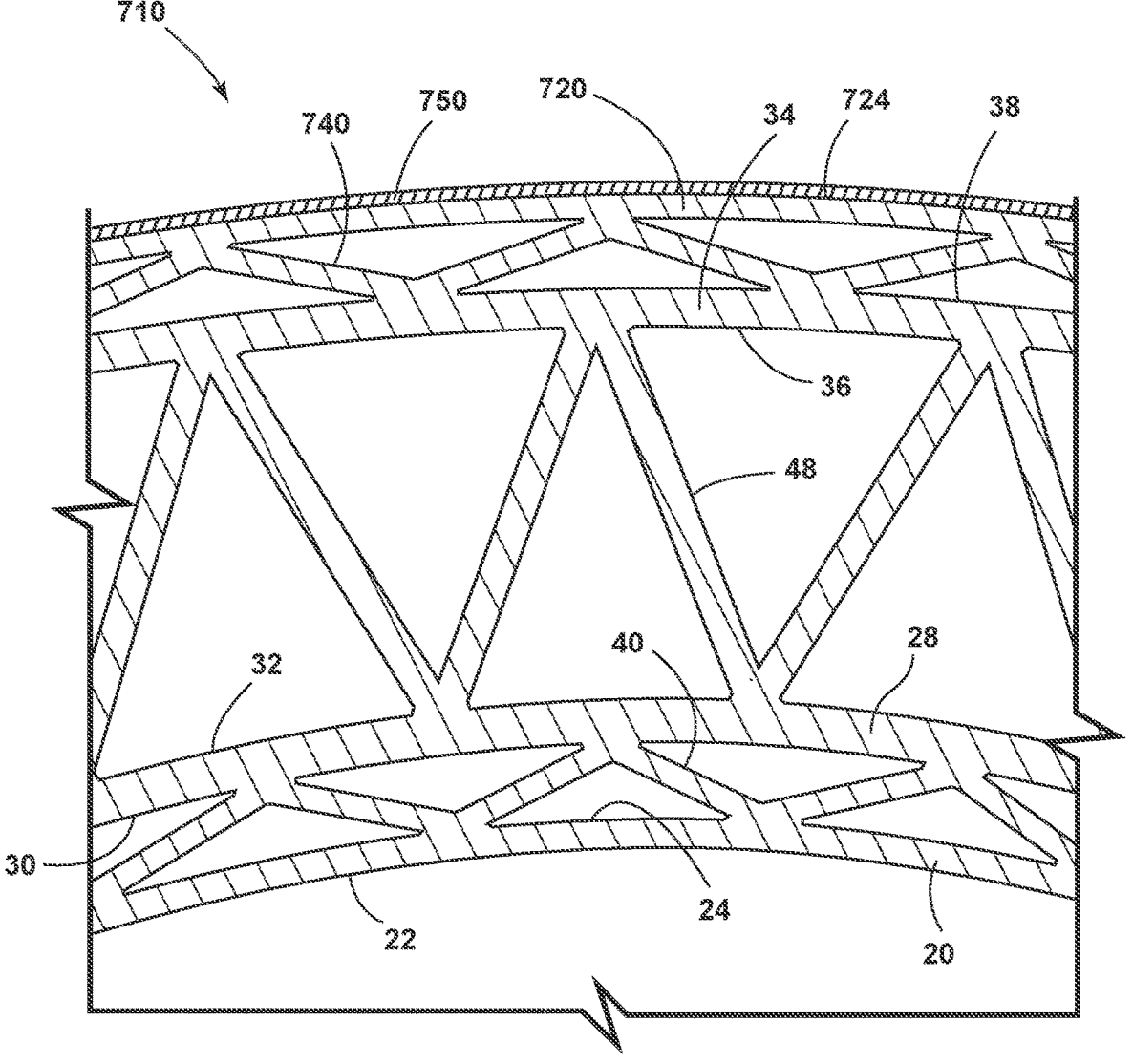
FIG. 4C is a schematic cross-sectional view looking along the direction of the axis of rotation at a portion of additional embodiments of a sleeve in accordance with various aspects of the present disclosure.

A second type of bridge sleeve is a radial air bridge sleeve 610 that relies on radially supplied pressurized air that is provided from the holes 16 (FIG. 1) of the mandrel 14 of the printing machine. As schematically shown in FIGS. 3B and 4B, a shallow groove 612 is defined circumferentially into the inner surface 22 of the core 20 that defines the cylindrical opening 26 through the radial air bridge sleeve 610. The shallow groove 612 desirably is located centered in correspondence with the holes on the mandrel 14 (FIG. 1) and desirably measures 5 mm to 6 mm from a free edge of the sleeve 610 in the direction of the axis of rotation $A_R$ of the radial air bridge sleeve 610. The view schematically represented in FIG. 4B is a small portion of the sleeve 610 taken through the center of the shallow groove 612 and looking along the axis of rotation $A_R$. The depth of the shallow groove 612 desirably is on the order of 0.3 mm measured in the radial direction with respect to the axis of rotation $A_R$ of the radial air bridge sleeve 610. When the radial air bridge sleeve 610 is mounted on the mandrel 14 (FIG. 1) of the printing machine, the holes 16 that discharge pressurized air from within the mandrel 14 are aligned with the shallow groove 612 to distribute pressurized air within the shallow groove 612.

FIG. 4B schematically depicts a small section of the radial bridge sleeve 610, which had been post-print processed by drilling a hole 614 radially through the sleeve 610. The inner surface 22 is provided with a countersunk portion 616 surrounding the hole 614. A generally cylindrical plug 618 is inserted into the radial hole 614, and the annular disk-shaped side flange 620 of the plug 618 is glued into the countersunk portion 616 of the hole 614. The plug 618 defines an air passage 622 through the center of the plug 618. The diameter of the air passage 622 desirably is 2 mm, and the cross-sectional diameter of the plug 618 desirably is 6 mm. The axial length of the plug 618 will depend on the radial thickness of the sleeve 610. The hole 614 with its countersunk portion 616 combine with the air passage 622 through the plug 618 to define an unobstructed pathway for pressurized air to be brought from inside the mandrel 14 (not shown in FIG. 4B) to the outer surface 38 of the sleeve 610. Desirably, similar holes 614 and plugs 618 are provided through and arranged symmetrically around the circumference of the radial bridge sleeve 610 to form a plurality of similar radial air passages 622. Each of the plurality of similar radial air passages 622 connects the shallow groove 612 through the radial air bridge sleeve 610 and to the outer surface 38 of the outer shell 34 of the radial air bridge sleeve 610. At least six such radial air passages 622 are typical, and that number can grow to eight for radial bridge sleeves 610 having commensurately larger diameters of the outer shell 34. In this way, pressurized air exiting the holes 16 in the mandrel 14 fills the aligned shallow groove 612 and distributes to the plurality of radial air passages 622 to the outer surface 38 of the radial bridge sleeve 610. Thus, pressurized air exits the radial air passages 622 in the outer surface 38 of the radial air bridge sleeve 610 for mounting a print sleeve 10 in much the same manner as the print sleeve 10 would be air mounted to the mandrel 14 of the printing machine. Being disposed symmetrically around the circumference of the radial bridge sleeve 610 and being of the same shapes and dimensions, these drill plugs 618 do not create an unbalance when the bridge sleeve 610 is rotating on a mandrel 14 of the printing machine or on a construction mandrel during post-print processing.

In post-production processing of the radial air bridge sleeve 610 printed by the machine 100, each of the drill plugs 618 can be radially drilled through to provide a continuous radial air passage 622 from the inner surface 22 of the inner shell 20 through the outer surface 38 of the outer shell 34 as schematically shown in the view in FIG. 4B of the exploded partial segment of the radial air bridge sleeve 610. In this way, pressurized air can be provided to flow radially through the radial air passages 622 for mounting a print sleeve 10 onto the bridge sleeve 610 in a manner similar to how the print sleeve 10 would be mounted on the printing mandrel 14 (FIG. 1) of a flexographic printing machine for example.

Because each of the sleeves 10, 510, 610 described in the examples above is made entirely of thermoplastic material, when the sleeve 10, 510, 610 has ended its useful life, then the sleeve 10, 510, 610 can be crushed and ground up into a granulated thermoplastic material that can be remelted and reused to create another 3D sleeve or some other 3D printed object.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

| List of reference numerals | |
| --- | --- |
| Text | Ref Label |
| print sleeve | 10 |
| outer surface | 12 |
| printing mandrel | 14 |
| holes | 16 |
| valve | 18 |
| inner shell, precursor | 20 |
| inner surface | 22 |
| cylindrical outer surface | 24 |

-continued

| List of reference numerals | |
| --- | --- |
| Text | Ref Label |
| hollow internal region | 26 |
| intermediate shell | 28 |
| inner surface | 30 |
| outer surface | 32 |
| outer shell | 34 |
| inner surface | 36 |
| axial air channel | 37 |
| outer surface | 38 |
| air passage of the axial air channel 37 | 39 |
| first support structure | 40 |
| first solid portion | 42 |
| contact points | 44 |
| at least one connection point | 46 |
| second support structure | 48 |
| second solid portion | 50 |
| circumferential groove | 51 |
| adjacent contact points | 52 |
| air exit air passage | 53 |
| at least one connection point | 54 |
| air opening | 55 |
| apex region | 56 |
| intersection points | 58 |
| road of print material | 60 |
| machine | 100 |
| print head | 102 |
| first print system | 104 |
| second print system | 106 |
| third print system | 108 |
| fourth print system | 110 |
| fifth print system | 112 |
| machine housing | 114 |
| base assembly | 116 |
| print assembly | 118 |
| base plate | 120 |
| one or more feet | 122 |
| one or more supports | 124 |
| first plate | 126 |
| second plate | 128 |
| one or more supports | 130 |
| build plate | 132 |
| brace | 134 |
| slide assembly | 136 |
| first portion | 140 |
| slot | 142 |
| second portion | 144 |
| track | 146 |
| radial actuator assembly | 148 |
| nozzle | 150 |
| dispensing opening | 152 |
| feeding conduit | 154 |
| concentrated heat source | 156 |
| housing | 158 |
| appendage | 160 |
| mounting plate | 162 |
| material supply assembly | 164 |
| supply bracket | 166 |
| feeder | 168 |
| reel | 170 |
| guide | 172 |
| control system | 174 |
| one or more processors | 176 |
| associated memory | 178 |
| computing system | 180 |
| one or more processors | 182 |
| associated memory | 184 |
| hopper | 188 |
| barrel | 190 |
| rotating screw conveyor | 192 |
| build assembly | 194 |
| anchor plate | 196 |
| attachment region | 198 |
| guide | 200 |
| axial actuator | 202 |
| heating source | 204 |
| cavity | 206 |

-continued

| List of reference numerals | |
| --- | --- |
| Text | Ref Label |
| cover plate | 208 |
| support plate | 210 |
| one or more standoffs | 212 |
| rotational actuator assembly | 214 |
| rotational actuator | 216 |
| transmission | 218 |
| power-transmitting component | 220 |
| belt | 222 |
| power-receiving component | 224 |
| rotational support | 226 |
| first bearing | 228 |
| second bearing | 230 |
| rotary joint | 232 |
| first power component | 234 |
| second power component | 236 |
| contact sensor | 238 |
| temperature control system | 240 |
| first adapter | 242 |
| airflow system | 244 |
| first housing portion | 246 |
| second housing portion | 248 |
| airflow device | 250 |
| duct | 252 |
| conduit | 254 |
| temperature-altering device | 256 |
| second adapter | 258 |
| opening | 260 |
| outlet device | 262 |
| line | 266 |
| method | 300 |
| control software flow chart generally | 400 |
| CAD generated configuration of sleeve | 402 |
| slicing algorithms | 404 |
| conversion to G-code for firmware | 406 |
| kinematic control of multiple printers | 408 |
| temperature control | 410 |
| axial air bridge sleeve | 510 |
| axially extending air channel | 512 |
| axial air passage | 514 |
| air discharge aperture | 516 |
| circumferential air distribution groove | 518 |
| radial air bridge sleeve | 610 |
| shallow groove | 612 |
| radial hole | 614 |
| countersunk portion of hole 614 | 616 |
| plug | 618 |
| side flangle of plug 616 | 620 |
| radial air passage | 622 |
| print material | PM |
| axis of rotation | $A_R$ |
| build axis | $A_B$ |
| thickness of road of print material | d |
| width of road of print material | w |

What is claimed is:

1. A sleeve for mounting on a mandrel of a commercial printing machine, which mandrel in operation of the commercial printing machine is rotatably driven about an axis of rotation of the mandrel, which defines a fixed length and an external surface from the axis of rotation of the mandrel, the sleeve comprising:

a core defining a hollow shell having a length elongating along a central axis of rotation of the sleeve;

wherein the core defines an inner surface that defines a hollow interior extending along the length of the hollow shell;

wherein the core defines an outer surface that is spaced apart in a thickness distance from the inner surface, wherein the thickness distance is measured in a radial direction from the central axis of rotation of the sleeve;

wherein the thickness distance of the core is configured to render a diameter of the core resiliently expandable and contractable by a selective introduction and removal of pressurized air between the external surface of the mandrel and the inner surface of the core in a manner sufficient to permit the sleeve to be selectively mounted onto the mandrel, tightly grip the mandrel to render the core non-rotatable with respective to the mandrel, and dismounted from the mandrel;

wherein the inner surface of the core is continuous and devoid of any radial deviation along a length thereof at least equal to the fixed length of the mandrel;

wherein the core is formed of a thermoplastic polymeric material; and wherein the entire sleeve is formed of the thermoplastic polymeric material.

2. The sleeve according to claim 1, wherein the thermoplastic polymeric material has a uniform density.

3. The sleeve according to claim 2, wherein the entire sleeve is configured for being ground into granulated material that is meltable into printable precursor material for 3-D printing of a sleeve and accordingly renders the sleeve recyclable.

4. The sleeve according to claim 1, wherein the thermoplastic polymeric material includes a conductivity filler.

5. The sleeve according to claim 1, wherein the outer surface of the core defines a cylindrical surface and the inner surface of the core defines a cylindrical surface that is concentric with the cylindrical surface of the outer surface of the core.

6. The sleeve according to claim 1, wherein the outer surface of the core is configured for receiving a printing plate carrying image indicia.

7. A sleeve for mounting on a mandrel of a commercial printing machine, which mandrel in operation of the commercial printing machine is rotatably driven about an axis of rotation of the mandrel, which defines a fixed length and an external surface from the axis of rotation of the mandrel, the sleeve comprising:

a core defining a hollow shell having a length elongating along a central axis of rotation of the sleeve;

wherein the core defines an inner surface that defines a hollow interior extending along the length of the hollow shell;

wherein the core defines an outer surface that is spaced apart in a thickness distance from the inner surface, wherein the thickness distance is measured in a radial direction from the central axis of rotation of the sleeve;

wherein the thickness distance of the core is configured to render a diameter of the core resiliently expandable and contractable by a selective introduction and removal of pressurized air between the external surface of the mandrel and the inner surface of the core in a manner sufficient to permit the sleeve to be selectively mounted onto the mandrel, tightly grip the mandrel to render the core non-rotatable with respective to the mandrel, and dismounted from the mandrel;

wherein the inner surface of the core is continuous and devoid of any radial deviation along a length thereof at least equal to the fixed length of the mandrel;

wherein the core is formed of a thermoplastic material;

an intermediate shell elongating along the central axis of rotation of the sleeve and defining an inner surface defining an interior space between the intermediate shell and the core; and a first support structure elongating along the central axis of rotation of the sleeve and disposed in the interior space between the intermediate shell and the core and configured to resiliently expand and contract between the core and the intermediate shell during respective mounting and dismounting of the sleeve on the mandrel of the commercial printing machine.

8. The sleeve according to claim 7, wherein the first support structure is defined by a helix extending between the intermediate shell and the core.

9. The sleeve according to claim 8, wherein the core, the first support structure, and the intermediate shell are formed of the same thermoplastic material.

10. The sleeve according to claim 7, wherein the core, the first support structure, and the intermediate shell are integrally and helically formed simultaneously by 3D printing.

11. The sleeve according to claim 7, wherein the first support structure and the core are formed of the same thermoplastic material.

12. The sleeve according to claim 7, further comprising:

an outer shell elongating along the central axis of rotation of the sleeve and defining an internal surface defining a second interior space between the outer shell and the intermediate shell; and a second support structure elongating along the central axis of rotation of the sleeve and disposed in the second interior space between the intermediate shell and the outer shell and configured to remain rigidly incompressible between the outer shell and the intermediate shell during mounting of the sleeve on the mandrel of the commercial printing machine.

13. The sleeve according to claim 12, wherein the second support structure is defined by a helix extending between the intermediate shell and the outer shell.

14. The sleeve according to claim 12, wherein the core, the first support structure, the intermediate shell, the second support structure, and the outer shell are integrally and helically formed simultaneously by 3D printing.

15. The sleeve according to claim 12, wherein the core, the first support structure, the intermediate shell, the second support structure, and the outer shell are formed of the same thermoplastic material.

16. The sleeve according to claim 12, wherein the inner surface of the core defines a cylindrical surface and the outer surface of the outer shell defines a cylindrical surface that is concentric with the cylindrical surface of the inner surface of the core.

17. The sleeve according to claim 12, further comprising an air channel formed as part of the inner surface of the outer shell and axially extending along the inner surface of the outer shell, wherein the air channel defines therein an air passage, and wherein the air channel is configured to confine pressurized air within the air passage.

18. The sleeve according to claim 12, further comprising a plurality of drill plugs, wherein each of the plurality of drill plugs is disposed to extend radially with respect to the central axis of rotation of the sleeve, wherein each of the plurality of drill plugs is disposed with a symmetric and equal circumferential spacing with respect to each adjacent drill plug of the plurality of drill plugs, wherein each of the plurality of drill plugs is configured to define a radial passage that connects the core to the outer surface of the outer shell, and wherein each radial passage is configured to confine pressurized air within the air passage.

* * * * *